United States Patent
Asano

(10) Patent No.: US 7,768,664 B2
(45) Date of Patent: Aug. 3, 2010

(54) COMMUNICATION SYSTEM THAT RECEIVES AN INPUT FROM A USER

(75) Inventor: Taiga Asano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1310 days.

(21) Appl. No.: 10/936,516

(22) Filed: Sep. 9, 2004

(65) Prior Publication Data

US 2005/0052694 A1 Mar. 10, 2005

(30) Foreign Application Priority Data

Sep. 9, 2003 (JP) .............................. 2003-317403

(51) Int. Cl.
*G06F 3/12* (2006.01)

(52) U.S. Cl. ...................... 358/1.15; 709/205; 709/220; 709/229; 726/21; 713/168

(58) Field of Classification Search ............... 358/1.15; 709/205, 220, 201, 223, 225, 229; 726/9, 726/21; 701/200; 705/50; 713/168; 380/223

See application file for complete search history.

(56) References Cited

U.S. PATENT DOCUMENTS

| | | | | |
|---|---|---|---|---|
| 6,064,989 | A * | 5/2000 | Cordery et al. | 705/50 |
| 6,307,640 | B1 * | 10/2001 | Motegi | 358/1.15 |
| 6,651,894 | B2 | 11/2003 | Nimura et al. | |
| 6,990,408 | B2 * | 1/2006 | Iwase et al. | 701/200 |
| 7,206,088 | B2 * | 4/2007 | Tanimoto | 358/1.15 |
| 7,298,508 | B2 * | 11/2007 | Furukawa et al. | 358/1.15 |
| 7,443,527 | B1 * | 10/2008 | Shigeeda | 358/1.15 |
| 2002/0087635 | A1 * | 7/2002 | Yamaguchi et al. | 709/205 |
| 2002/0097431 | A1 * | 7/2002 | Ikegami | 358/1.15 |
| 2002/0108062 | A1 * | 8/2002 | Nakajima et al. | 713/201 |
| 2003/0093675 | A1 * | 5/2003 | Hibino et al. | 713/168 |
| 2004/0059800 | A1 * | 3/2004 | Hanson et al. | 726/9 |
| 2004/0105112 | A1 * | 6/2004 | Ishihara et al. | 358/1.15 |
| 2004/0190042 | A1 * | 9/2004 | Ferlitsch et al. | 358/1.15 |
| 2005/0071683 | A1 * | 3/2005 | Mizuguchi | 713/201 |
| 2007/0244963 | A1 * | 10/2007 | Hibino et al. | 709/201 |
| 2007/0245014 | A1 * | 10/2007 | Hibino et al. | 709/223 |

FOREIGN PATENT DOCUMENTS

JP 2001-154822 6/2001

* cited by examiner

*Primary Examiner*—Twyler L Haskins
*Assistant Examiner*—Nicholas C Pachol
(74) *Attorney, Agent, or Firm*—Oblon, Spivak, McClelland, Maier & Neustadt, L.L.P.

(57) ABSTRACT

A communication system includes a first apparatus and a second apparatus. The first apparatus matches first identification information with second identification information, and transmits the first identification information to the second apparatus when the first identification information does not match with the second identification information. The second apparatus matches the first identification information with third identification information, determines the first apparatus as a communication destination when the first identification information matches with the third identification information, and transmits predetermined information to the first apparatus.

28 Claims, 43 Drawing Sheets

FIG.10

SEARCH DETAILS

MAXIMUM RESOLUTION
- ○ NOT SPECIFY
- ○ MORE THAN 600 dpi
- ◉ MORE THAN 300 dpi
- ○ MORE THAN 1200 dpi

MONOCHROME/COLOR
- ○ NOT SPECIFY
- ◉ COLOR PRINTER ONLY
- ○ MONOCHROME PRINTER ONLY

PAPER SIZE
- ◉ NOT SPECIFY
- ○ A3
- ○ A4
- ○ POSTCARD
- ○ A2

DUAL-SIDE PRINTING
- ○ NOT SPECIFY (ONE-SIDE)
- ◉ DUAL-SIDE PRINTING NECESSARY

MAXIMUM PRINTING SPEED
- ◉ NOT SPECIFY
- ○ FASTER THAN 30 ppm
- ○ FASTER THAN 20 ppm
- ○ FASTER THAN 40 ppm

INSTALL DRIVER
- ○ AUTOMATIC INSTALL
- ◉ CHECK WITH DIALOGUE
- ○ NOT INSTALL

[ SET ]
[ CANSEL ]

503

FIG.32
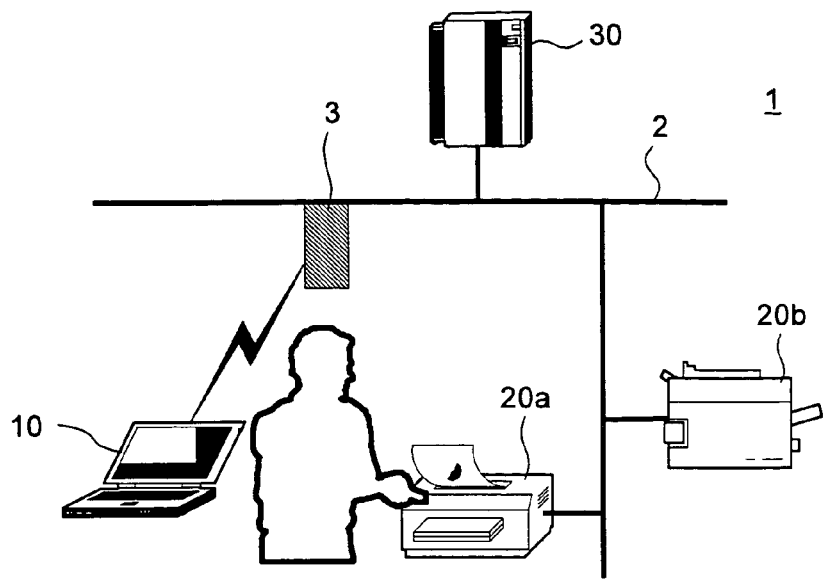
FIG.33
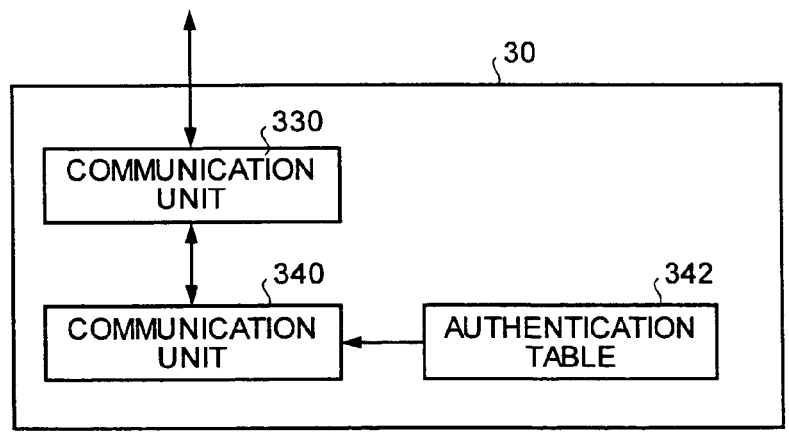
FIG.34
| USER ID | AUTHENTICATION INFORMATION | SEARCH KEY |
|---------|---------------------------|------------|
| A001    | aacd                      | 5963       |
| ⋮       | ⋮                         | ⋮          |

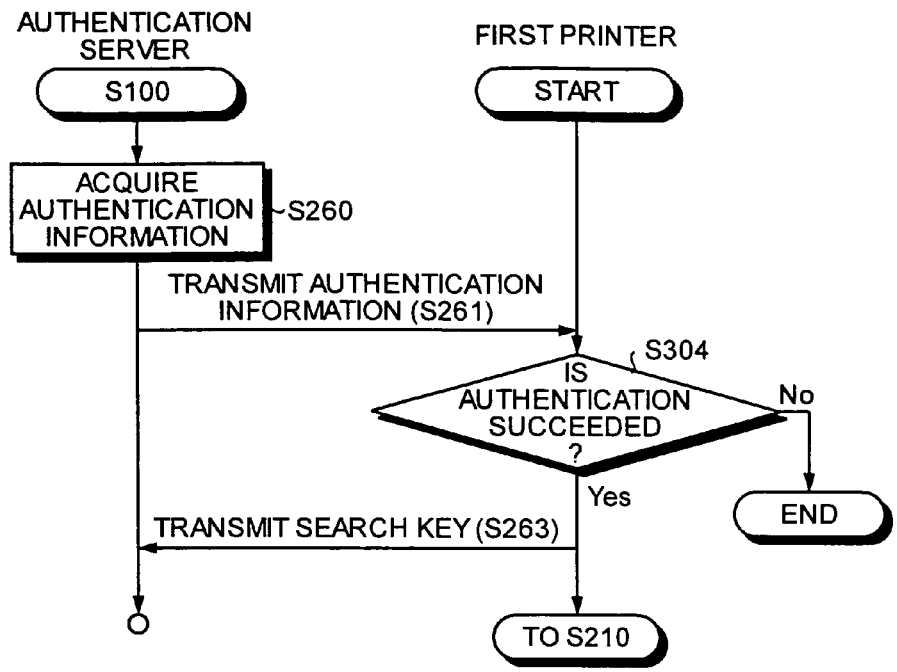
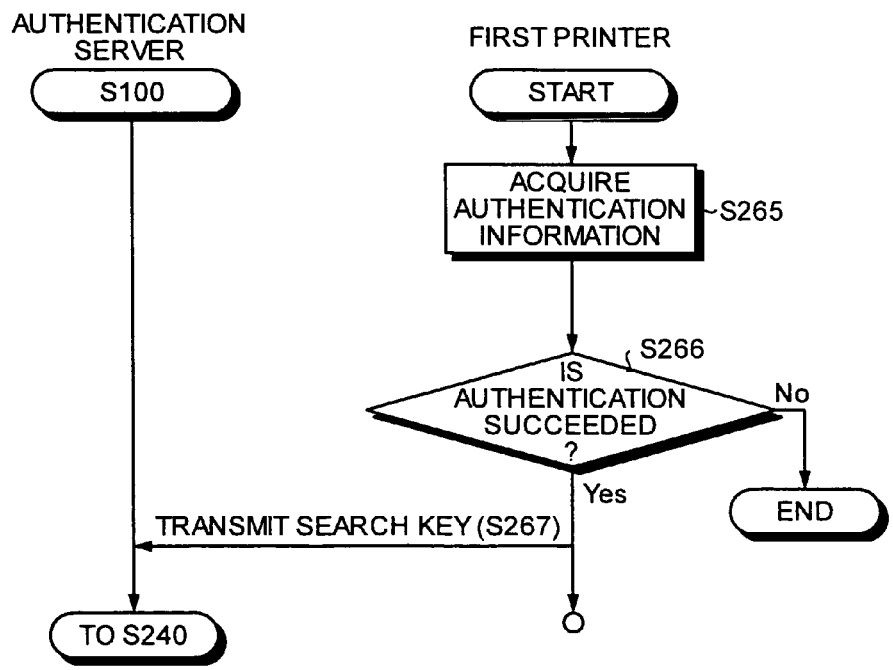

COMMUNICATION SYSTEM THAT RECEIVES AN INPUT FROM A USER

CROSS-REFERENCE TO RELATED APPLICATIONS

The present document incorporates by reference the entire contents of Japanese priority document, 2003-317403 filed in Japan on Sep. 9, 2003.

BACKGROUND OF THE INVENTION

1) Field of the Invention

The present invention relates to a communication system, a communication method, a communication apparatus, and a computer product to establish communications between a plurality of devices connected to a network.

2) Description of the Related Art

Devices such as printers and scanners can be connected to a network, and thus printers or the like can be operated from personal computers (PCs) connected to a network such as local area network (LAN). In such an environment, for example, a user who first visits an office wishes to output a document stored in a laptop PC carried in the office through a printer installed in the office. In this case, the document is copied to a Floppy® disc, and the Floppy® disc is inserted into another PC connected to the network to which the printer is connected. The document is then printed by a process on the PC.

Recently, however, wireless LAN is common in use, and as long as authentication for security of the wireless LAN is permitted, users can easily access a network at any locations.

Service location protocol (SLP), Jini, and the like are known as technologies for searching peripheral devices present on a network or service contents provided by the peripheral devices and automatically setting necessary devices through mobile terminals such as PCs and personal digital assistants (PDAs).

In the SLP and Jini, devices that centrally control service information called as Directory Agent and Lookup Table are determined. Each of the devices registers service information in a central control device, and service search side inquires the central control device with one-on-one communication by unicast.

These technical standards, however, cause a problem that it is difficult to determine places where devices that relate with devices and services found on a network are actually installed.

As a technique that solves this problem, a method of physically specifying a device on the other side using a second communication unit such as Infrared Data Association (IrDA) or the like is known. In this method, however, both terminals which make communication therebetween should have the second communication unit such as IrDA, and thus the cost is high and versatility is low.

As a technique that solves this problem, a method of specifying a communication address of a desired device on the other side so as to establish communication with the other device is known (see, for example, Japanese Patent Application Laid-open No. 2001-154822).

In the method of establishing communication with the other device, common search keys are input into two devices between which the communication is established and the communication is established between the two devices under the condition in which these key are identical to each other. When, for example, the input of the search key is failed, there may be inconveniences such as the procedure has to return to the starting point. Further, a printer which belongs to a different subnet cannot be found. It is, therefore, desired to provide a method of being capable of specifying a place where a device that relates with a device or a service found on a network is actually installed, maintaining a higher security level, and efficiently specifying an address or the like of the device of a communication destination.

SUMMARY OF THE INVENTION

It is an object of the present invention to solve at least the above problems in the conventional technology.

A communication system according to one aspect of the present invention includes a first apparatus and a second apparatus connected to a network, establishing a communication between the first apparatus and the second apparatus. The first apparatus includes a first acquiring unit that acquires first identification information for identifying the communication between the first apparatus and the second apparatus; a first receiving unit that receives second identification information for identifying the communication between the first apparatus and the second apparatus from the second apparatus via the network; a first matching unit that matches the first identification information with the second identification information; and a first transmitting unit that transmits the first identification information when the matching unit determines that the first identification information does not coincide with the second identification information. The second apparatus includes a second receiving unit that receives the first identification information from the first apparatus via the network; a second acquiring unit that acquires third identification information for identifying the communication between the first apparatus and the second apparatus; a second matching unit that matches the first identification information with the third identification information; a communication-destination determining unit that determines the first apparatus that is a transmission source of the first identification information as a communication destination when the second matching unit determines that the first identification information coincides with the third identification information; and a second transmitting unit that transmits predetermined information to the first apparatus determined by the communication-destination determining unit.

A communication system according to another aspect of the present invention includes a first apparatus belonging to a first subnet, a second apparatus belonging to a second subnet, and a communication control unit that manages communication between the first apparatus and the second apparatus. The first apparatus includes a first acquiring unit that acquires first identification information for identifying the communication between the first apparatus and the second apparatus; and a first transmitting unit that transmits the first identification information by broadcast. The communication control unit includes a first receiving unit that receives the first identification information from the first apparatus; and a second transmitting unit that transmits the first identification information to the second subnet. The second apparatus includes a second receiving unit that receives the first identification information from the second transmitting unit, a second acquiring unit that acquires second identification information for identifying the communication between the first apparatus and the second apparatus; a matching unit that matches the first identification information with the second identification information; a communication-destination determining unit that determines the first apparatus that is a transmission source of the first identification information as a communication destination when the matching unit determines that the first identification information coincides with the third identification information; and a third transmitting unit that transmits predetermined information that is to be transmitted to the first apparatus determined by the communication-destination determining unit. The second transmitting unit transmits the predetermined information received by the first receiving unit to the first apparatus.

A communication method according to still another aspect of the present invention includes making a first apparatus acquire first identification information for identifying the communication between the first apparatus and a second apparatus; making the first apparatus receive second identification information for identifying the communication between the first apparatus and the second apparatus from the second apparatus via a network; matching the first identification information with the second identification information; transmitting the first identification information via the network when the first identification information does not coincide with the second identification information; making the second apparatus acquire third identification information for identifying the communication between the first apparatus and the second apparatus; matching the first identification information with the third identification information; determining the first apparatus that is a transmission source of the first identification information as a communication destination when the first identification information coincides with the third identification information; and transmitting predetermined information to the first apparatus determined at the determining.

A communication apparatus according to still another aspect of the present invention includes a first acquiring unit that acquires first identification information for identifying communication between a communication apparatus and other communication apparatus; a first transmitting unit that transmits the first identification information via a network; a receiving unit that receives second identification information for identifying the communication between the communication apparatus and the other communication apparatus from the other communication apparatus when the other communication apparatus receives the first identification information, matches the first identification information with the second identification information acquired by the other communication apparatus, and determines that the first identification information does not coincide with the second identification information; a second acquiring unit that acquires third identification information for identifying the communication between the communication apparatus and the other communication apparatus; a matching unit that matches the second identification information with the third identification information; a communication-destination determining unit that determines the other communication apparatus as a communication destination when the matching unit determines that the second identification information coincides with the third identification information; and a second transmitting unit that transmits predetermined information to the other communication apparatus determined by the communication-destination determining unit.

A communication method according to still another aspect of the present invention includes acquiring first identification information for identifying communication between a communication apparatus and other communication apparatus; transmitting the first identification information via a network; receiving second identification information for identifying the communication between the communication apparatus and the other communication apparatus from the other communication apparatus when the other communication apparatus receives the first identification information, matches the first identification information with the second identification information acquired by the other communication apparatus, and determines that the first identification information does not coincide with the second identification information; acquiring third identification information for identifying the communication between the communication apparatus and the other communication apparatus; matching the second identification information with the third identification information; determining the other communication apparatus as a communication destination when the matching unit determines that the second identification information coincides with the third identification information; and transmitting predetermined information to the other communication apparatus determined by the communication-destination determining unit.

A computer readable recording medium according to still another aspect of the present invention stores a computer program that realizes the communication method according to the above aspect on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10 is a diagram of a detailed search screen 503 displayed on the user terminal 10 in the printer selecting process;

FIG. 13 is a diagram of a user interface 220 provided to a housing of a first printer 20a;

FIG. 14 is a diagram of a touch panel 220c provided to the housing of the first printer 20a;

FIG. 15 is a diagram of the touch panel 220c provided to the housing of the first printer 20a;

FIG. 27 is a flowchart of a communication sequence when a search key is input into the first printer 20a;

FIG. 28 is a flowchart of the communication sequence when the search key is input into the first printer 20a;

FIG. 32 is a diagram of an entire constitution of the printing system 1 according to a second embodiment;

FIG. 33 is a block diagram of a functional constitution of an authentication server 30;

FIG. 34 is a diagram of a data constitution of an authentication table 342;

FIG. 39 is a flowchart of a detailed process in the authentication process (step S250) according to the third embodiment;

FIG. 40 is a flowchart of a still another example of the detailed process in the authentication process (step S250) according to the third embodiment;

DETAILED DESCRIPTION

Exemplary embodiments of a communication system, a communication method, a communication apparatus, and a computer product according to the present invention will be explained in detail with reference to the accompanying drawings.

Figure 1:
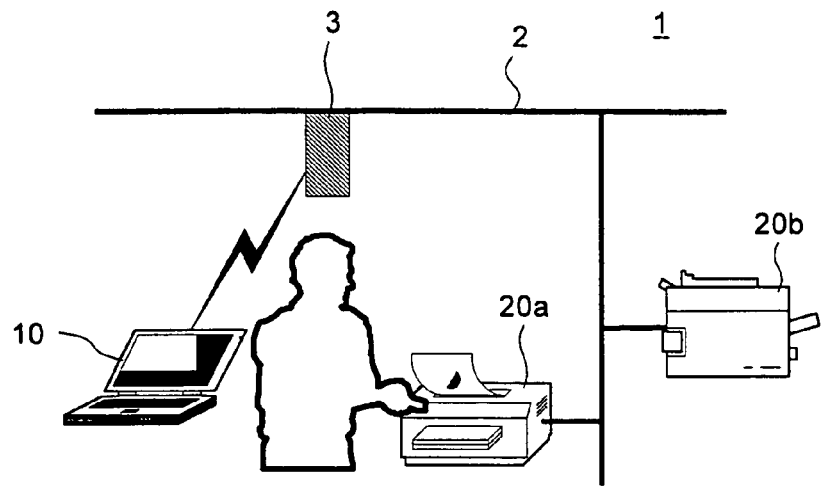
FIG. 1 is a diagram of an entire constitution of a printing system 1 according to a first embodiment.

FIG. 1 is a diagram of an entire constitution of a printing system 1 according to a first embodiment of the present invention. The printing system 1 according to the first embodiment constitutes a communication system of the present invention. The printing system 1 has a plurality of devices that are communicable via a network. The printing system 1 has two printers 20a and 20b.

The printing system 1 may have devices such as a network scanner, a facsimile, and a multi functional product (MFP) of printer/scanner/facsimile functions, instead of the printers.

A user wishes to connect a portable user terminal 10 such as a user's laptop PC to the printing system 1 and output printing data stored in the user terminal 10 from any one of the printers 20a and 20b in the printing system 1. At this time, when, for example, the printers are provided in physically separated locations and even if the user wishes to output the printing data from a printer installed in the closest location, the user cannot recognize a corresponding relationship between identification information of the printers on the user terminal 10 and the printers actually installed, so that the user cannot specify the closest printer.

On the contrary, in the first embodiment, when a search key as communication identification information for identifying communication between the printer and the user terminal 10 is input into the printer from which the printing data are desired to be output, the user terminal 10 can specify an address of the printer. This enables the printing data stored in the user terminal 10 to be transmitted to a desired printer in the printing system via the network and be output as a print. The search key according to the embodiment corresponds to the identification information for identifying the communication in the present invention.

The user terminal 10 in the embodiment is the laptop PC, but as another example, a desktop personal computer, a mobile terminal such as PDA and a digital still-image camera with a communication function having a function for direct printing to a printer may be used.

The user terminal 10 and the first printer 20a constitute a first apparatus and a second apparatus of the present invention.

Figure 2:
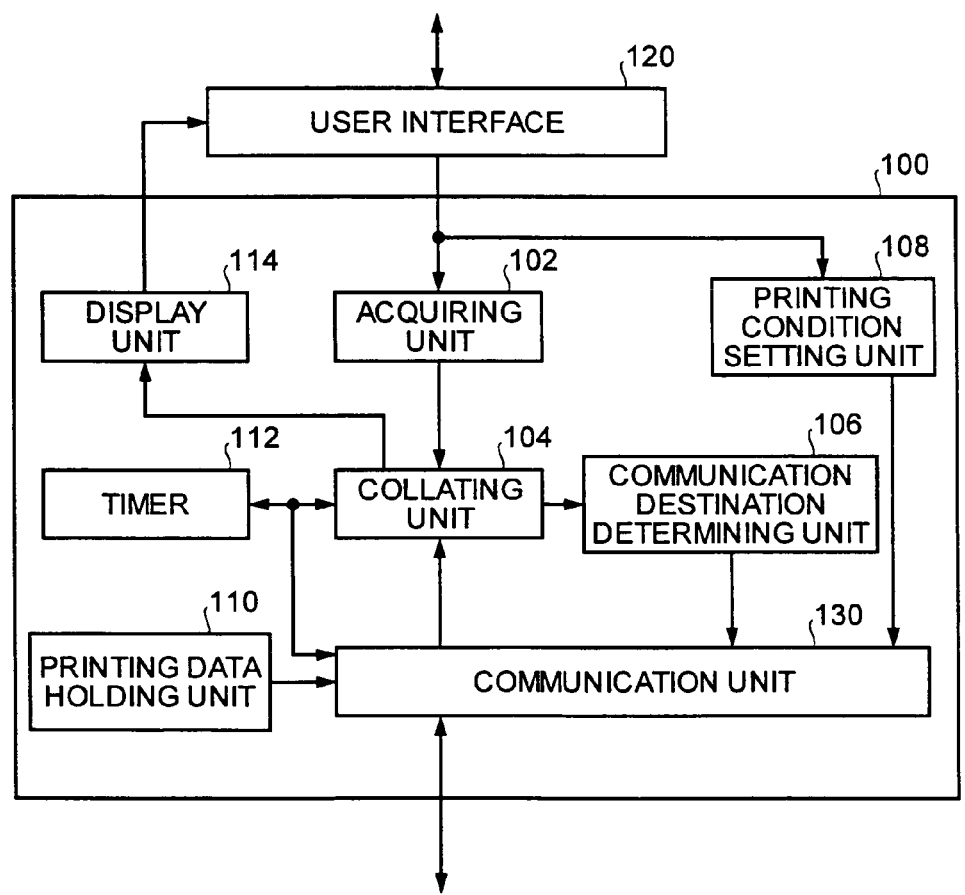
FIG. 2 is a block diagram of a functional constitution of a user terminal 10 according to the first embodiment.

FIG. 2 is a block diagram of a functional constitution of a communication processing unit 100 of the user terminal 10 that executes a communication process characteristic of the embodiment according to the first embodiment. The communication processing unit 100 has an acquiring unit 102, a matching unit 104, a communication-destination determining unit 106, a printing condition setting unit 108, a printing data holding unit 110, a timer 112, a display unit 114, and a communication unit 130. The acquiring unit 102 acquires a search key from a user via a user interface 120 (hereinafter, the search key input by the user terminal 10 is "terminal side search key").

The printing data holding unit 110 holds printing data to be output to the printer of the printing system 1. The printing condition setting unit 108 sets printing conditions at the time when the printer prints the printing data held by the printing data holding unit 110 based on the input into the user interface 120 by the user. The printing conditions include, for example, a size of printing paper and resolution.

The communication unit 130 communicates with another device in the sprinting system 1 via the network 2. The matching unit 104 matches the search key acquired by the acquiring unit 102 with a search key received by the communication unit 130. The communication-destination determining unit 106 determines communication destination based on a result of the matching unit 104. That is to say, it determines transmission destination of the printing data. The timer 112 counts predetermined time. The display unit 114 displays the result from the matching unit 104 and the communication destination determined by the communication-destination determining unit 106 on a screen display as the user interface 120.

Figure 3:
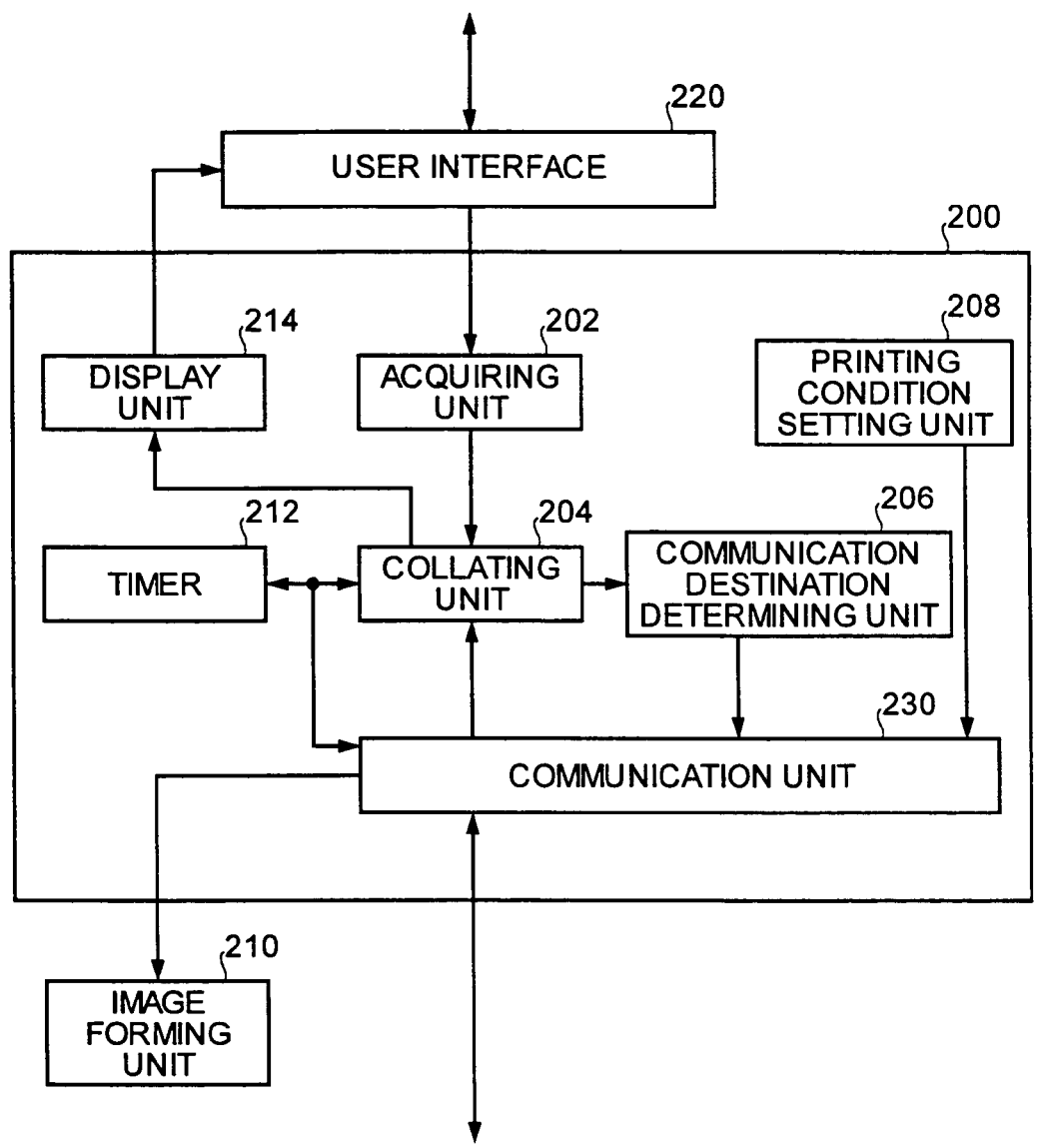
FIG. 3 is a block diagram of a functional constitution of a printer 20 according to the first embodiment.

FIG. 3 is a diagram of a functional constitution of the first printer 20a according to the first embodiment. The first printer 20a has a communication processing unit 200 that executes a characteristic communication process in the embodiment, a user interface 220 that receives input from a user, and an image forming unit 210 that forms an image based on the printing data.

The communication processing unit 200 has an acquiring unit 202, a matching unit 204, a communication-destination determining unit 206, a printing-condition determining unit 208, a timer 212, a display unit 214, and a communication unit 230. The acquiring unit 202 acquires a search key from a user via the user interface 220 (hereinafter, the search key input into the printer 20 is "a printer side search key").

The communication unit 230 communicates with another device in the printing system 1 via the network. The matching unit 204 matches the printer side search key acquired by the acquiring unit 202 with a terminal side search key received by the communication unit 230. The communication-destination determining unit 206 determines communication destination based on a result from the matching unit 204.

The printing-condition determining unit 208 compares printing conditions received from the user terminal 10 via the communication unit 230 with conditions of the printing process in the printer so as to determine whether the printing under the printing conditions received by the user terminal 10 is enabled. The conditions of the printing process in the printer include, for example, a size of printing paper and resolution. The timer 212 counts predetermined time. The display unit 214 displays the result from the matching unit 204 and the communication destination determined by the communication-destination determining unit 206 on a display panel as the user interface 120.

The processes in the acquiring unit 202, the matching unit 204, and the communication-destination determining unit 206 are the same as those in the acquiring unit 102, the matching unit, and the communication-destination determining unit 106 of the communication processing unit 100.

Figure 4:
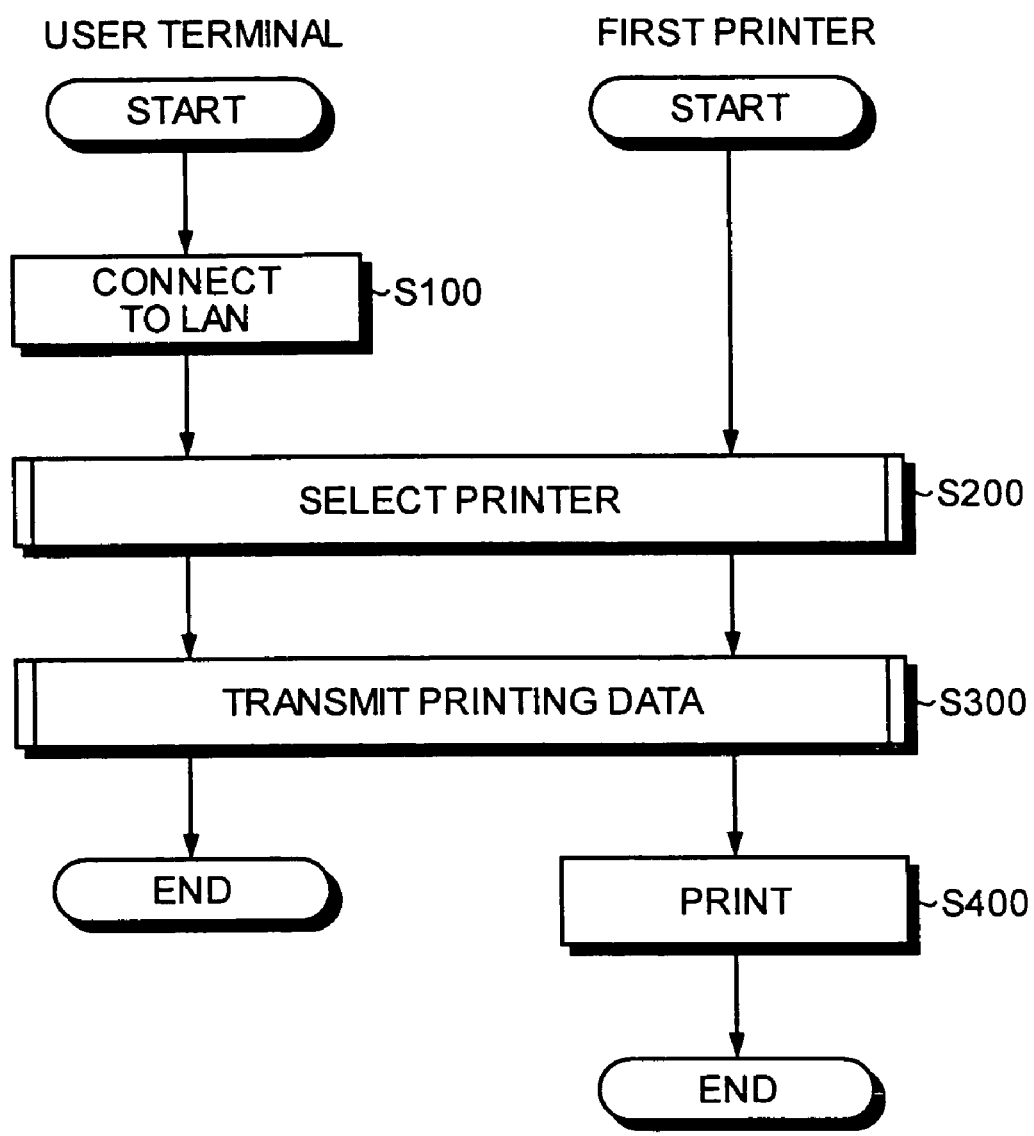
FIG. 4 is a flowchart of a communication sequence according to the first embodiment (a key is first input into a first printer 20a)

FIG. 4 is a flowchart of a communication sequence according to the first embodiment. With reference to FIG. 4, the process for connecting the user terminal 10 to a wireless LAN and outputting printing data from the first printer 20a in the printing system 1 is explained below.

A user connects the user terminal 10 to the wireless LAN (step S100). A printer selecting process for searching for the first printer 20a as communication destination of the user terminal 10 is executed (step S200). A printing data transmitting process for transmitting the printing data to the first printer 20a specified by the printer selecting process (step S200) is executed (step S300). The printing data transmitted to the first printer 20a by the printing data transmitting process are printed (step S400).

Figure 5:
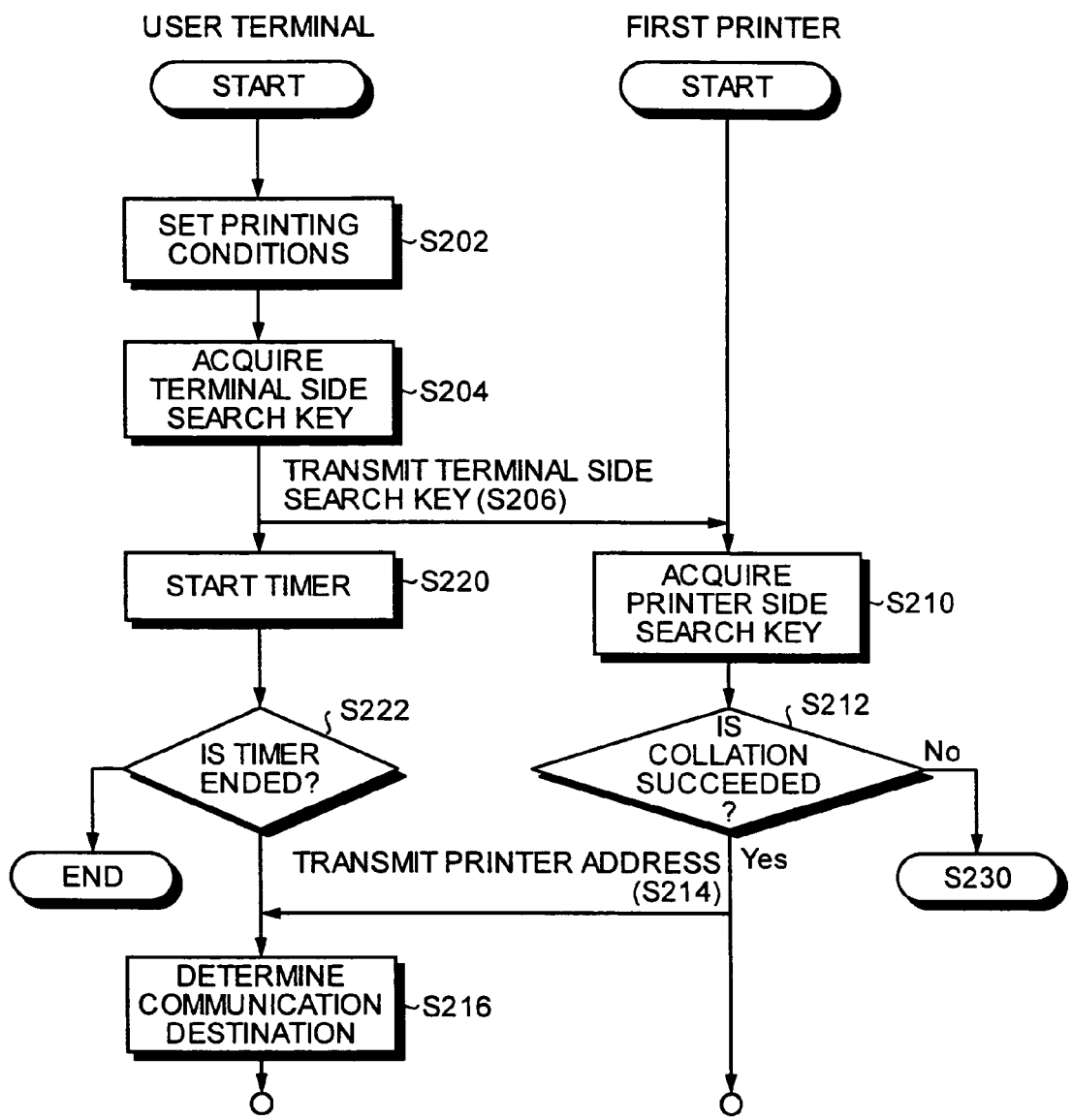
FIG. 5 is a flowchart of a detailed communication sequence in a printer selecting process (step S200) shown in FIG. 4.
Figure 6:
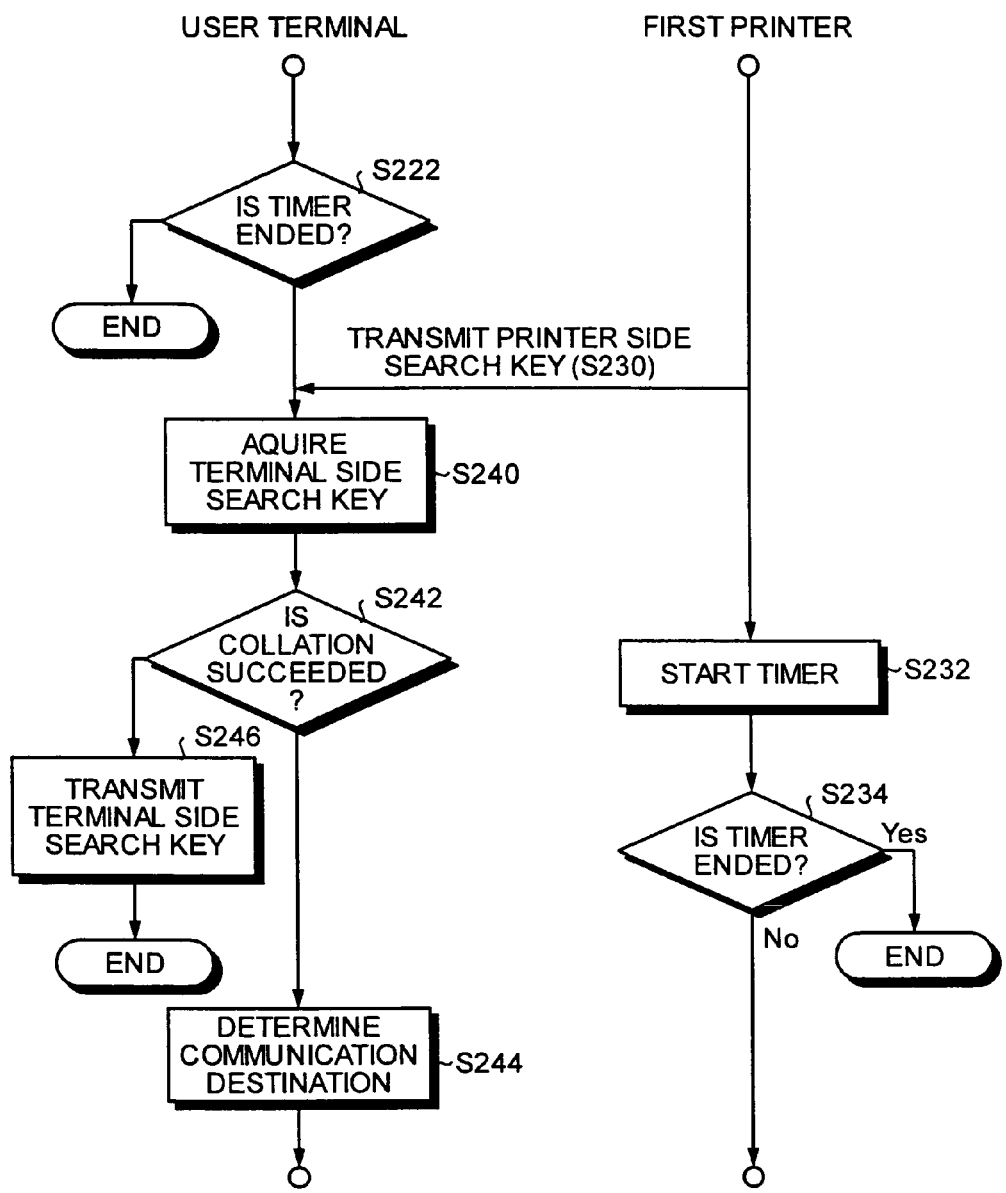
FIG. 6 is a flowchart of the detailed communication sequence in the printer selecting process (step S200) shown in FIG. 4.

FIGS. 5 and 6 are flowcharts of the detailed communication sequence in the printer selecting process (step S200) shown in FIG. 4. With reference to FIGS. 5 and 6, a process at the time when the user inputs the terminal side search key into the user terminal 10 is explained.

In the first embodiment, the search keys are input into both the user terminal 10 and the first printer 20a, respectively, at the printer selecting process (step S200), so that the communication is established under the condition that the search keys are the same as each other. Any one of the user terminal 10 and the first printer 20a can match the search keys.

Figure 7:
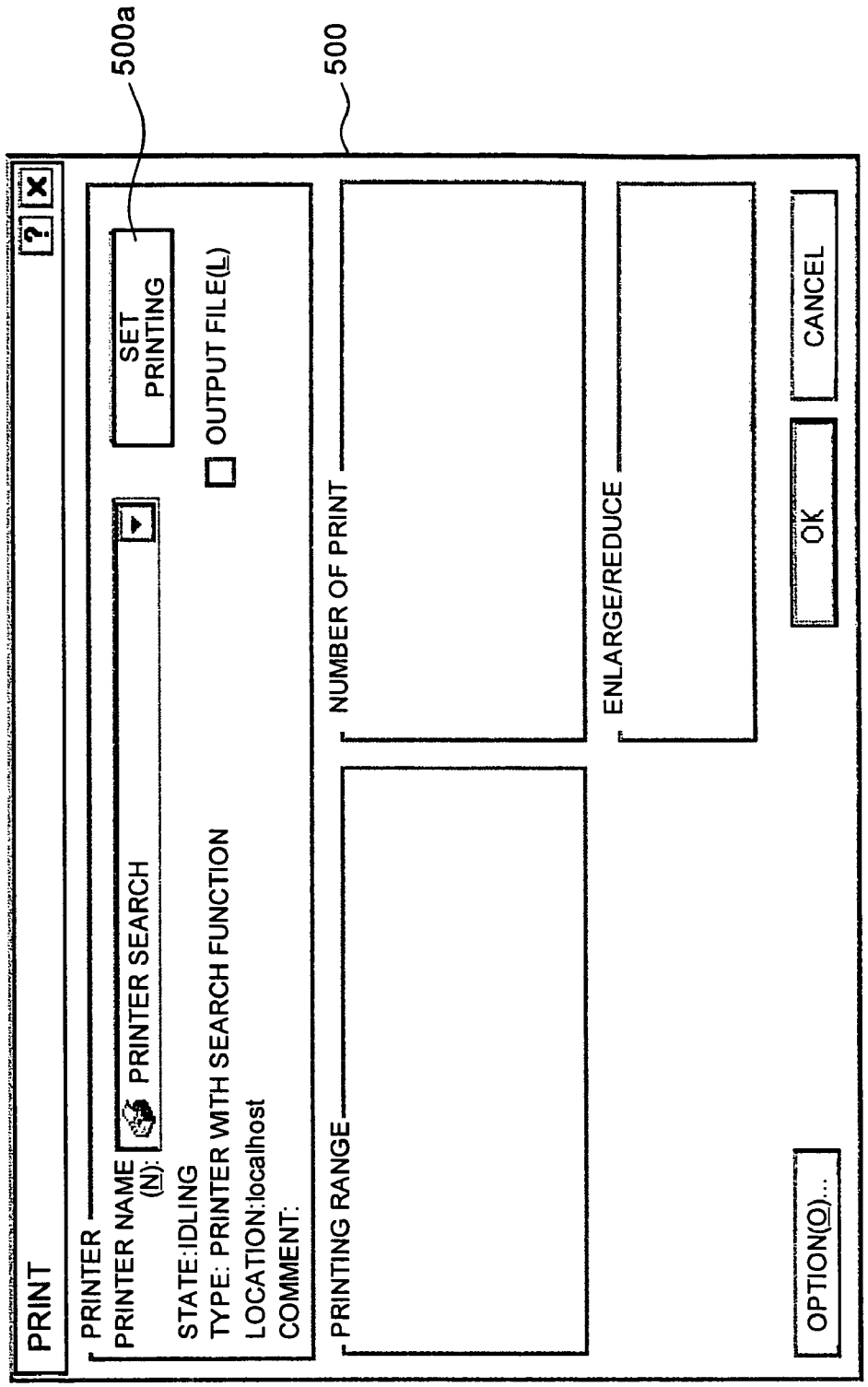
FIG. 7 is a diagram of a printing screen 500 displayed on the user terminal 10 in the printer selecting process.
Figure 8:
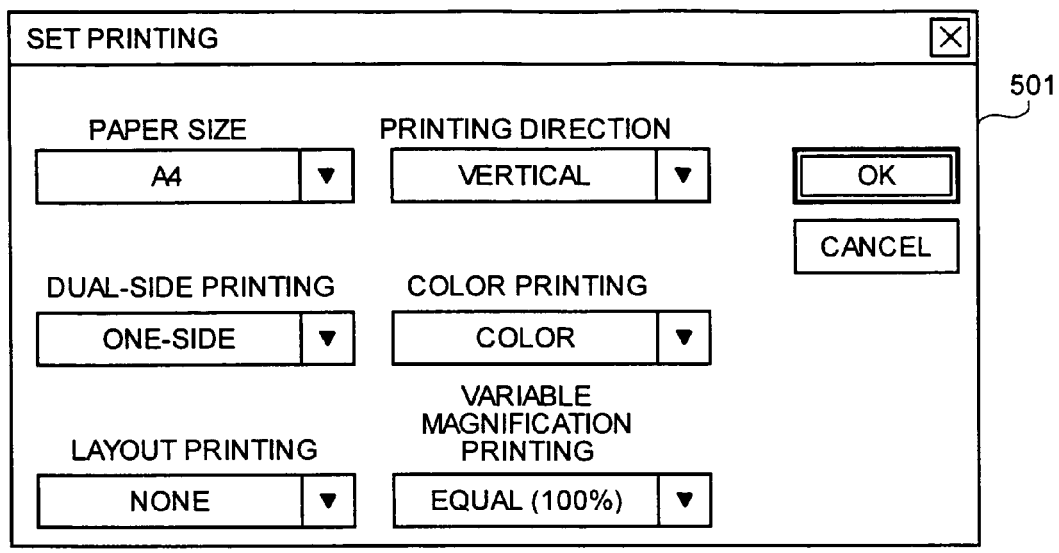
FIG. 8 is a diagram of a printing condition setting screen 501 displayed on the user terminal 10 in the printer selecting process.

In FIG. 5, the user actuates a printer search application program through the user terminal 10. The printing conditions are then accepted via the user interface 120 of the user terminal 10, and the printing conditions at the time of executing the printing data printing process are set (step S202). At this time, a printing screen 500 shown in FIG. 7 is displayed by a printing command using an application stored in the user terminal 10. When the user selects a print set button 500a on the printing screen 500, a printing condition setting screen 501 shown in FIG. 8 is displayed. The user can set desired printing conditions on the printing condition setting screen 501.

Returning back to FIG. 5, after setting the printing conditions, the user inputs a terminal side search key (step S204). Specifically, the user specifies a desired number as the terminal side search key on a search key input field 502*a* of a printer search screen 502 shown in FIG. 9. Further, the user sets effective time of the terminal side search key on an effective time input field 502*b* of the printer search screen 502. The effective time is a time waiting for input of the printer side search key to be input as the same search key as the terminal side search key into the printer.

When the user selects a detailed set button 502*c* of the printer search screen 502, a search detailed screen 503 shown in FIG. 10 is displayed. Conditions for selecting the printer, such as resolution, dual-side printing/one-side printing, monochrome/color, printing speed, paper size, and necessity of installation of a driver for the printer at the time when it is not installed can be set on the search detailed screen 503.

Figure 9:
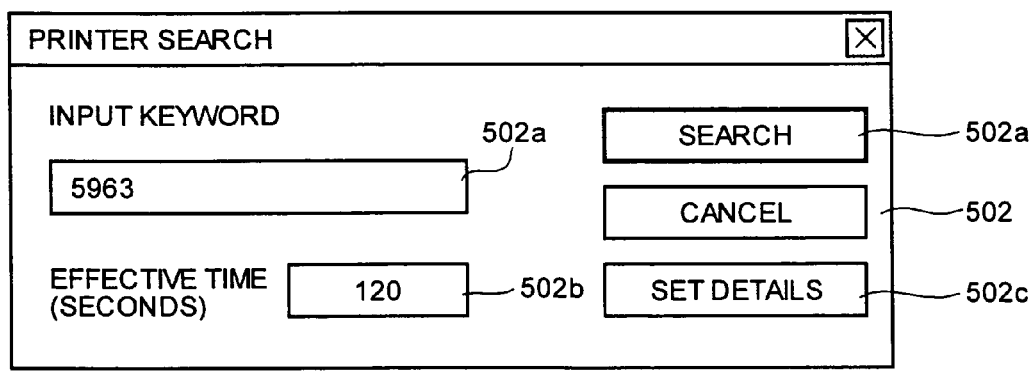
FIG. 9 is a diagram of a printer search screen 502 displayed on the user terminal 10 in the printer selecting process.

Returning back to FIG. 5, when the user selects a search button 502*d* on the printer search screen 502 shown in FIG. 9, the communication unit 130 transmits the terminal side search key on a subnet by broadcast which is the same as the subnet to which the user terminal 10 in the printing system 1 belongs (step S206).

More specifically, when, for example, the user inputs "5963" as the terminal side search key on the printer search screen 502 shown in FIG. 9 and selects the search button 502*d*, a message is generated. In the message, a network address of the user terminal 10 in the printing system 1 and the terminal side search key "5963" are used as identifiers. The message is transmitted in a format of a User Datagram Protocol (UDP) packet. For example, this search message is transmitted to all devices in the address "123.456.1.X (X=1 to 255)".

In the first embodiment, the search key includes only numbers, however as another example, it may be character strings including alphabets and kana character.

A range in which the terminal side search key is transmitted may be set so that the terminal side search key is broadcasted on different sub-network. Alternatively, the range may be set so that the terminal side search key is transmitted by multicast only in a specified range. Furthermore, an IP address may be specified so that the terminal side search key certainly reaches a specified network device.

Communication protocol at the time of transmitting the terminal side search key may be personally defined protocol. Alternatively, an extended message format may be defined to be mounted on conventional protocols such as SLP, universal Plug and Play (UPnP), Jini, Salutation, and BMLinkS. The communication protocol is not limited to those.

The timer 112 starts the count of the timer (step S220). The timer 112 does a countdown of an effective time set on the printer search screen 502 shown in FIG. 9. When the user does not specify the effective time, the timer 112 does a countdown of a predetermined default time. The default time may be set to 1 minute, for example.

The effective time of the search key is set to one minute but can be set to another time. The time may be set to, for example, 3 minutes or 10 minutes. The setting of the effective time can be changed flexibly according to the scale of the network, a number of users, and the complexity of a usable search key. The effective time of the user terminal 10 does not necessarily have to coincide with the effective time of the first printer 20*a*.

Figure 13:
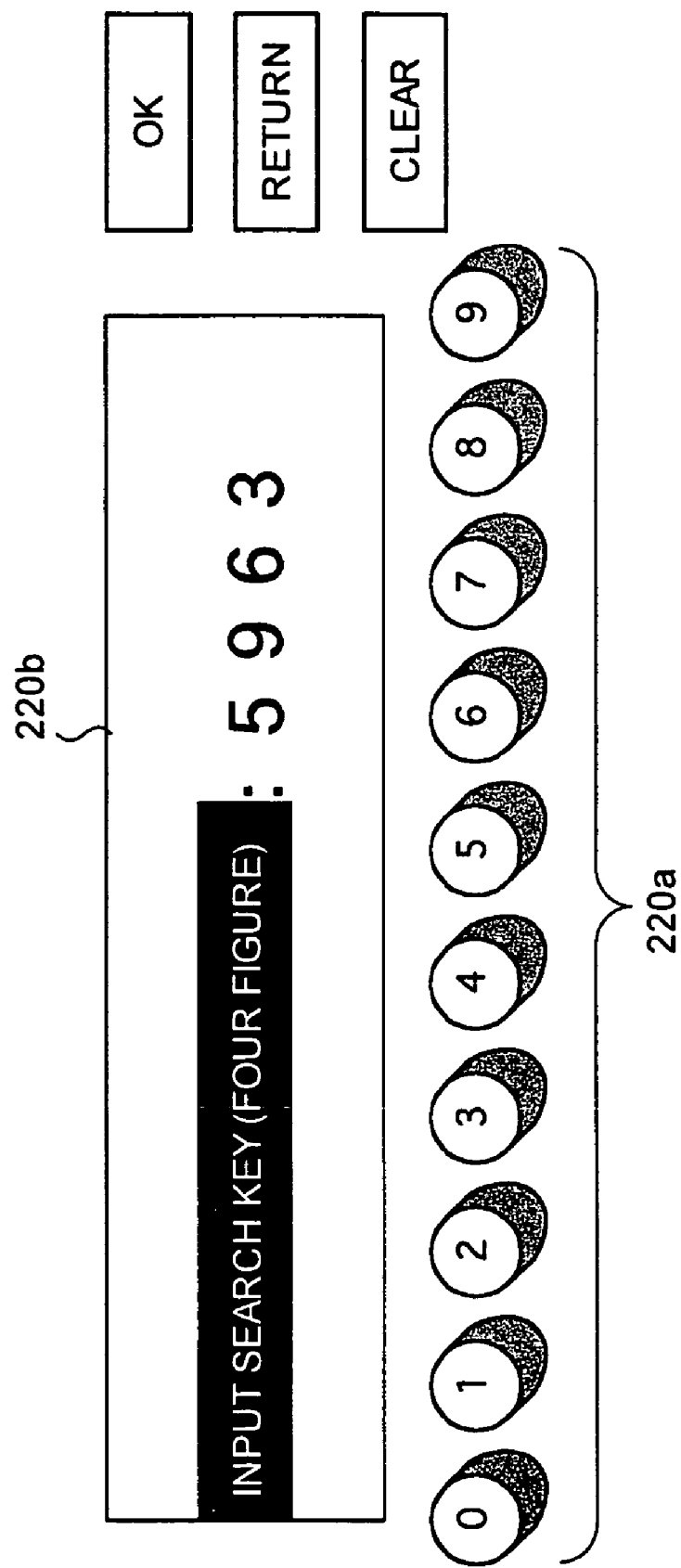

When the terminal side search key is transmitted by broadcast, the terminal side search key is transmitted also to the first printer by which the printing process is desired to be executed by the user. The first printer 20*a* receives the terminal side search key. The user inputs the printer side search key, which is the same as the search key previously input by the same user using the user terminal 10 via the communication unit 230, into the first printer 20*a* (step S210). FIG. 13 is a diagram of the user interface 220 provided to a housing of the first printer 20*a*. The housing of the first printer 20*a* has hard buttons 220*a* for inputting a printer side search key and a display panel 220*b*.

When the user selects the hard buttons 220*a*, the printer side search key is input. When the user inputs the printer side search key with the hard buttons 220*a*, the input printer side search key is displayed on the display panel 220*b*. This enables the user to confirm the selected printer side search key.

Figure 14:
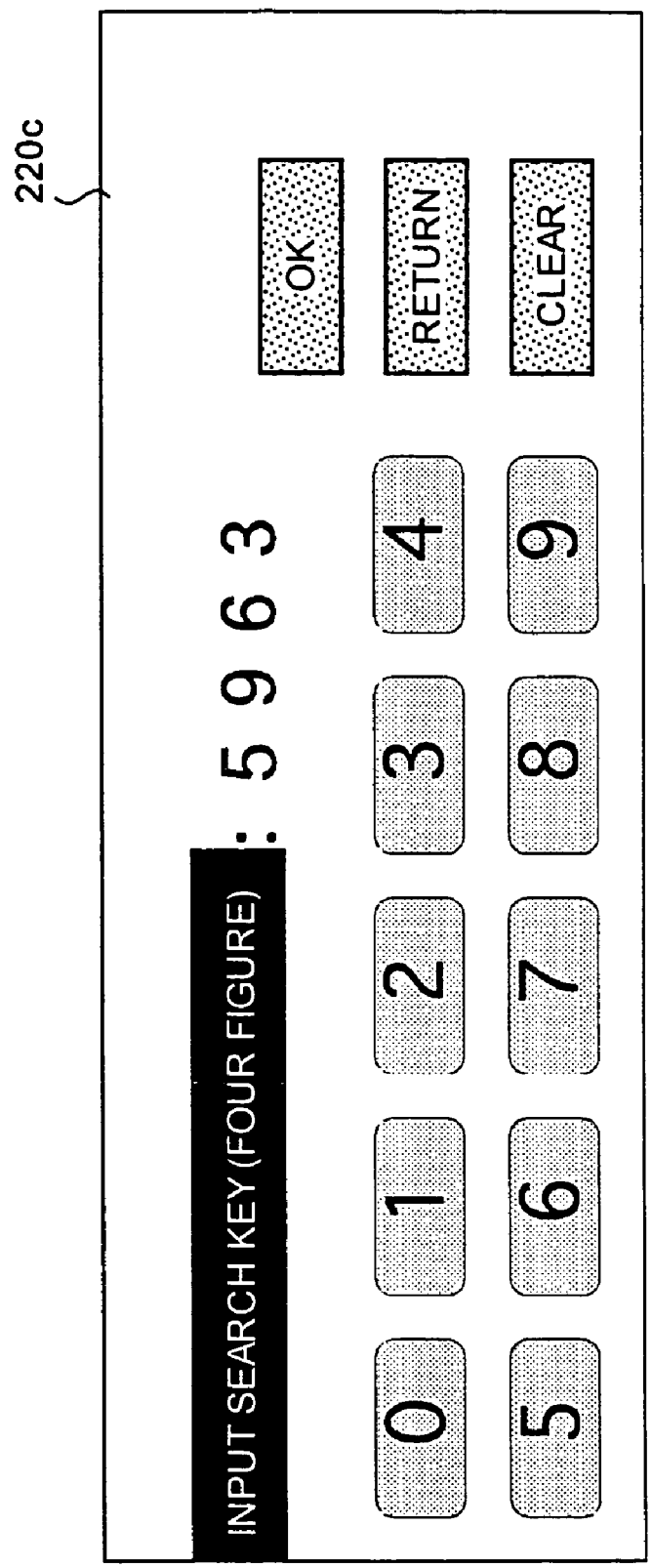

As another example, as shown in FIG. 14, the housing of the first printer 20*a* may have a touch panel 220*c* on which number buttons are displayed. In this case, when the user touches the touch panel 220*c* using a finger or the like so as to select buttons displayed on the touch panel 220*c*, the printer side search key is input.

Figure 15:
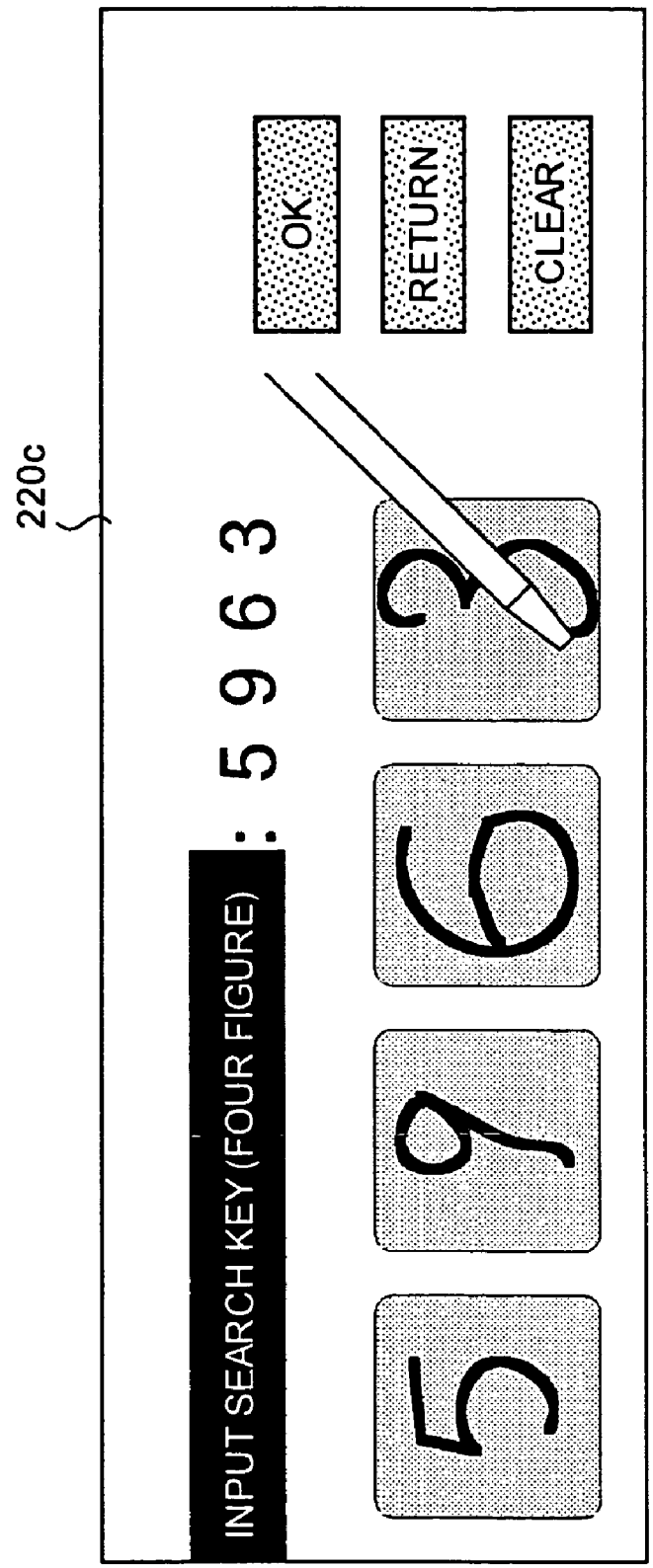

As still another example, the housing of the first printer 20*a* may have the touch panel 220*c* on which a hand written character input field is displayed, as shown in FIG. 15. In this case, the first printer 20*a* has a character recognizing function. In the character recognizing function, when the user writes the printer side search key using a stylus pen or the like, characters input by the user are recognized. The acquiring unit 202 acquires the recognized result as the printer side search key.

Returning back to FIG. 5, when the first printer 20*a* acquires the printer side search key, it matches the printer side search key with the terminal, side search key received from the user terminal 10 (step S212). When the collation is succeeded (Yes at step S212), the communication unit 230 of the first printer 20*a* transmits a notice message including the address of the first printer 20*a* to the user terminal 10 by unicast, which is a transmission source of the terminal side search key, as the transmission destination (step S214).

The notice message may include information representing that the first printer 20*a* itself is a printer besides the printer address. The printer search application program of the user terminal 10 has a process for reading the notice message and regarding a device having an IP address included in the notice message as the printer so as to star connection.

When the user terminal 10 receives the printer address before the count of the timer 112 previously started is completed (No at step S222), it determines the printer address as a transmission source of the printing data, namely, as the communication destination (step S216). The sequence goes to the printing data transmitting process (step S300).

Figure 11:
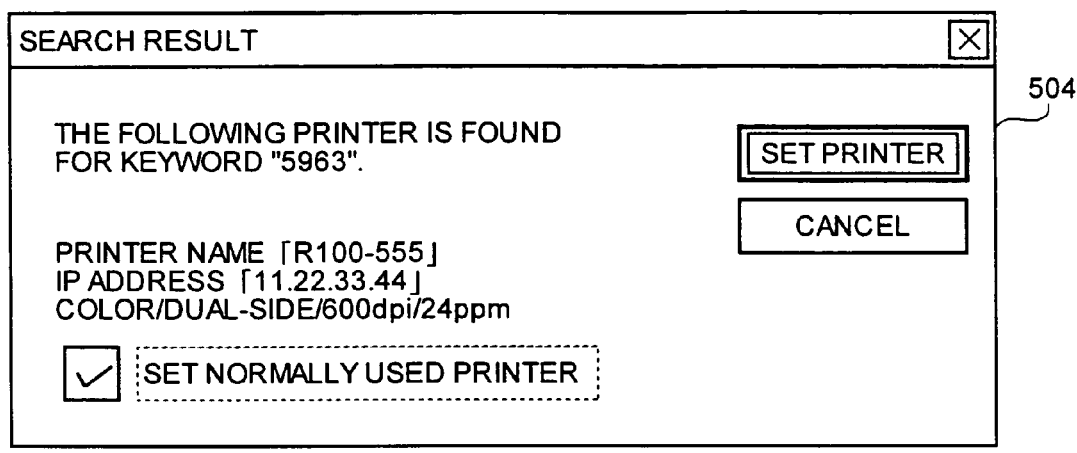
FIG. 11 is a diagram of a search screen 504 displayed on the user terminal 10 in the printer selecting process.
Figure 16:
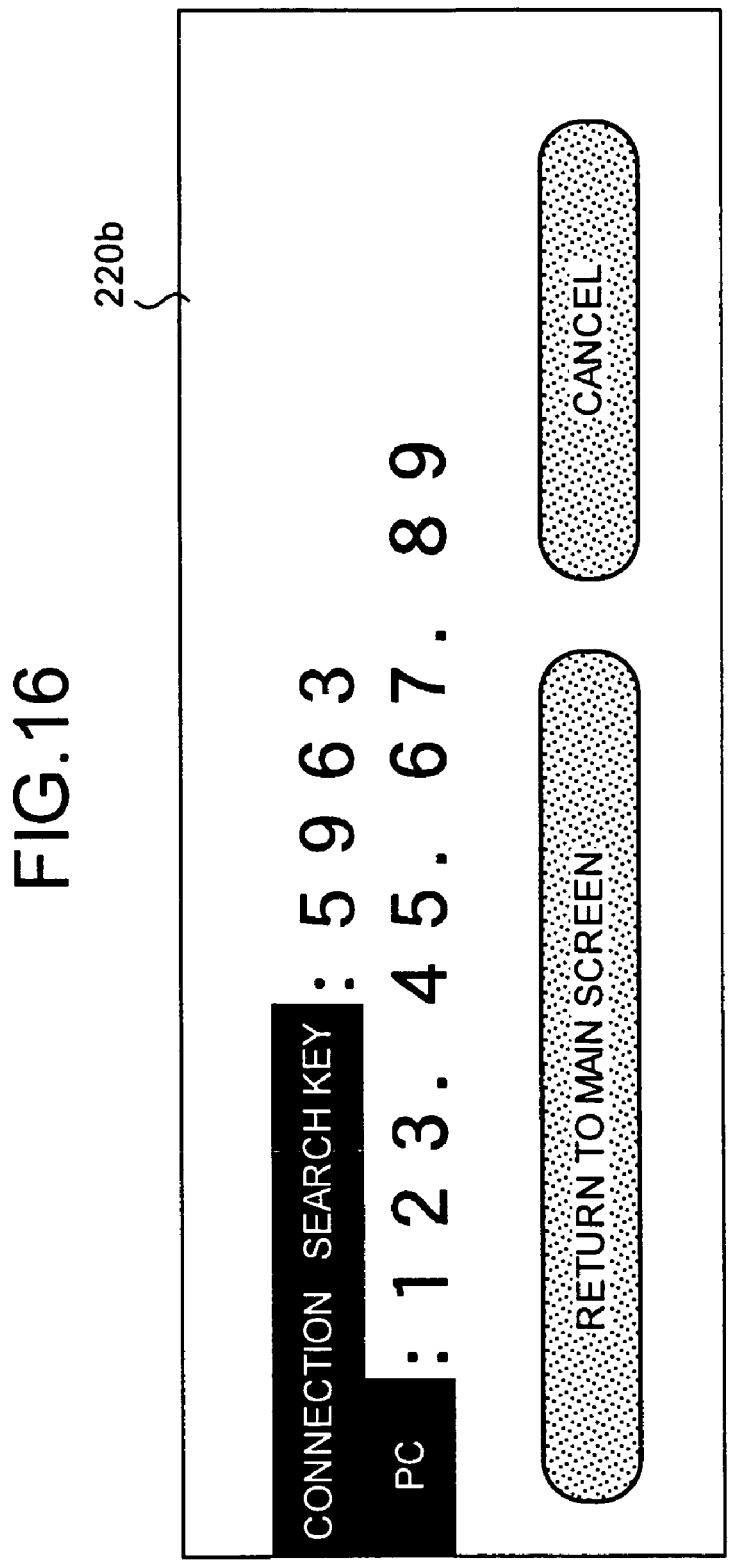
FIG. 16 is a diagram of a display panel 220b on which an Internet protocol (IP) address of the user terminal 10 is displayed.

At this time, a search result screen 504 shown in FIG. 11 is display on the screen display of the user terminal 10. The name, the IP address, the basic specification, and the like of the first printer 20*a* are displayed on the search result screen 504. As shown in FIG. 16, the IP address and the like of the other user terminal 10 is displayed on the display panel of the first printer 20*a*.

Figure 12:
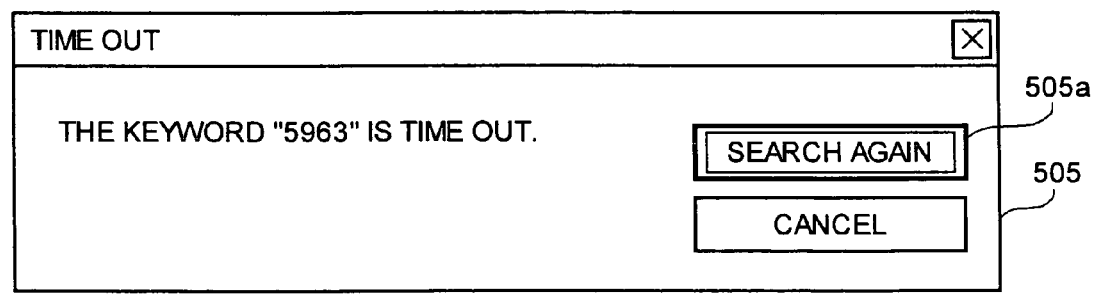
FIG. 12 is a diagram of a search result screen 504 displayed on the user terminal 10 in the printer selecting process.

When the count is completed, the user terminal 10 ends the process, and even if it receives a printer address thereafter, it nullifies the printer address. At this time, a time out screen 505 shown in FIG. 12 is displayed on the screen display of the user terminal 10. When a search again button is 505*a* is selected, the process subsequent to the terminal side search key acquiring process (step S204) is started again.

On the other hand, when the first printer 20*a* does not succeed in the collation of the terminal side search key with the printer side search key, as shown in FIG. 6, the first printer 20*a* further transmits the printer side search key on the subnet of the printing system 1 (step S230) by broadcast. The subnet which is subject to the broadcast transmission is the subnet to which the first printer 20a and the terminal user 10 belong. Further, the situation that the collation is not succeeded means such that a printer side search key which is different from the terminal side search key input by the user at step S204 is input by mistake at step S210.

When the user terminal 10 receives the printer side search key before the count of the timer 112 is completed (step S240), the user terminal 10 again waits for the terminal side search key from the user.

When the user again inputs the terminal side search key which is the same as the printer side search key input into the first printer 20a, the acquiring unit 202 again acquires the terminal side search key (step S240). The matching unit 104 of the user terminal 10 matches the printer side search key received from the first printer 20a with the terminal side search key acquired at the second time (step S424). When the user terminal 10 succeeds in the collation (Yes at step S242), it determines a transmission source which transmits the printer side search key as transmission destination to which the printing data are transmitted, namely, as the communication destination (step S244).

On the other hand, when the user terminal 10 does not succeed in the collation (No at step S242), it transmits the terminal side search key acquired at the second time at step S240 by broadcast, and returns to step S210 so as to execute the process.

When the printer side search key is transmitted at step S230, the timer 212 of the first printer 20a starts a countdown of a predetermined time (step S232). When the printer side search key is acquired at step S210 before the countdown of the timer 212 is completed (No at step S234), the matching unit 204 of the first printer 20a matches the terminal side search key with the printer side search key (step S212). The aforementioned process is then repeated.

In this embodiment, any one of the user terminal 10 and the first printer 20a can match the terminal side search key with the printer side search key. Therefore, when, for example, the user inputs "5963" as the terminal side search key into the user terminal 10, and inputs "5964" as the printer side search key by mistake, the terminal side search key does not coincide with the printer side search key at the collation in the first printer 20a. In this case, "5964" input as the printer side search key is again transmitted to the user terminal 10. When the user inputs "5964" which is a proper value as the terminal side search key into the user terminal 10, the terminal side search key coincides with the printer side search key at the collation in the user terminal 10 so that the communication destination is determined.

Since the collation can be carried out in any of the devices, the user may input the search key into any one of the devices first. If the user inputs a wrong search key, the user only needs to input the correct search key next time. Accordingly, any complicated operation is not required and the convenience of the devices can be improved.

In the process explained with reference to FIGS. 5 and 6, the first printer 20a and the user terminal 10 constitute the first apparatus and the second apparatus according to a first aspect of the invention. The printer side search key acquired by the first printer 20a at step S210 and the printer side search key transmitted from the first printer 20a at step S230 correspond to first identification information according to the first aspect of the invention. The terminal side search key transmitted from the user terminal 10 at step S206 corresponds to second identification information according to the first aspect of the invention. In this embodiment, the terminal side search key acquired by the user terminal 10 at step S240 corresponds to third identification information according to the first aspect of the invention.

Figure 17:
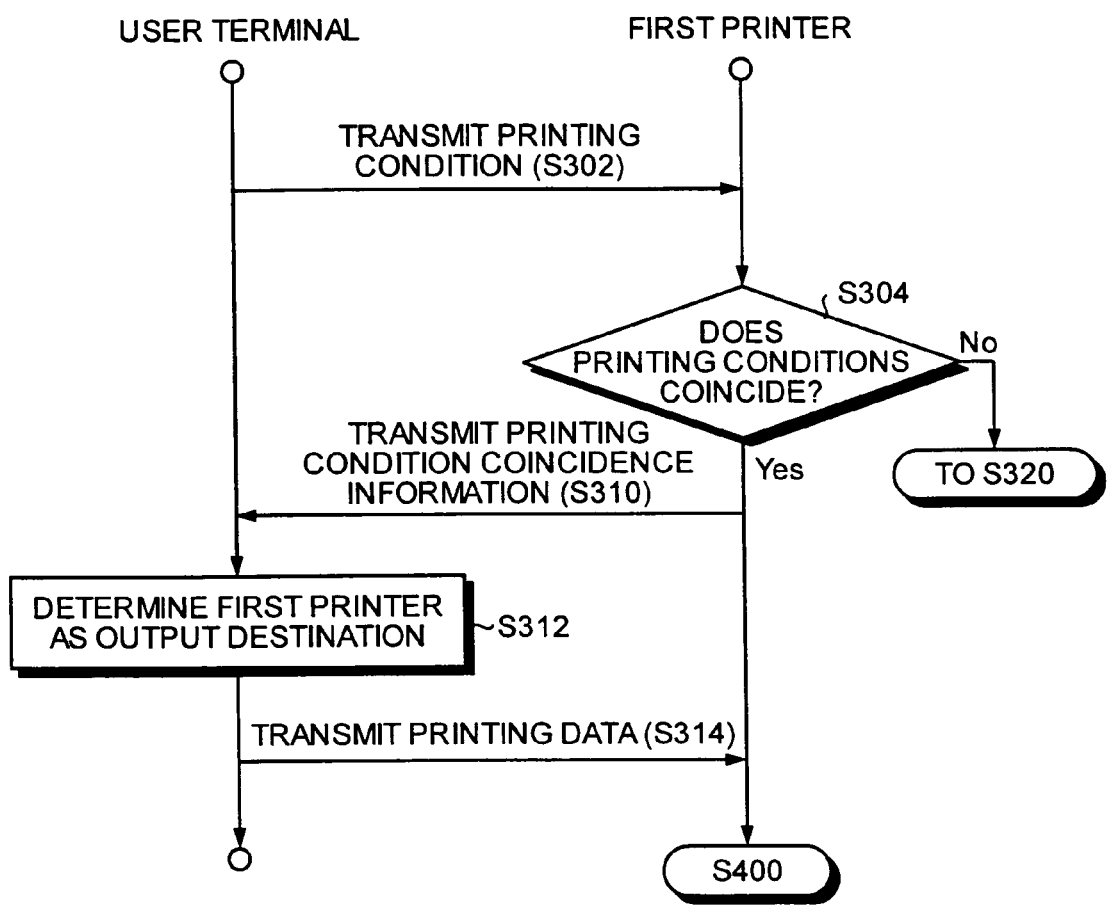
FIG. 17 is a flowchart of a detailed communication sequence in a printing data transmitting process (step S300) shown in FIG. 4.
Figure 18:
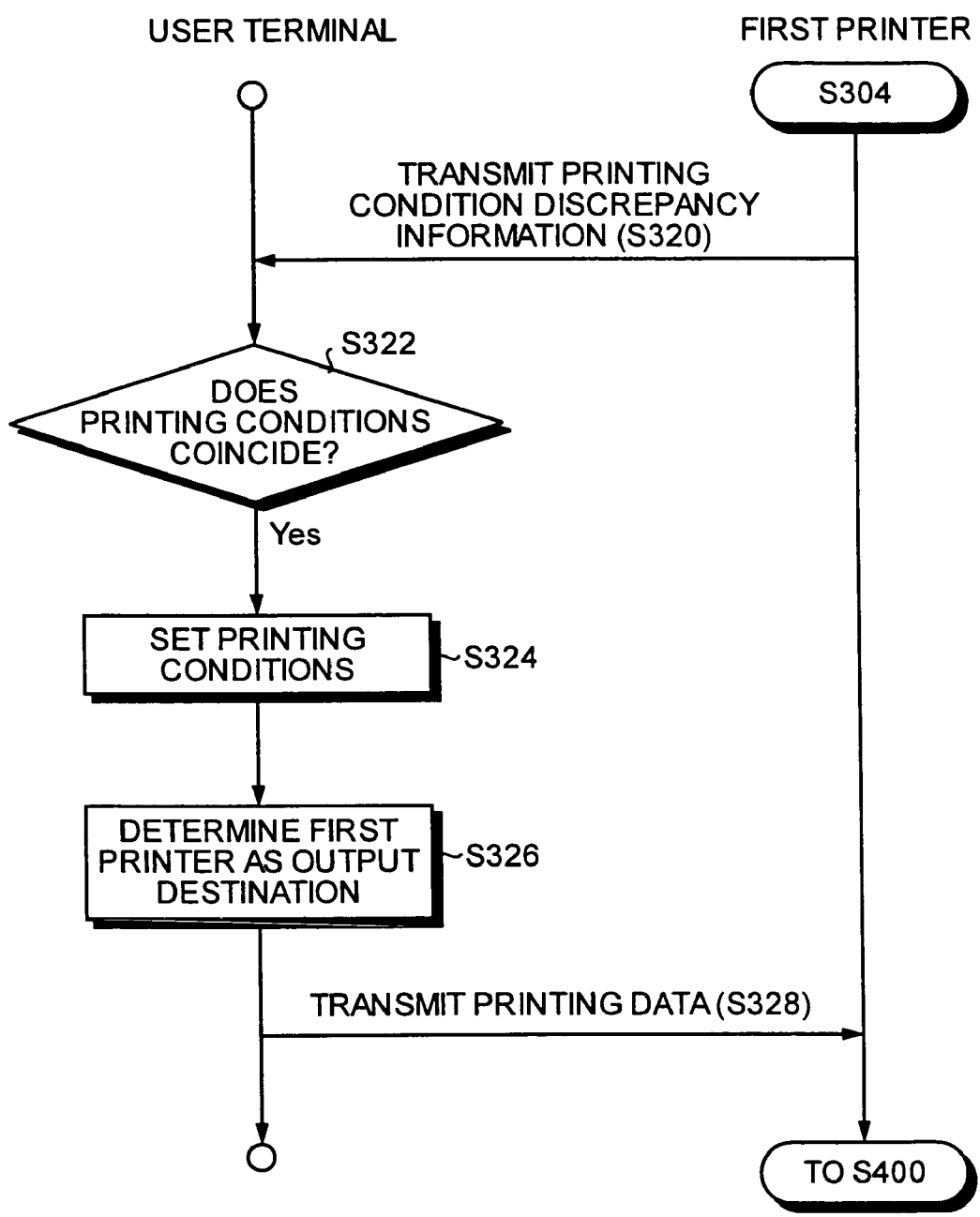
FIG. 18 is a flowchart of the detailed communication sequence in the printing data transmitting process (step S300) shown in FIG. 4.

FIGS. 17 and 18 are flowcharts of a detailed communication sequence in the printing data transmitting process (step S300) shown in FIG. 4. At the printer selecting process (step S200), when the transmission destination to which the user terminal 10 transmits the printing data is determined, the user terminal 10 transmits the printing conditions set at step S202 to the first printer 20a (step S302) by unicast.

The printing-condition determining unit 208 of the first printer 20a determines whether the printing conditions received from the user terminal 10 conform to a printing ability of the image forming unit 210 (step S304). When the printing conditions conform to the printing ability (Yes at step S304), the communication unit 230 of the first printer 20a transmits printing condition conformed information representing that the printing conditions conform to the printing ability to the user terminal 10 (step S310) by unicast.

Figure 19:
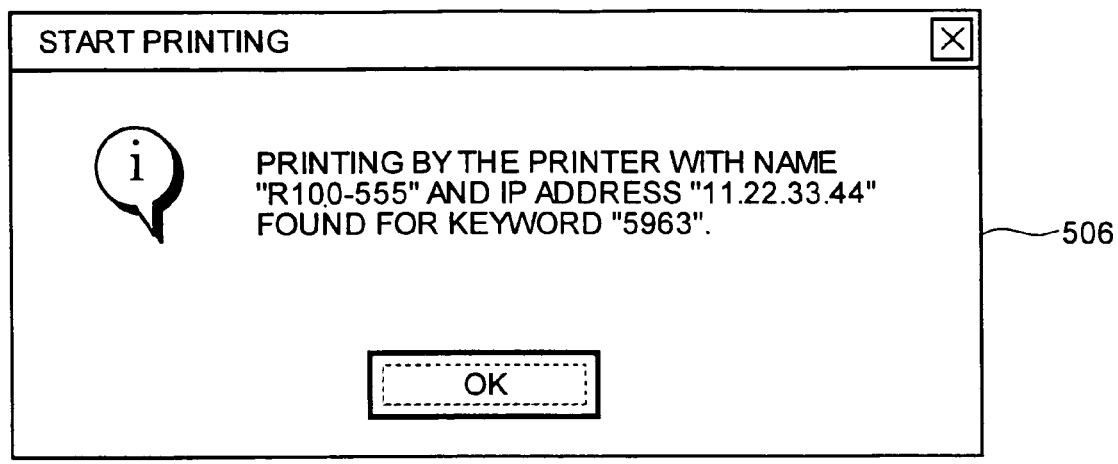
FIG. 19 is a diagram of a printing start screen 506 displayed on the user terminal 10 in the printing data transmitting process.

When the user terminal 10 receives the printing condition conformed information, the user terminal 10 is determined as transmission destination of the printing data (step S312) and the printing data are transmitted to the first printer 20a (step S314) by unicast. When the user terminal 10 receives the printing data, it executes the printing process based on the received printing data (step S400). At this time, a printing start screen 506 shown in FIG. 19 is displayed on the user terminal 10.

When, for example, a printer driver of the first printer 20a is already installed into the user terminal 10, or installation of individual drivers is not necessary because of a general-purpose driver having a common standard, after receiving the printing condition conformed information, the user terminal 10 can automatically transmit the printing data to the first printer 20a so as to instruct the printing.

Figure 20:
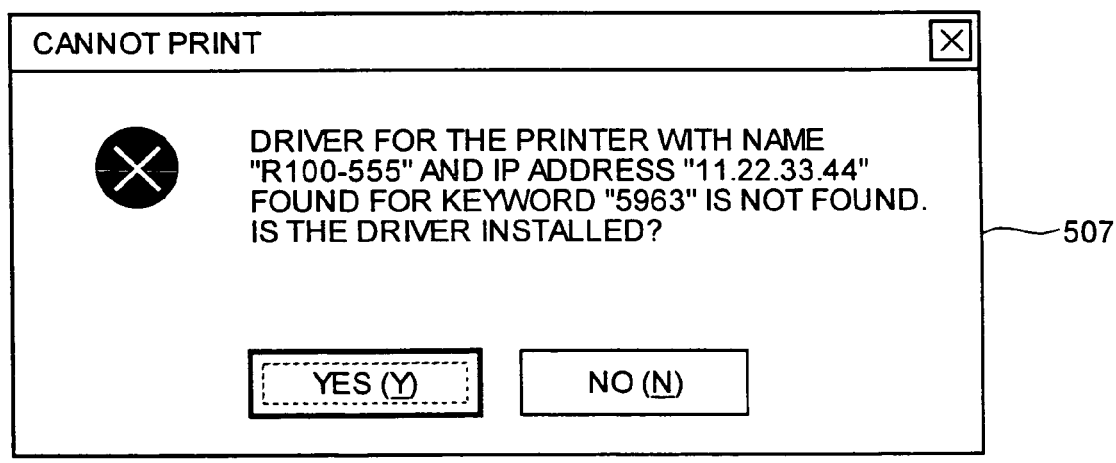
FIG. 20 is a diagram of a driver installation setting screen 507 displayed on the user terminal 10 in the printing data transmitting process.
Figure 21:
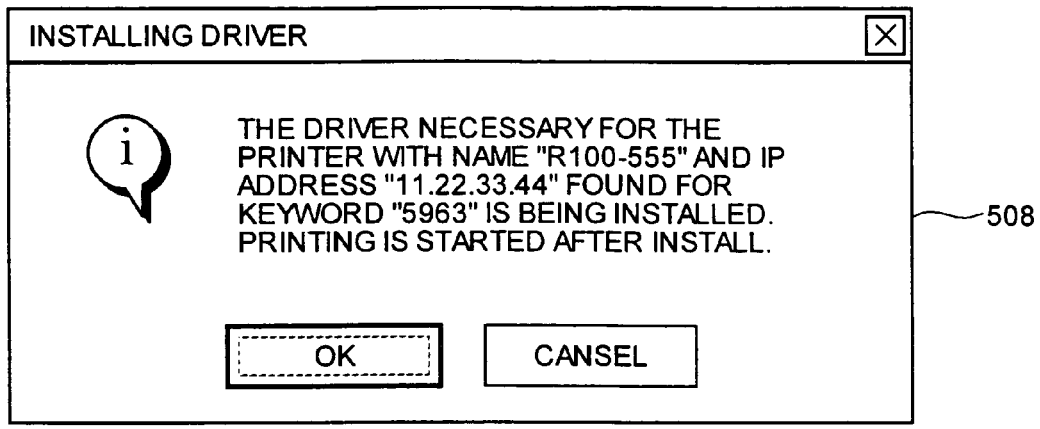
FIG. 21 is a diagram of a driver installing screen 508 displayed on the user terminal 10 in the printing data transmitting process.

When the printer driver of the first printer 20a is not installed into the user terminal 10, for example, a uniform resource locator (URL) of the driver is acquired via Simple object access protocol (SOAP) communication, and the installation may be performed automatically. In this case, a driver installation setting screen 507 shown in FIG. 20 is displayed. When "Yes" is selected on this screen, the installation of the driver can be executed. When "Yes" is selected on the driver installation setting screen 507, a driver installing screen 508 shown in FIG. 21 is displayed, so that the printing after the installation can be instructed.

When the first printer 20a is connected with a printer server, the printer driver is installed from the printer server of the first printer 20a, and the printing may be executed as the need arises.

When the printing conditions received from the user terminal 10 do not conform to the printing ability of the image forming unit 210 at step S304 (No at step S304), the communication unit 230 of the first printer 20a transmits printing condition discrepancy information representing that the printing conditions do not coincide with the printing ability to the user terminal 10 (step S320) by unicast.

Figure 22:
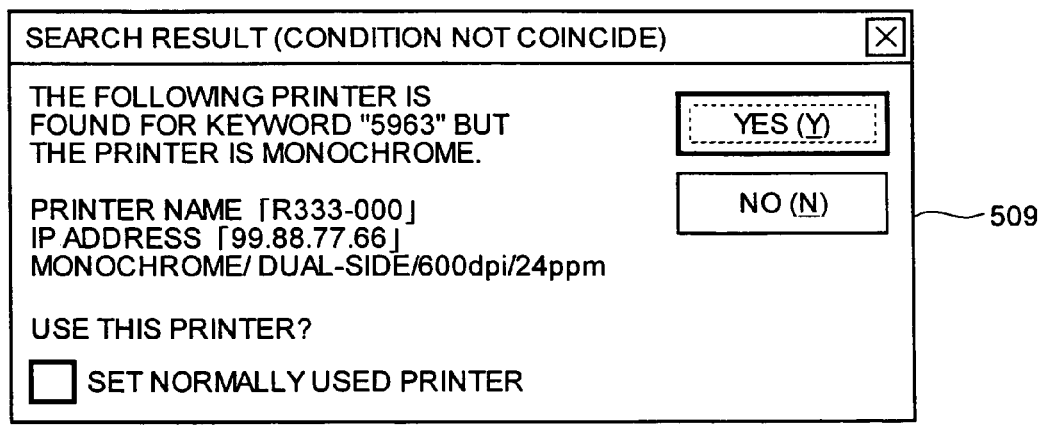
FIG. 22 is a diagram of a search result screen 509 displayed on the user terminal 10 in the printing data transmitting process.

When the user terminal 10 receives the printing condition discrepancy information, it waits for an instruction relating to a change in the printing conditions from the user. At this time, a search result screen 509 shown in FIG. 22 is displayed. The user specifies color printing at the printing condition setting process (step S202), but the first printer 20a determined as the communication destination can sometimes execute only monochrome printing. In this case, the search result screen 509 is displayed. The user can select whether the monochrome printing is executed by the first printer 20a on the search result screen 509.

When the user selects the monochrome printing, the printing conditions set at the printing condition setting process (step S202) are changed (Yes at step S322), and the printing conditions which conform to the printing ability of the first printer 20a determined as the communication destination are again set (step S324). The first printer 20a is determined as the transmission destination of the printing data (step S326), and the printing data are transmitted to the first printer 20a (step S328). That is to say, the printing of the printing data under the printing conditions set again are instructed, and the first printer 20a executes the printing process based on the printing data (step S400). When the user selects that the first printer 20a does not execute the printing, the printing data are prohibited from being transmitted from the user terminal 10 to the first printer 20a.

Only when the printing conditions coincide with the printing ability, the user terminal 10 can transmit the printing data to the first printer 20a.

In the first embodiment, the first printer 20a is specified as the communication destination, and after the IP address of the first printer 20a is acquired, the printing conditions are transmitted to the first printer 20a by unicast. As another example, however, the printing conditions as well as the terminal side search key may be transmitted by broadcast. Since communication traffic increases, the unicast transmission is desirably determined as the printing conditions from this point of view.

Figure 23:
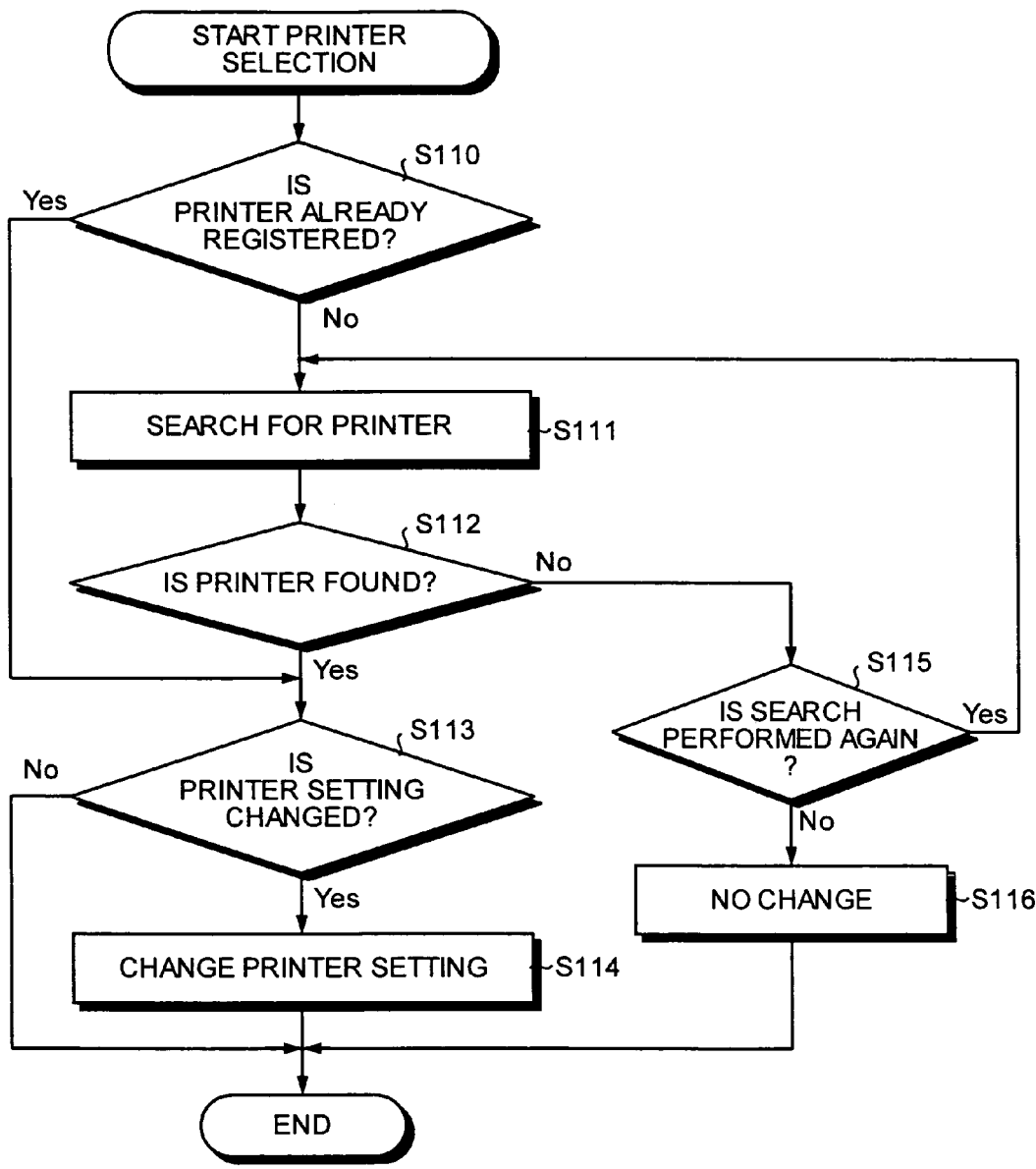
FIG. 23 is a flowchart of a detailed process of the user terminal 10 when the first printer 20a is selected.

FIG. 23 is a flowchart of a detailed process of the user terminal 10 in the printer selecting process explained with reference to FIG. 4 and thereafter. In the printer selecting process, when a printer which is not registered in the user terminal 10 is used (Yes at step S110), a usable printer is searched (step S111). Specifically, as explained with reference to FIGS. 5 and 6, a printer is determined by communication with the first printer 20a. The example which the printer not registered in the user terminal 10 is used means that, for example, the user terminal 10 is newly connected to wireless LAN.

When the printer is found by this process (Yes at step S112), the setting of the found printer is registered (Yes at step S113 and step S114). In the case of the registered printer (No at step S110), when the user specifies a change in the printer setting (Yes at step S113), the printer setting is changed into specified printer setting (step S114).

When the printer is not found (No at step S112) and another search is not instructed (No at step S115), the setting of the printer selection is not changed (step S116), and the process is completed.

With this process, the printing conditions and the like can be set for each printer. When the driver of the printer is not installed in the user terminal 10, IPP (Internet Printing Protocol) is utilized in the printer selecting process. The IP address of the printer is specified and the user terminal 10 is connected to the printer so that the setting including the installation of the driver of the first printer 20a can be automatically executed, for example, from the printer server. Further, default setting of the first printer 20a can be changed.

Figure 24:
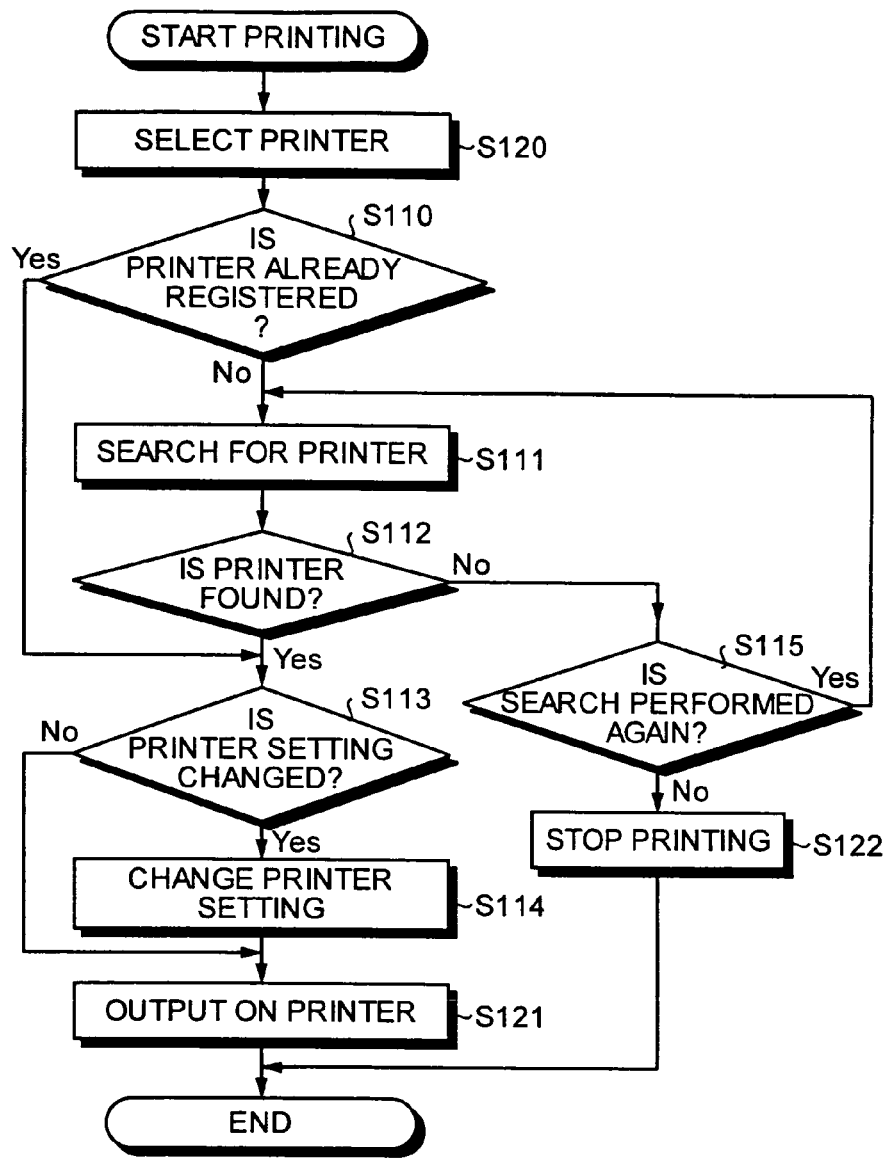
FIG. 24 is a flowchart of a detailed process of the user terminal 10 when the first printer 20a is selected.

FIG. 24 is a flowchart of a detailed process of the user terminal 10 at the time of the printer selection when the printing is instructed in the user terminal 10. Same steps in FIG. 24 are designated by same step numbers in FIG. 23.

For example, when a document is opened on a word processor program for displaying documents, "print" is selected from a menu of the application. A menu for selecting a printer, a button for changing the setting of a currently selected printer, a button for executing the printing by the current printer and at the current print setting, and the like are displayed.

For example, a printer having a name of "search print" is selected (step S120). When the button for executing the printing is selected in a state where the "search printing" is selected, the printer selecting process explained with reference to FIG. 23 is executed. The printer having the name of "search print" is a virtual printer to be specified by the communication destination determining process, and does not mean an actually predetermined printer at the present stage.

When the terminal side search key coincides with the printer side search key and the first printer 20 is specified as the communication destination of the user terminal 10, the printer driver of the first printer 20a is actuated, and a screen to be printed by this printer is displayed. When the print setting is desired to be changed here, the setting is changed. When the print setting is not changed, the user clicks on the button for starting the printing, so as to make the printer start the printing (steps S110 to S121). Further, when the first printer 20a cannot be specified as the communication destination, the printing process is stopped (step S122).

After the first printer 20a is specified, the printing may be started directly by using the print setting specified in the application without displaying the screens for confirming the print execution and changing the setting. This prevents an operation of the printer, an operation of PC, and user's going to the printer and waiting for the completion of the printing. That is to say, this does not take user's time.

As another example, when the printing conditions specified in the application conform to the printing process in the first printer 20a, the printing may be started immediately. When the printing conditions do not conform to the printing process, the printing may be stopped.

Figure 25:
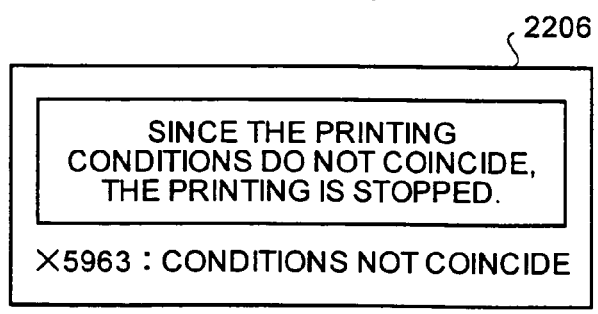
FIG. 25 is a diagram of a screen displayed on a display unit 220b of the first printer 20a when the printing process is stopped.

As another example, when the printing process is stopped, the state where the conditions do not conform to the printing process may be displayed on the display unit 220b of the first printer 20a. At this time, a screen shown in FIG. 25 is displayed.

Figure 26:
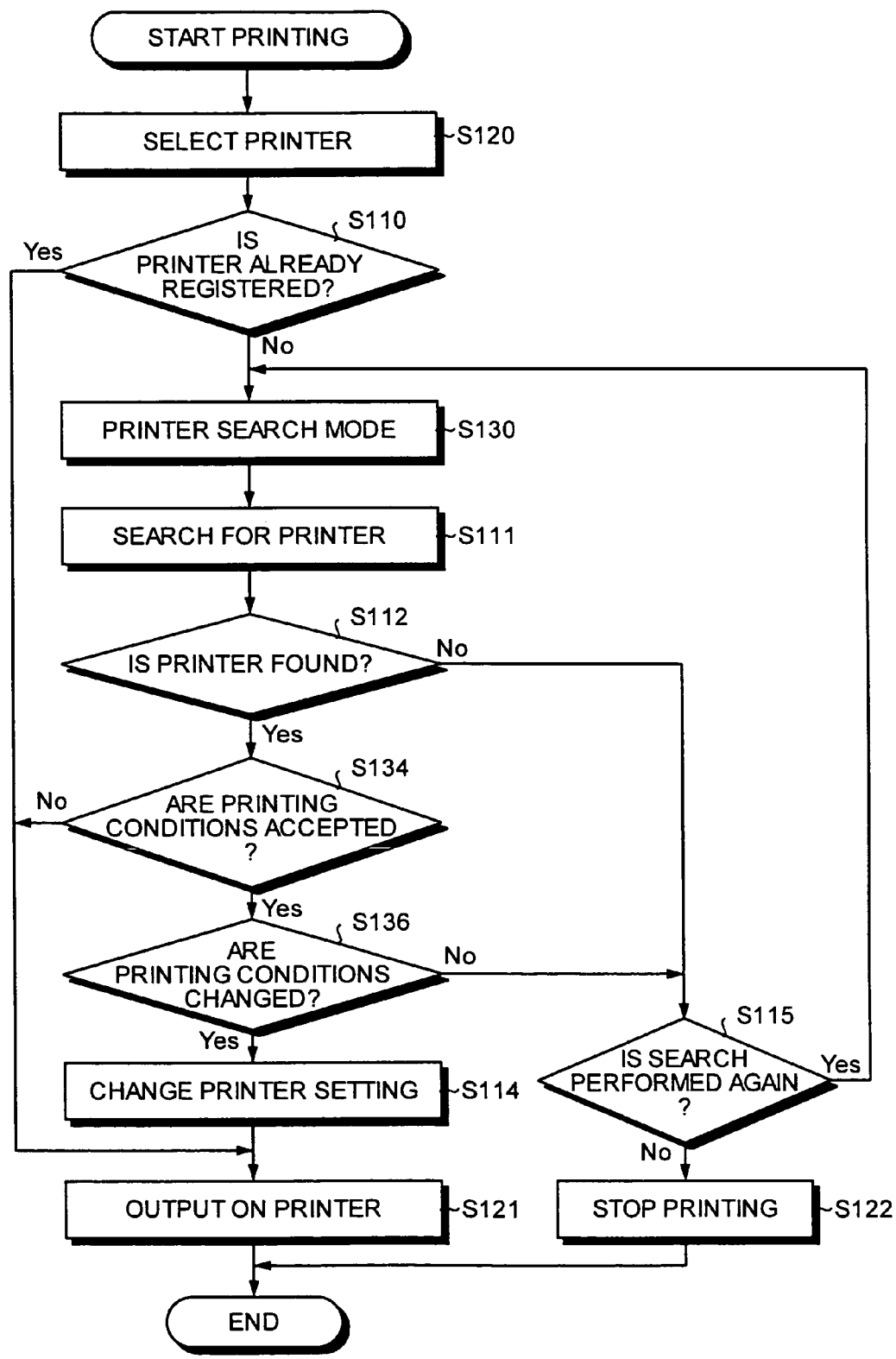
FIG. 26 is a flowchart of a detailed process of the user terminal 10 when the first printer 20a is selected.

FIG. 26 is a flowchart of a detailed process of the user terminal 10 in the printer selecting process. FIG. 26 depicts the process when a printer search mode is set in the user terminal 10.

Same steps in FIG. 26 are designated by same step numbers in FIGS. 23 and 24. At the printer search mode, when the first printer 20a selected by the printer selecting process satisfies the printing conditions specified by the user terminal 10, it automatically executes the printing process.

When the printer search mode is set in the user terminal 10 (step S130), the printer search process is executed (step S111). When the first printer 20a is found (step S112), a determination is made whether the found first printer 20a conforms to the printing conditions set in the user terminal 10 by the user. When the determination is made that the first printer 20a conforms to the printing conditions (Yes at step S134), the printing data are transmitted to the found first printer 20a so as to be output therefrom (step S121).

On the other hand, the determination is made that the first printer 20a found does not conform to the printing conditions set in the user terminal 10 by the user (No at step S134), the user terminal 10 waits for an instruction to change the printing conditions from the user. When the user instructs the change in the printing conditions (Yes at step S136), the printing conditions are changed and the setting of the found first printer 20a is registered (step S114). The sequence goes to step S121. When the user does not instruct the change in the printing conditions, the sequence again goes to the search process (step S115).

The user terminal 10 which searches for the first printer 20a as the communication destination holds, for example, a host name, a central processing unit (CPU) performance, a mounted memory, an operating system (OS) name, and a version name of the OS as the printing conditions. More specifically, the printing conditions are, for example, "HOST=MYPC1", "CPU=2000 MHz", "RAM=1204 MB", "OS=MyOS 55", and "VERSION=1.0".

The first printer 20a which searches for the user terminal 10 as the communication destination holds basic print setting information and related OS, and the like in the first printer 20a as the printing conditions. More specifically, the pieces of print setting information are, for example, "RESOLUTION=600 dpi", "OS=MyOS 55, MyOS 50", "A3=Enable", and "COLOR=FALSE".

When the user terminal 10 specifies the first printer 20a, it acquires the printing conditions relating to the printing process from the first printer 20a. The user terminal 10 determines whether the obtained printing conditions conform to the printing conditions held in the user terminal 10.

For example, after the user terminal 10, which tries to execute printing on paper of A3, transmits a message including the printing conditions, it waits for a notice message. At this time, the user terminal 10 receives the notice message from a printer that cannot execute the printing on paper of A3. The user makes the user terminal 10 to display basic specifications or the like of the printer as well as the notice message. As a result, the user presses a "cancel" button or the like based on the information such as the basic specifications so as to be capable of selecting whether the process for connection with the printer is continued or stopped. This can eliminate useless processes such as useless communication, and useless setting of a printer driver.

For example, after a printer which is not supported by OS "MyOS40" transmits a notice message, it waits for a search message. At this time, when the printer receives the search message from a user terminal into which MyOS40 is installed, the printer sends a message representing that MyOS40 is not supported. This can eliminate useless communications or the like similarly to the above case.

In such a manner, a basic attribute of a device is enclosed in the search message or the notice message so that the messages are transmitted. A receiving side receives the information, and when the counterpart device cannot be used, a message representing that the device cannot be used is sent. When the counterpart device cannot recognize the attribute, the device is ignored. That is to say, the receiving side does not determine the counterpart device as the communication destination.

Figure 27:
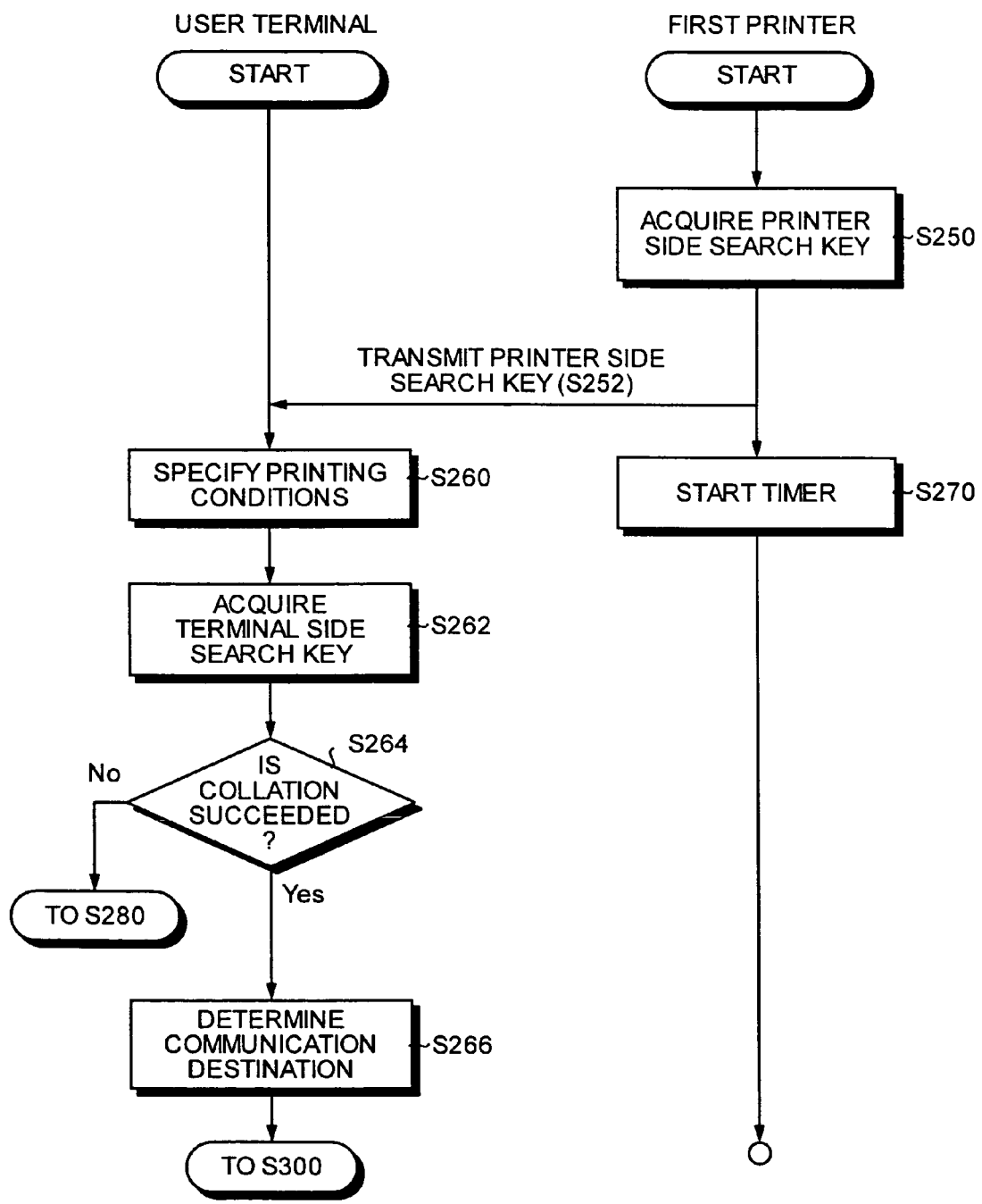
Figure 28:
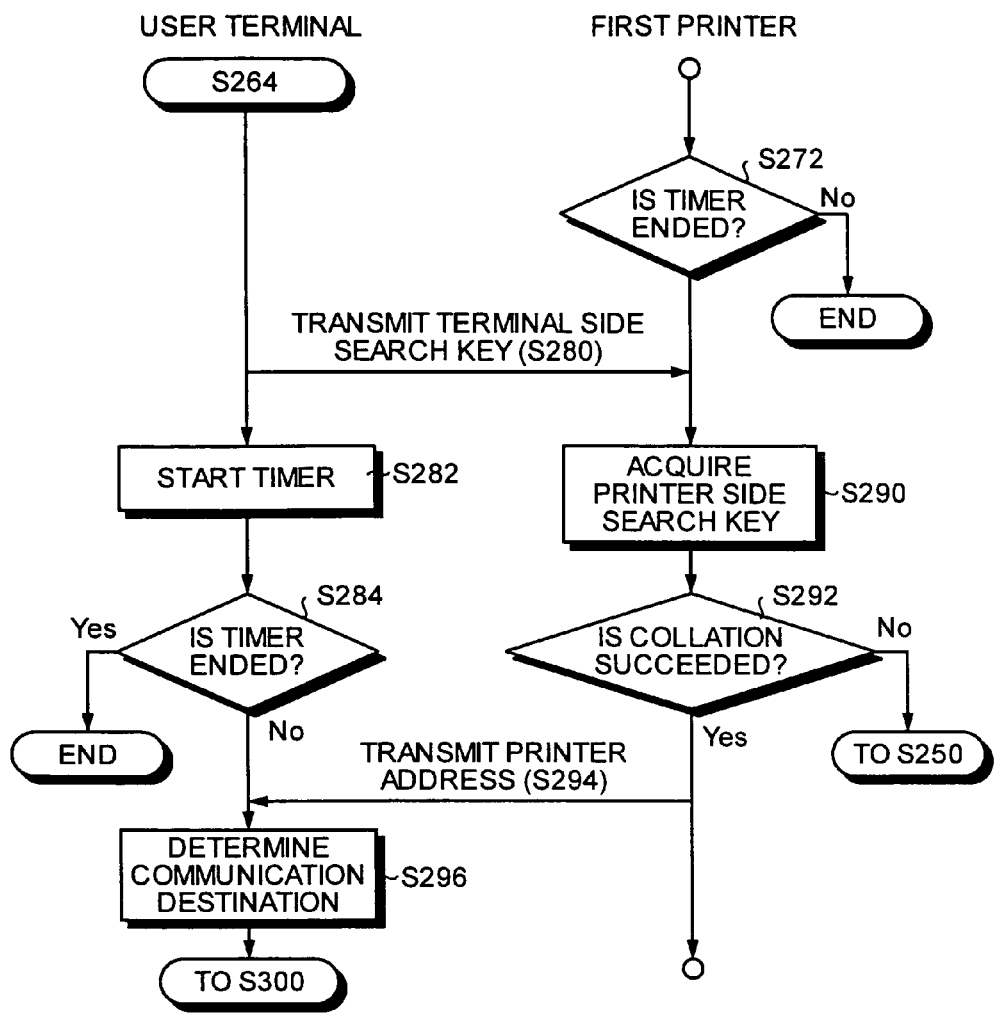

FIGS. 27 and 28 are flowcharts of processes when the user inputs the search key (printer side search key) into the first printer 20a in the printer selecting process (step S120) shown in FIG. 4.

In FIG. 27, when the user inputs the printer side search key into the first printer 20a, the acquiring unit 102 acquires the printer side search key via the user interface 120 (step S250). The communication unit 230 transmits the printer side search key acquired by the acquired unit 202 (step S252) by broadcast. The timer 212 starts the count of the timer (step S270).

In the user terminal 10, the communication unit 130 receives the printer side search key, and the user inputs the printing conditions and the terminal side search key. The printing condition setting unit 108 sets the printing conditions according to the user's input (step S260). The acquiring unit 102 acquires the terminal side search key (step S626). The matching unit 104 matches the terminal side search key acquired by the acquiring unit 102 with the printer side search key received by the communication unit 130. When the collation is succeeded (Yes at step S264), the communication-destination determining unit 106 of the user terminal 10 determines the first printer 20a which is the transmission source of the printer side search key as the communication destination (step S266). The sequence goes to the printing data transmitting process (step S300).

On the other hand, when the collation is not succeeded (No at step S264), as shown in FIG. 28, the communication unit 130 of the user terminal 10 transmits the terminal side search key acquired at step S262 (step S280) by broadcast. The timer 112 starts the count of the timer (step S282).

When the first printer 20a receives the terminal side search key before the count is ended (No at step S272), similarly to the process after step S21 explained with reference to FIG. 5, the acquiring unit 202 acquires the printer side search key input from the user (step S290). When the collation is succeeded (Yes at step S292), the communication unit 230 of the first printer 20a transmits an address of the first printer 20a to the user terminal 10 as the transmission source of the terminal side search key (step S294) by unicast.

At this time, the communication unit 230 may transmit the printer address using a UDP packet. As another example, a transmission control protocol (TCP) packet may be used. After the counterpart device is specified, the unicast transmission is executed instead of the broadcast transmission, thereby improving the security level and reducing the volume of communication data.

When the user terminal 10 receives the printer address before the count is completed (No at step S284), it determines the printer address as the transmission destination of the printing data (step S296). The sequence goes to the printing data transmitting process (step S300).

On the other hand, when the collation is not succeeded at step S292, the sequence returns to step S250 so that the sequence again waits for the input of the printer side search key.

In the printing system 1 according to the first embodiment, since any one of the user terminal 10 and the first printer 20a can execute the collating process for specifying the other communication apparatus, the convenience for the user can be improved.

In the process explained with reference to FIGS. 27 and 28, the user terminal 10 and the first printer 20a constitute the first apparatus and the second apparatus according to the first aspect of the invention, respectively. The terminal side search key obtained by the user terminal 10 at step S262 in the process and the terminal side search key transmitted from the user terminal 10 at step S280 correspond to first identification information according to the first aspect of the invention. The printer side search key transmitted from the first printer 20a at step S252 in the process corresponds to second identification information according to the first aspect of the invention. Further, the printer side search key acquired by the first printer 20a at step S290 corresponds to third identification information according to the first aspect of the invention.

Figure 29:
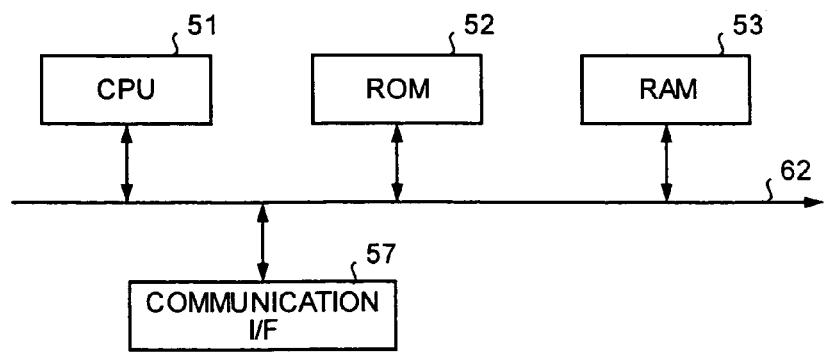
FIG. 29 is a diagram of a hardware constitution of the user terminal 10.

FIG. 29 is a diagram of a hardware constitution of the user terminal 10. The user terminal 10 has a read only memory (ROM) 52, a CPU 51, a random access memory (RAM) 53, a communication I/F 57, and a bus 62 as the hardware constitution. Programs or the like for executing the communication process in the user terminal 10 are stored in the ROM 52. The CPU 51 controls the respective units of the user terminal 10 according to the programs in the ROM 52 so as to execute the communication process or the like. A work area is formed in the RAM 53, and various data which are necessary for controlling the user terminal 10 are stored therein. The communication I/F 57 is connected to the network so as to execute communication. The bus 62 connects the respective units.

The communication program for executing a document management process in the user terminal 10 is registered and distributed in a computer readable recording medium, such as a CD-ROM, a Floppy® disc (FD), or a digital versatile disk (DVD), in a file having an installable or executable format.

The communication program in this embodiment may be stored in a computer connected to a network such as the Internet, and downloaded via the network so as to be distributed.

In this case, the communication program is read from the recording medium and is executed on the user terminal 10 so as to be loaded onto a main storage device. The respective units explained in the software constitution are generated on the main storage device.

The communication program in this embodiment is read from the recording medium and is executed by the user terminal 10 so as to be loaded onto the main storage device. The respective units explained in the software constitution are generated on the main storage unit.

A hardware constitution of the first printer 20a according to the first embodiment is similar to the hardware constitution of the user terminal 10 explained with reference to FIG. 29.

In the first embodiment, the communication destination specifying process for determining the communication destination relating to a pair of the search keys is explained. For example, however, when the user terminals 10 which are owned by a plurality of users are connected in the printing system 1, the communication between the printer 20 and the user terminals 10 may be established.

Figure 30:
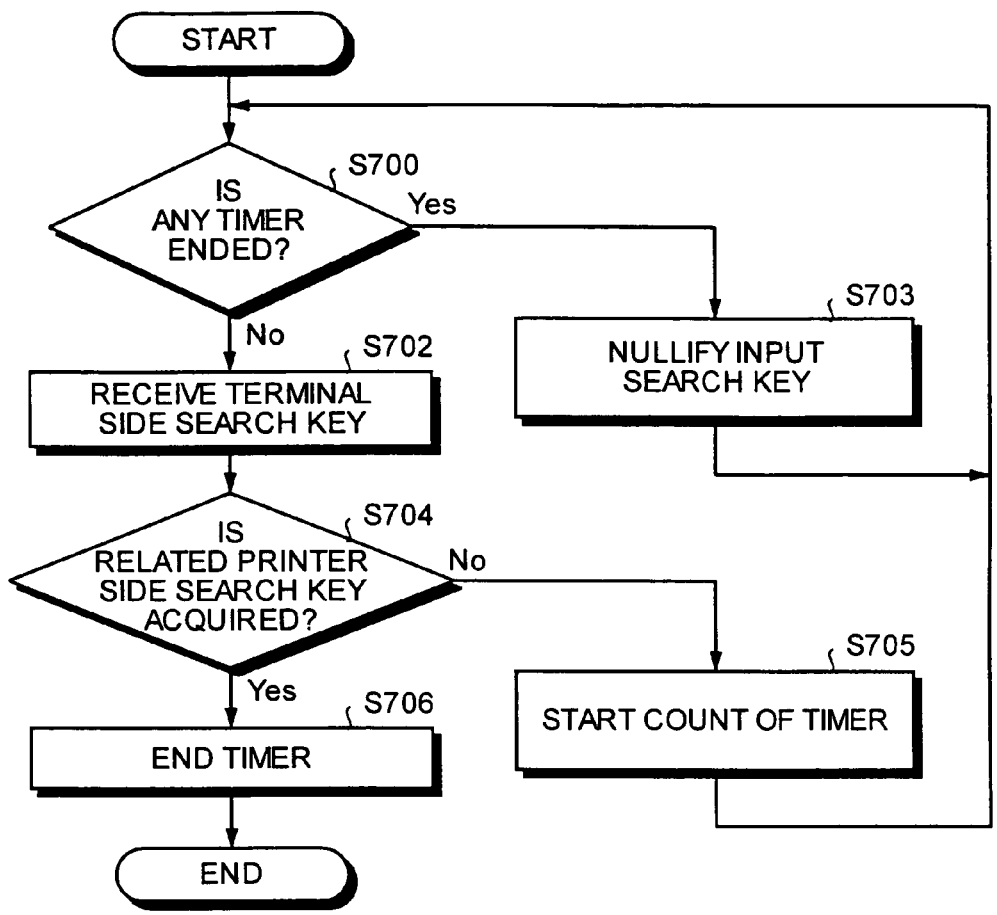
FIG. 30 is a flowchart of a timer process of the user terminal 10 according to another example.

FIG. 30 is a flowchart of the process in the first printer 20a when the user terminals 10 owned by the users are connected in the printing system 1, and the communication between the user terminals 10 and the first printer 20a is established. The users input different printer side search keys into the user terminals 10, respectively, and the user terminals 10 are in a waiting state such that they wait for reception of terminal side search keys related with the printer side search keys. When the count for any one of the printer side search keys is, completed (step S700), this printer side search key is nullified (step S703). That is to say, even if the terminal side search key related with this printer side search key is received thereafter, the collating process is not executed.

On the other hand, the terminal side search key is received before the count is completed (No at step S700 and step S702). The printer side search key related with the received terminal side search key is already acquired (Yes at step S704). In this case, when the terminal side search key coincides with the printer side search key, the communication destination is specified, and the corresponding count is completed (step S706).

When the terminal side search key is not acquired at step S704, a new count of the timer is started (step S705), and the sequence is in the waiting state until the related search key is acquired. In such a manner, the first printer 20a can establish the communication with the user terminals 10 simultaneously.

At this time, when a different search key is further received, the count of the timer is started, and the sequence waits for reception of a search key related with this search key. When after the waiting for all the search keys, related search keys are input, the collating process is not executed.

With reference to FIG. 30, an example that the different printer side search keys are input into the first printer 20a is explained. Also, when the first printer 20a receives a plurality of terminal side search keys from the user terminals 10 and waits for input of printer side search keys related with the received terminal side search keys, the counting process of the timer which is similar to the process explained with reference to FIG. 30 is executed.

In the first embodiment, for example, when the user terminal 10 receives the input of the printer side search key and receives the terminal side search key from the first printer 20a. Like this case, when the collation of the related search keys is succeeded, the related count is completed, so that the setting of the printer is started. After a first terminal side search key which coincides with a predetermined printer side search key is received, therefore, even if a second terminal side search key which coincides with the printer side search key is received, the second terminal side search key is nullified. The second terminal side search key is not matched with the printer side search key. As a result, the first search key is present in the effective state, thereby preventing the collating process from being complicated and the processing speed from being lowered.

As another example, the user terminal 10 receives the input of the printer side search key and receives the first terminal side search key which coincides with the printer side search key from the first printer 20a. In this case, the count does not have to be completed. That is to say, when the user terminal 10 receives the second terminal side search key which coincides with the printer side search key thereafter, the second terminal side search key may be enabled. In this case, the first terminal side search key is received, the printer selecting process, which includes the collating process between the printer side search key and the first terminal side search key, is executed, and the second side terminal search key is received. At this time, the printer selecting process, which includes the collating process between the printer side search key and the second terminal side search key, is executed.

As a result, even when, for example, the user terminal 10 executes the process for establishing the communication using the same search key is executed, the communication can be established.

The first embodiment explains the example that the communication between the user terminal 10 and the first printer 20a in the network, but as another example, the communication process in this embodiment may be applied to the example that the network includes a plurality of user terminals 10, and two user terminals 10 establish the communication.

Figure 31:
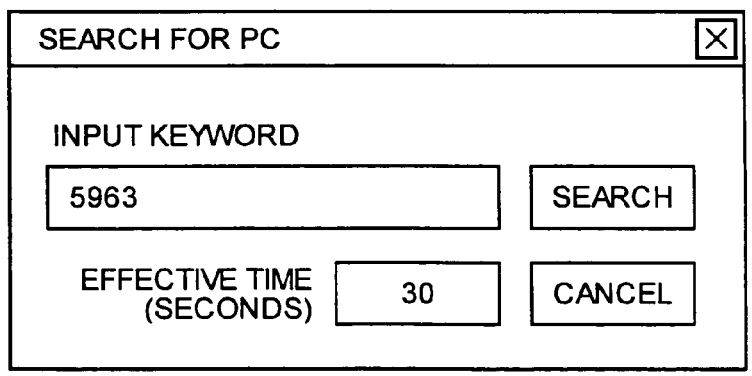
FIG. 31 is a diagram of a search screen of the user terminal 10 displayed on the user terminal 10 when communication is established between the user terminals 10.

FIG. 31 is a diagram of a search screen for the user terminals 10 displayed on the user terminals 10 when the user terminals 10 communicate with each other. Also when the user terminals 10 establish the communication with each other, the users input search keys for identifying the communication between the two user terminals 10 into the user terminals 10, and the input search keys coincide with each other on the user terminals 10. At this time, the communication between the user terminals 10 can be established when the communication between the user terminal 10 and the first printer 20a is established.

FIG. 32 is a diagram of an entire constitution of the printing system 1 according to a second embodiment of the present invention. The printing system 1 according to the second embodiment has an authentication server 30 which communicates with another device via the network in addition to the constitution of the printing system 1 in the first embodiment. When the authentication server 30 succeeds in authentication, the process for determining communication destination is executed. The printing system 1 according to the second embodiment is different from the printing system 1 according to the first embodiment in this point.

FIG. 33 is a block diagram of a functional constitution of the authentication server 30. The authentication server 30 has a communication unit 330, an authenticating unit 340, and an authentication table 342.

The communication unit 330 transmits/receives information to/from other devices via a network. The authenticating unit 340 authenticates a user of a device to execute the communication process based on authentication information received via the communication unit 330. The communication unit 330 utilizes the authentication table 342 at this time.

FIG. 34 is a diagram of a data constitution of the authentication table 342. In the authentication table 342, user IDs for identifying registered users are related with search keys allocated to the users. Specifically, the authentication table 342 has a user ID field, an authentication information field, and a search key field. When the authenticating unit 340 receives the authentication information stored in the authentication field from a user specified by the user ID, it determines that the authentication of the user is succeeded. In this case, the search key stored in the search key field is used as a search key input from the user.

The hardware constitution of the authentication server 30 is similar to the hardware constitution of the user terminal 10 explained with reference to FIG. 29 in the first embodiment.

Figure 35:
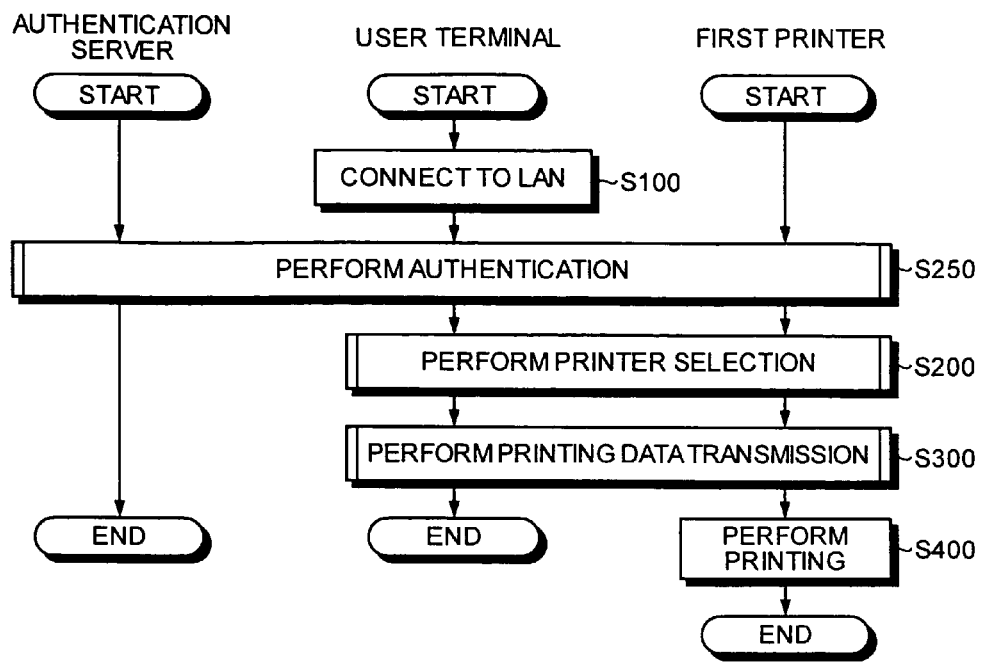
FIG. 35 is a flowchart of a communication sequence according to the second embodiment.

FIG. 35 is a flowchart of a communication sequence according to the second embodiment. In the second embodiment, when the user terminal 10 is connected to the LAN (step S100), an authentication process (step S250) is executed. When the authentication process is succeeded, the printer selecting process (step S200), the printing data transmitting process (step S300), and the printing process (step S400) explained in the first embodiment are executed. The printing system 1 according to the second embodiment executes the communication process only when the authentication is succeeded, thereby preventing a malicious third person from connecting to the LAN and improving the security level.

Figure 36:
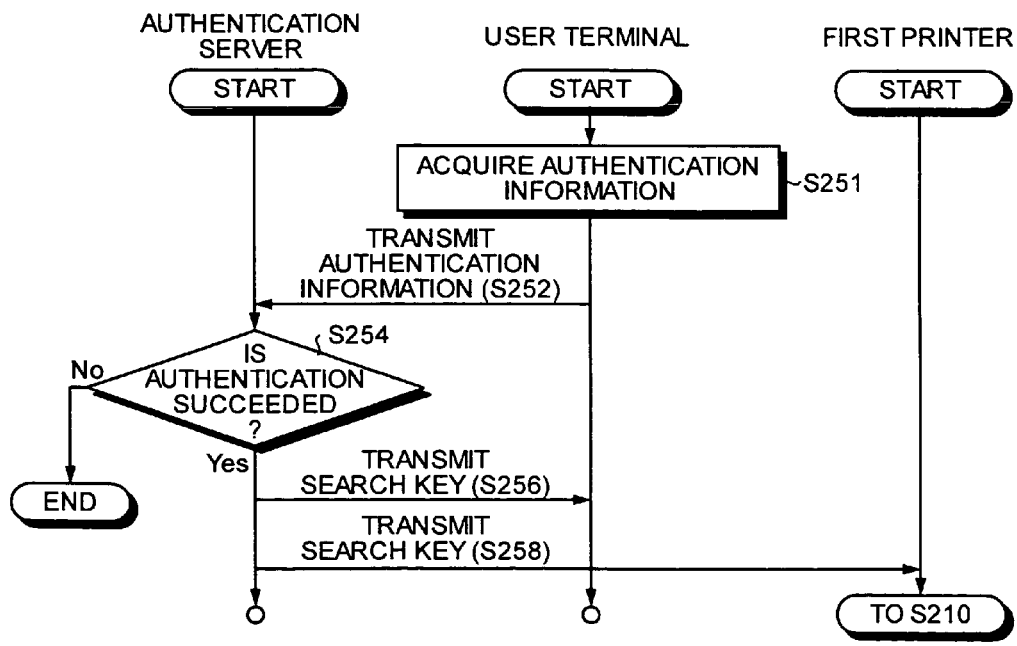
FIG. 36 is a flowchart of a detailed process in an authentication process (step S250) shown in FIG. 35.

FIG. 36 is a flowchart of a detailed process in the authentication process (step S250) shown in FIG. 35. In the second embodiment, after the user terminal 10 is connected with the LAN (step S100), the user inputs the authentication information registered in the authentication table 342 in advance into the user terminal 10. The communication unit 130 transmits the input authentication information to the authentication server 30 (step S252). The authentication information is desirably transmitted by unicast, but may be transmitted by broadcast transmission.

When the communication unit 330 of the authentication server 30 receives the authentication information from the user terminal 10, the authenticating unit 340 authenticates the user while referring to the authentication table 342. When the authentication is succeeded, the communication unit 330 extracts the search key related with the user ID in the authentication table 342. The communication unit 330 transmits the search key received from the authenticating unit 340 as the terminal side search key to the user terminal 10 and the first printer 20a (steps S256 and S258). The sequence goes to the printer searching process (step S200) explained in the first embodiment.

More specifically, the user goes to the printer from which the user wishes to output data, and puts a finger on a fingerprint authentication module provided to the printer, so that the fingerprint is scanned. The user presses a "transmit notice message" button. The first printer 20a transmits characteristic data of a scanned fingerprint image to the set authentication server 30. The authentication server 30 matches the managed characteristic data of the fingerprint with the received fingerprint data so as to specify a corresponding user.

When the authentication server 30 determines that the corresponding user is not registered, it sends a message of a failure of the authentication to the printer. In this case, the authentication is conducted again. On the other hand, when the authentication is succeeded and the authenticated user is specified, the search key which is related with the specified user is transmitted to the printer. The printer which receives the authenticated result transmits a notice message including the received search key. It is desirable that the authentication success is indicated on the screen display of the operation panel.

Figure 37:
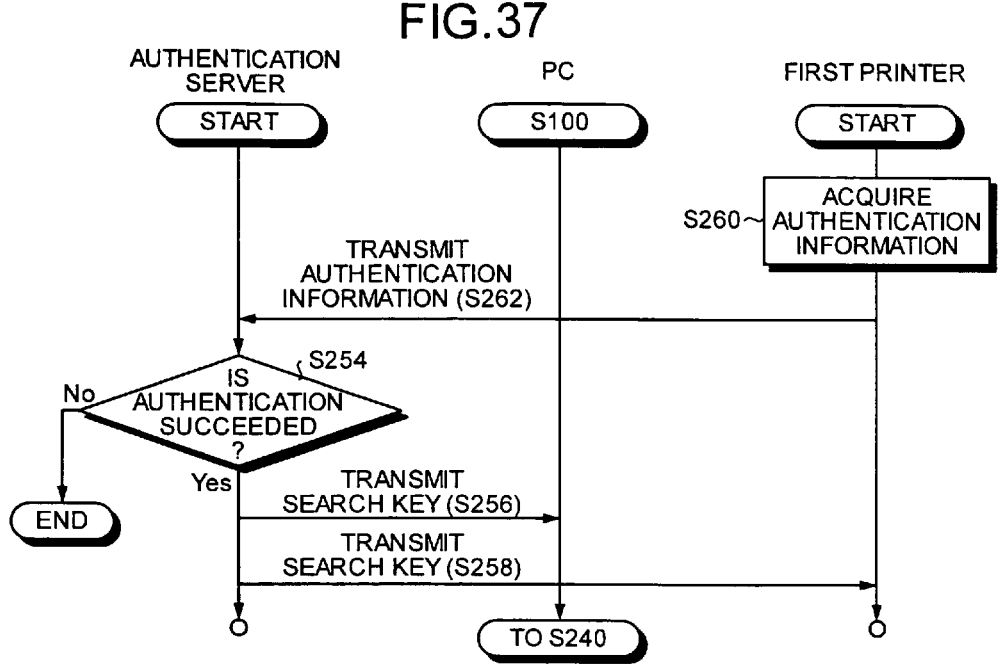
FIG. 37 is a flowchart of another example of the detailed process in the authentication process (step S250) shown in FIG. 35.

FIG. 37 is a flowchart of another example of a detailed process in the authentication process (step S250) shown in FIG. 35. FIG. 36 depicts the process when the user inputs the authentication information into the user terminal 10. FIG. 37, however, depicts the process when the user inputs the authentication information into the first printer 20a. In this case, after the user terminal 10 is connected with the LAN (step S100), the user inputs the authentication information registered in the authentication table 342 in advance into the first printer 20a. The communication unit 230 transmits the input information to the authentication server 30 (step S262). When the authentication server 30 succeeds in the authentication of the user, the search key related with the user ID in the authentication table 342 is transmitted as the printer side search key to the user terminal 10 and the first printer 20a (steps S256 and S258).

More specifically, the user puts a finger on the fingerprint authentication module provided to the user terminal 10 so that the fingerprint is scanned. The user operates the user terminal 10 so as to press the "transmit search message" button. The user terminal 10 transmits characteristic data of a scanned fingerprint image to the set authentication server 30. The authentication server 30 matches the characteristic data of the managed fingerprint with the received fingerprint data so as to specify the corresponding user. When the authentication server 30 determines that the corresponding user is not registered, it sends a message of a failure of the authentication to the printer.

On the other hand, when the authentication is succeeded and the permitted user is specified, the search key to be used by the user is transmitted to the user terminal 10. The printer which receives the authenticated result transmits a search message having the received search key. It is desirable that the success of the authentication is displayed on the display device of the user terminal 10. The operations thereafter are the same as those in the explained embodiment.

In the second embodiment, the process for authenticating a user is executed before the communication process, thereby improving the security level.

Other constitutions and the operation of the printing system 1 according to the second embodiment are similar to those in the printing system 1 according to the first embodiment.

As another example, main units of the first printer 20a and the user terminal 10 may have an image sensor, a microphone, and units that recognize their characteristics, and user IDs related with the characteristics may be stored therein. Specifically, the first printer 20a and the user terminal 10 have at least one of a fingerprint recognizing module, an iris recognizing module, an autograph handwriting analyzing module, and a voice recognizing module. Their characteristics may be related with the user IDs so as to be stored. This improves the security level of the devices, and can narrow down persons who can use the devices.

The authentication server 30 does not have to be connected to the subnet which is the same as that of the user terminal 10 and the first printer 20a. In the second embodiment, the authentication process is executed based on the authentication information acquired by any one of the user terminal 10 and the first printer 20a. As another example, however, the authentication information is acquired from both the user terminal 10 and the first printer 20a, so that a user may be authenticated based on the authentication information. This enables the security level to be further improved.

As another example, in a second embodiment, the search keys are related with the user IDs so as to be stored in the authentication table 342, but only the user IDs and authentication information may be stored in the authentication table 342. In this case, when succeeding in the authentication, the authentication server 30 transmits the authentication information as the terminal side search key or the printer side search key to the user terminal 10 and the first printer 20a.

The printing system 1 according to the second embodiment has the authentication server 30 which executes the authentication process, but in a third embodiment of the present invention, the first printer 20a executes the authentication process. The printing system 1 has, therefore, only two printers similarly to the first embodiment, and thus does not have to have the authentication server 30. The printing system 1 according to the third embodiment is different from the printing system 1 according to the other embodiments in this point.

Figure 38:
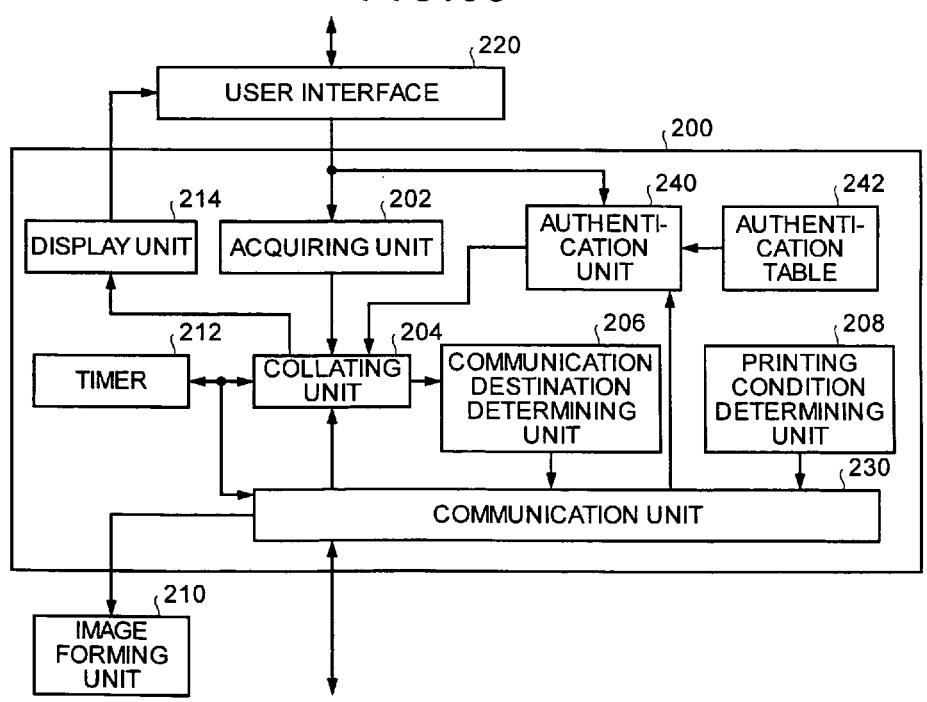
FIG. 38 is a block diagram of a functional constitution of a communication processing unit 200 according to a third embodiment.

FIG. 38 is a block diagram of a functional constitution of the communication processing unit 200 of the first printer 20a according to the third embodiment. The communication processing unit 200 according to the third embodiment further has an authenticating unit 240 and an authentication table 242 in addition to the functional constitution of the communication processing unit 200 in the first embodiment. The authenticating unit 240 authenticates authentication information input by a user via the user inter face 220 and authentication information received externally via the communication unit 230 utilizing the authentication table 242. When the authenticating unit 240 succeeds in the authentication, it permits the collating process in the matching unit 204.

FIG. 39 is a flowchart of the authentication process according to the third embodiment. FIG. 39 is the flowchart of the process when the user inputs the authentication information into the user terminal 10. When the user inputs the authentication information into the user terminal 10, the acquiring unit 102 acquires the authentication information (step S260), and the communication unit 130 transmits the authentication information to the first printer 20a (step S261). The first printer 20a authenticates the user based on the received authentication information. When succeeding in the authentication (Yes at step S262), the first printer 20a transmits a search key related with the user in the authentication table 242 as a terminal side search key to the user terminal (step S263). The sequence goes to step S210 according to the first embodiment.

FIG. 40 is a flowchart of another example of the authentication information according to the third embodiment. FIG. 40 is the flowchart of the process when the user inputs the authentication information into the first printer 20a. When the user inputs the authentication information into the first printer 20a, the acquiring unit 202 acquires the authentication information (step S265), and executes the authentication process. When succeeding in the authentication (Yes at step S266), the first printer 20a transmits a search key related with the user in the authentication table 242 as a printer side search key to the user terminal 10 (step S267). The sequence goes to step S244 according to the first embodiment.

In the third embodiment, the authentication process is executed based on the authentication information acquired by any one of the user terminal 10 and the first printer 20a. As another example, however, the authentication information may be acquired from both the user terminal 10 and the first printer 20a, so that the user is authenticated based on the authentication information. As a result, the security level is improved.

Other constitutions and the operation of the printing system 1 according to the third embodiment are similar to those in the printing system 1 according to the first embodiment.

Figure 41:
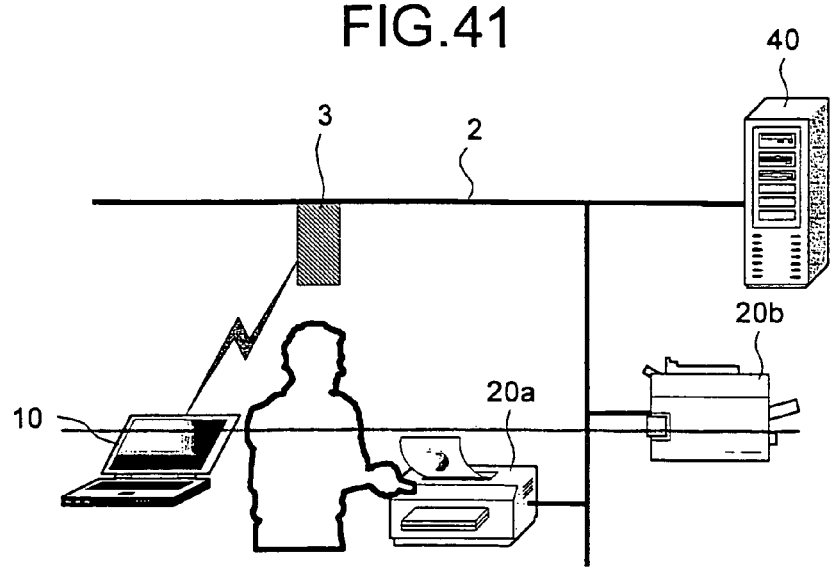
FIG. 41 is a diagram of an entire constitution of the printing system 1 according to a fourth embodiment.

FIG. 41 is a diagram of an entire constitution of the printing system 1 according to a fourth embodiment of the present invention. The printing system 1 according to the third embodiment further has a communication control unit 40 that communicates with other devices via the network in addition to the constitution of the printing system 1 according to the first embodiment. The communication between the user terminal 10 and the first printer 20a is executed via the communication control unit 40. The printing system 1 according to the fourth embodiment is different from the printing system according to the other embodiments in this point.

Figure 42:
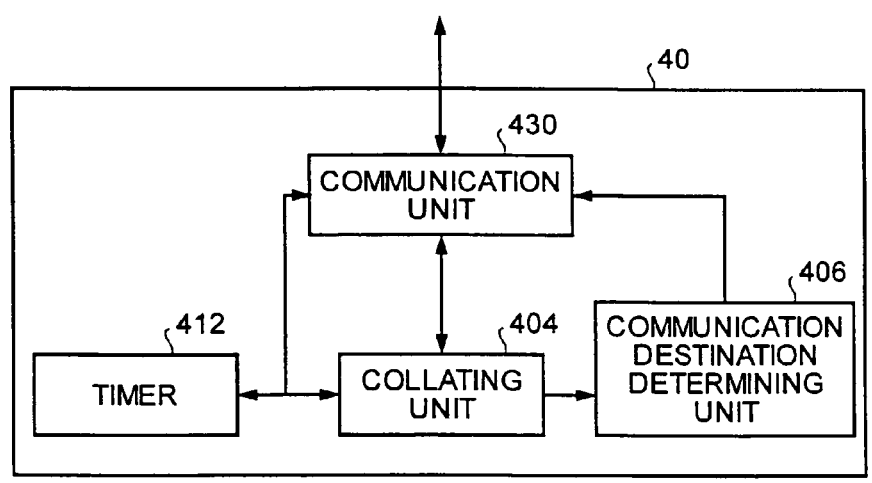
FIG. 42 is a block diagram of a functional constitution of a communication control unit 40.

FIG. 42 is a block diagram of a functional constitution of the communication control unit 40. The communication control unit 40 has a communication unit 430, a matching unit 404, a communication-destination determining unit 406, and a timer 412. The communication unit 403 transmits/receives information to/from another device. The matching unit 404 matches a received search key via the communication unit 430. The communication-destination determining unit 406 determines the communication destination of a predetermined device based on the result from the communication-destination determining unit 406. That is to say, two devices that communicate with each other are determined. When the communication unit 430 receives the first search key, the timer 412 counts the time until a second search key related with the first search key is received.

The hardware constitution of the communication control unit 40 is similar to the hardware constitution of the user terminal 10 explained with reference to FIG. 29 in the first embodiment.

Figure 43:
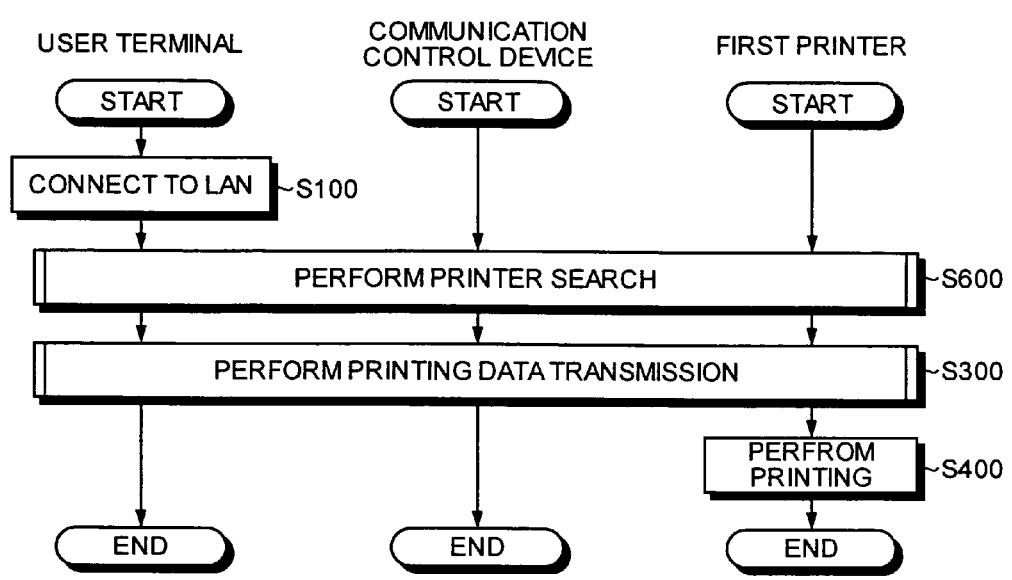
FIG. 43 is a flowchart of a communication sequence according to the fourth embodiment.

FIG. 43 is a flowchart of a communication sequence according to the fourth embodiment. In the fourth embodiment, when the user terminal 10 is connected to LAN (step S100) similarly to the first embodiment, the printer search process (step S600), the printing data transmitting process (step S300), and the printing process (step S400) are executed in this order. In the fourth embodiment, the communication control unit 40 mediates the communication between the user terminal 10 and the first printer 20a in the printer search process (step S600).

As the premise of the printer search process (step S600), the user terminal 10 and the first printer 20a store a network address (IP address, MAC (Media Access Control) address) of the communication control unit 40 therein.

Figure 44:
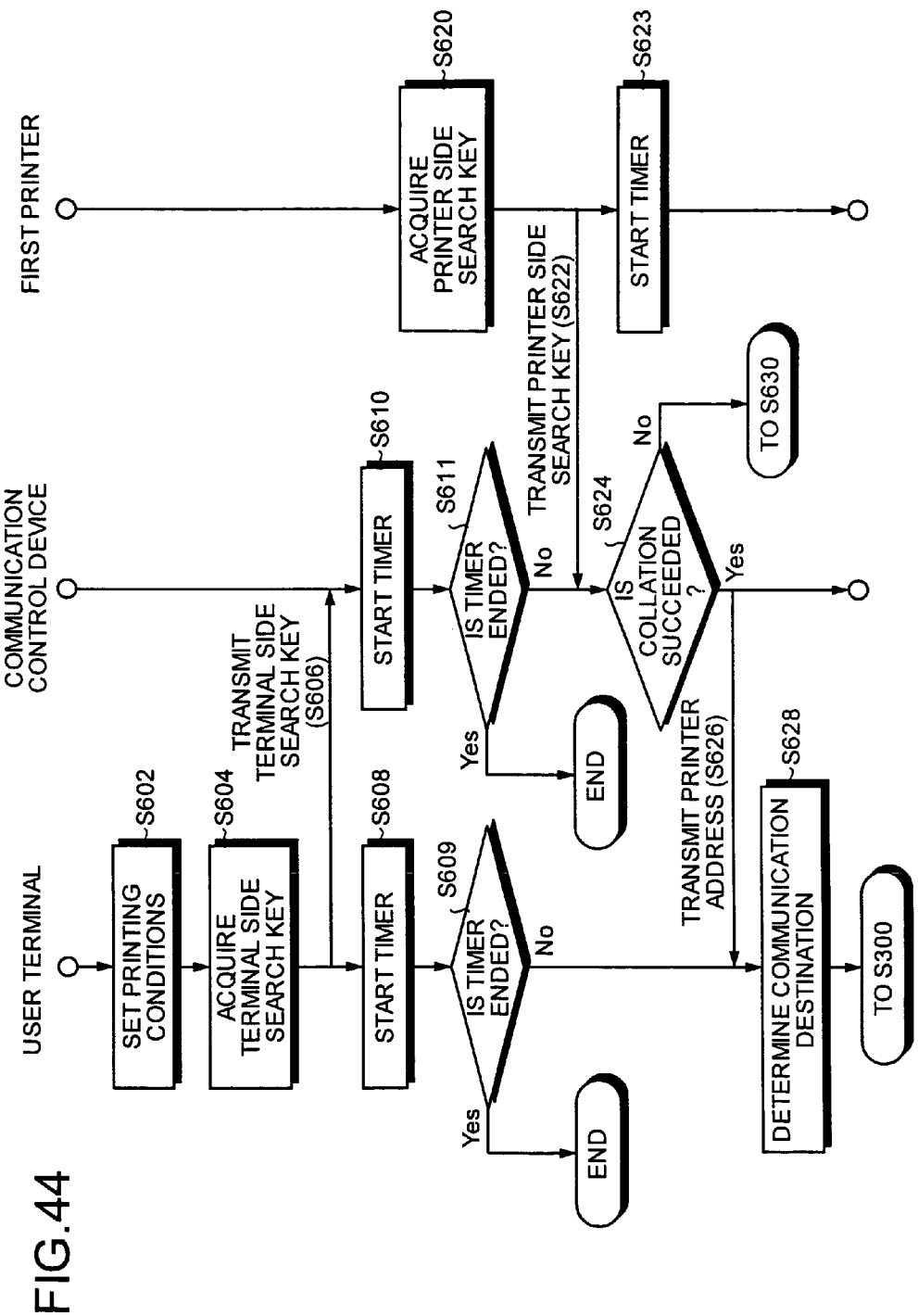
FIG. 44 is a flowchart of a detailed process in a printer search process (step S600) shown in FIG. 40.
Figure 45:
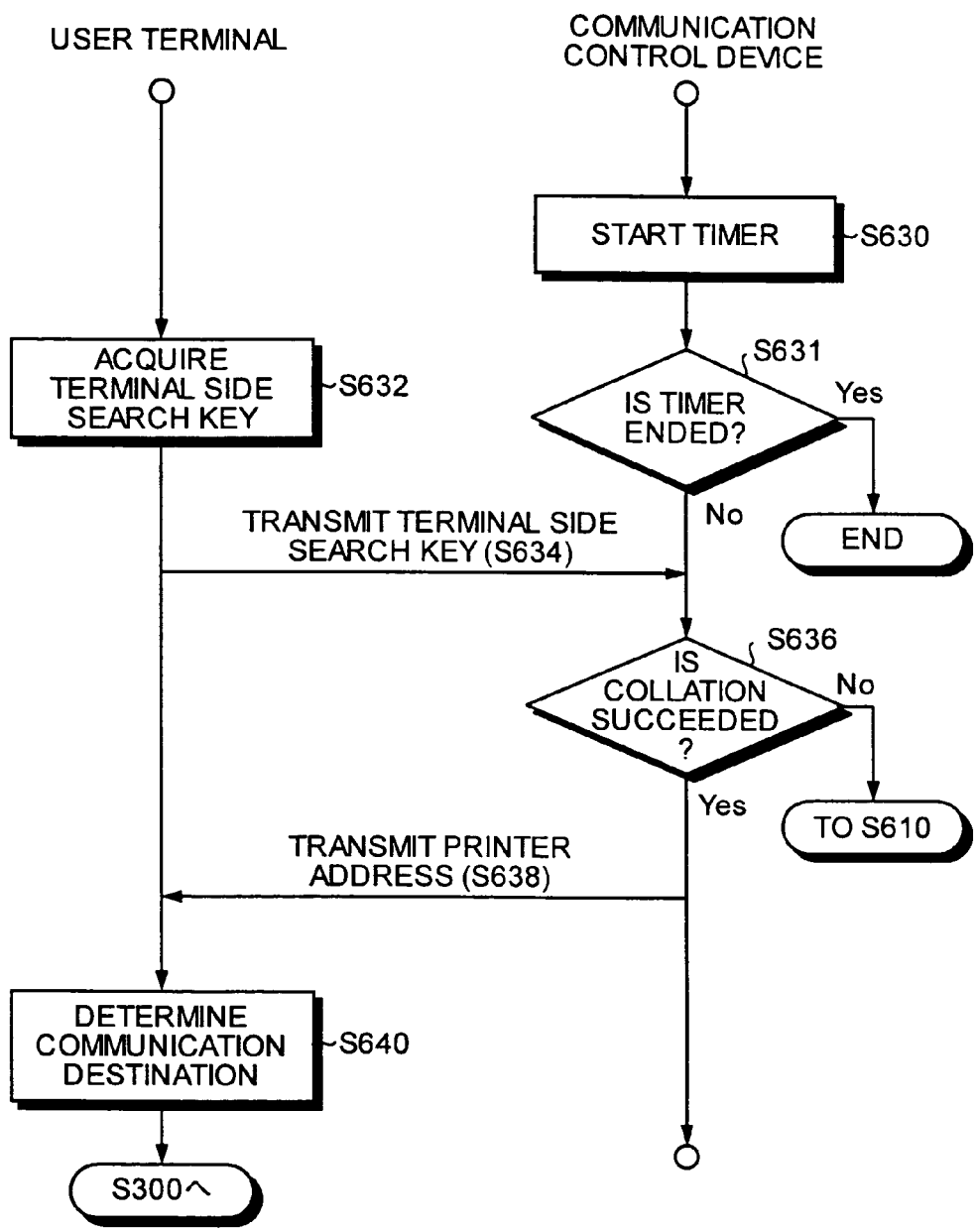
FIG. 45 is a flowchart of the detailed process in the printer search process (step S600) shown in FIG. 40.

FIGS. 44 and 45 are flowcharts of detailed processes in the printer search process (step S600) shown in FIG. 43. After the user terminal 10 is connected to the LAN (step S100), the printing condition setting unit 108 sets printing conditions based on an input from a user (step S602), and acquires a terminal side search key by inputs from the user (step S604). The communication unit 130 transmits the acquired terminal side search key to the communication control unit 40 (step S606) by unicast. The process that the user terminal 10 specifies the communication control unit 40 is explained later. The timer 112 then starts counting (step S608).

When the communication control unit 40 receives the terminal side search key, the timer 412 starts counting (step S610), and the communication control unit 40 waits for reception of a printer side search key related with the received terminal side search key.

On the other hand, the user inputs the printer side search key related with the terminal side search key input in the user terminal 10 in advance into the first printer 20*a*. When the communication unit 230 of the first printer 20*a* acquires the printer side search key (step S620), it transmits the acquired printer side search key to the communication control unit 40 (step S622) by unicast. In the fourth embodiment, the address of the communication control unit 40 is registered in the first printer 20*a* in advance. The timer 212 of the first printer 20*a* starts counting (step S623).

When the communication unit 430 of the communication control unit 40 receives the printer side search key from the first printer 20*a* before the counting of the timer 412 is completed (No at step S611), the matching unit 404 matches the received printer side search key with the terminal side search key received from the user terminal 10 previously. When the collation is succeeded, the communication-destination determining unit 406 of the communication control unit 40 determines the user terminal 10 which is the communication source of the terminal side search key and the first printer 20*a* which is the transmission source of the printer side search key as the devices that communicate with each other. The communication unit 430 transmits the address of the first printer 20*a* to the user terminal 10 (step S626) by unicast. The user terminal 10 receives the address of the first printer 20*a* from the user terminal 10, and determines the first printer 20*a* specified by the received address as the communication destination of the address (step S628). The sequence goes to the printing data transmitting process (step S300) explained with reference to FIG. 42.

On the other hand, when the matching unit 404 does not succeed in the collation (No at step S624), the timer 412 of the communication control unit 40 again starts the counting (step S630) as shown in FIG. 45. The communication control unit 40 waits for reception of the terminal side search key from the user terminal 10 again.

When the user again inputs the terminal side search key into the user terminal 10 in this state, the acquiring unit 102 of the user terminal 10 acquires the terminal side search key (step S622). The communication unit 130 transmits the terminal side search key acquired by the acquiring unit 102 to the communication control unit 40 (step S634) by unicast.

When the communication control unit 40 receives the terminal side search key before the counting of the timer 412 is completed, the matching unit 404 matches the printer side search key received from the first printer 20*a* at step S622 with the terminal side search key received from the user terminal 10 this time. When the collation is succeeded (Yes at step S636), the printer address is transmitted to the user terminal 10 (step S638) by unicast. The user terminal 10 determines the first printer 20*a* designated by the printer address as the communication destination, and the sequence goes to the printing data transmitting process (step S300).

When the collation between the terminal side search key received from the user terminal 10 at the second time and the printer side search key is not succeeded at step S636, the sequence returns to step S610. The timer 412 again starts the count of the timer, and the communication control unit 40 waits for reception of the printer side search key from the first printer 20*a*.

After receiving the terminal side search key from the user terminal 10, the communication control unit 40 receives the printer side search key from the first printer 20*a*. When the printer side search key does not coincide with the terminal side search key, the communication control unit 40 waits for reception of the terminal side search key related with the printer side search key received from the first printer 20*a* again from the user terminal 10. These search keys coincide with each other, thereby specifying the communication destination. Even if a search key is input by mistake once, only by inputting a correct search key next time, the collation is again carried out and the communication destination is specified. Accordingly, the user can perform the operation more efficiently.

Figure 46:
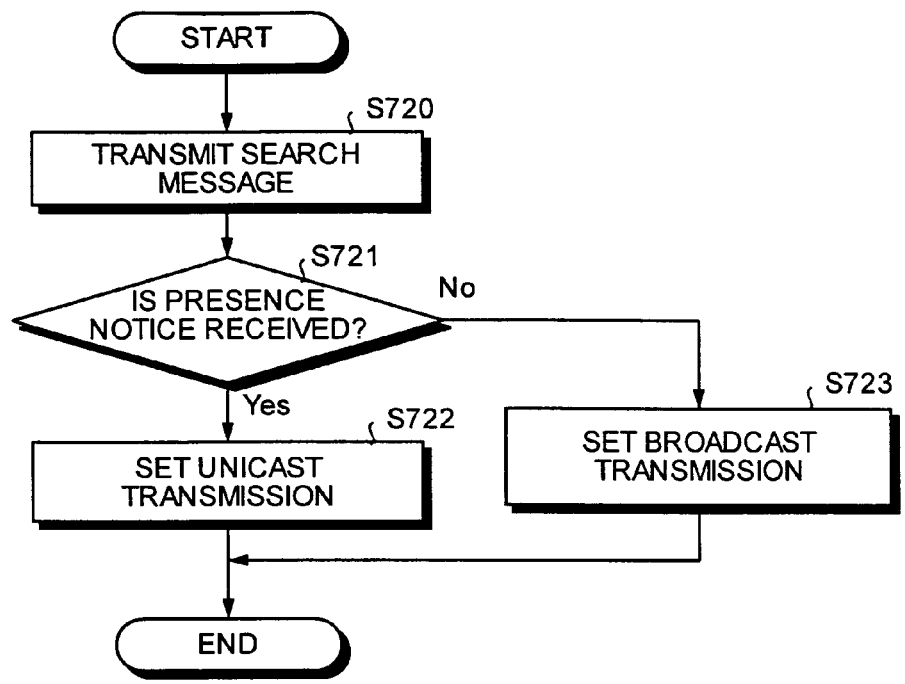
FIG. 46 is a flowchart of a search process for the user terminal 10 getting an address of an authentication server 30.

FIG. 46 is a flowchart of the search process for the user terminal 10 confirming whether the communication control unit 40 is present in the printing system, and the user terminal 10 getting the address of the communication control unit 40 when it is present.

The user terminal 10 is connected with the LAN, and transmits a search message representing that the communication control unit 40 is searched (step S720) by broadcast. The search message may be a unique search key for specifying that the communication control unit 40 is searched.

When the communication control unit 40 receives the search message from the user terminal 10, it transmits a presence notice including the presence of the communication control unit 40 and its address to the user terminal 10 by unicast. The presence notice is a notice message having the unique search key for identifying the communication control unit 40.

When the user terminal 10 receives the presence notice (Yes at step S271), it sets a transmission method for the terminal side search key and the like to the unicast transmission in which the communication control unit 40 as the transmission source of the presence notice is determined as the transmission destination (step S722). On the other hand, when predetermined time passes in the state that the user terminal 10 does not receive the presence notice (No at step S721), the user terminal 10 determines that the communication control unit 40 is not present and sets the transmission method of the terminal side search key and the like to the broadcast transmission (step S723).

When the unicast transmission is set, as explained in this embodiment, the user terminal 10 transmits the terminal side search key to the communication control unit 40 by unicast. When the broadcast transmission is set, the user terminal 10 determines that the communication control unit 40 is not present, and communicates directly with the first printer 20*a* without involving the communication control unit 40 as explained in the first embodiment.

When the communication control unit 40 is found, a search key is transmitted to the communication control unit 40 by unicast, thereby improving the security level, and the communication traffic can be reduced.

In FIG. 46, the search process of the user terminal 10 is explained, but the first printer 20*a* searches for the communication control unit 40 similarly. The process at the time when the first printer 20*a* searches for the communication control unit 40 is similar to the process of the user terminal 10 explained wit reference to FIGS. 46 and 47.

As another example, in the fourth embodiment, as explained with reference to FIGS. 46 and 47, the user terminal 10 or the first printer 20*a* transmits the search message to the communication control unit 40 so that presence of the communication control unit 40 is confirmed. Instead of this, however, the communication control unit 40 may transmit the presence notice representing that the communication control unit 40 is present in the printing system every constant time, by broadcast. As a result, the devices connected to the printing system 1 can check that the communication control unit 40 is present. The presence of the communication control unit 40 can be, therefore, automatically checked without transmitting the search message.

As still another example, in the fourth embodiment, the user terminal 10 transmits the search message for checking the presence of the communication control unit 40 only once, but the broadcast transmission by which the search message is transmitted is not limited to be once. For example, the search message may be transmitted three times by broadcast. This preferably improves accuracy of checking the presence of the communication control unit 40. Further, the unicast transmission of presence notice by the communication control unit 40 is not limited to once, and it may be made several times.

Figure 47:
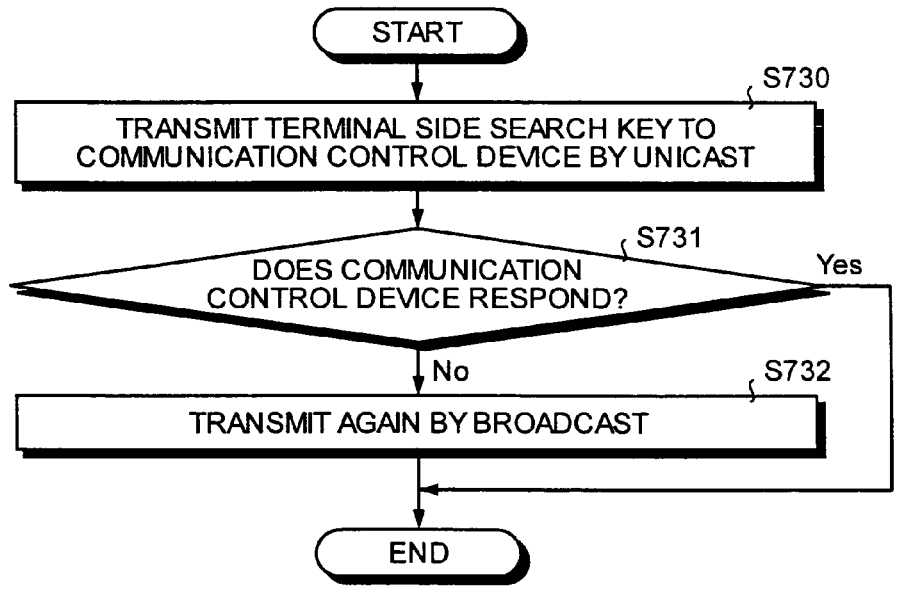
FIG. 47 is a flowchart of a terminal side search key transmitting process for transmitting a terminal side search key to the communication control unit specified by the user terminal 10 according to the search process explained with reference to FIG. 46.

FIG. 47 is a flowchart of a terminal side search key transmitting process for transmitting the terminal side search key to the communication control unit 40 specified by the user terminal 10 according to the search process explained with reference to FIG. 46.

When acquiring a terminal side search key from the user, the user terminal 10 transmits the terminal side search key to the communication control unit 40 (step S730) by unicast. The user terminal 10 waits for a response to the terminal side search key. At this time, the user terminal 10 transmits a message including the terminal side search key utilizing a TCP packet.

When the user terminal receives the response representing the reception of the terminal side search key from the communication control unit 40 (Yes at step S721), the sequence goes to the printer search process in this embodiment. When predetermined time passes in the state that the user terminal 10 does not receive the response from the communication control unit 40 (No at step S721), it again transmits the same terminal side search key (step S723) by broadcast.

The user terminal 10 checks whether the communication control unit 40 receives the terminal side search key based on the response from the communication control unit 40. When the communication control unit 40 does not receive the terminal side search key, the user terminal 10 transmits it by broadcast, so as to be capable of transmitting the terminal side search key directly to the first printer 20a.

Figure 48:
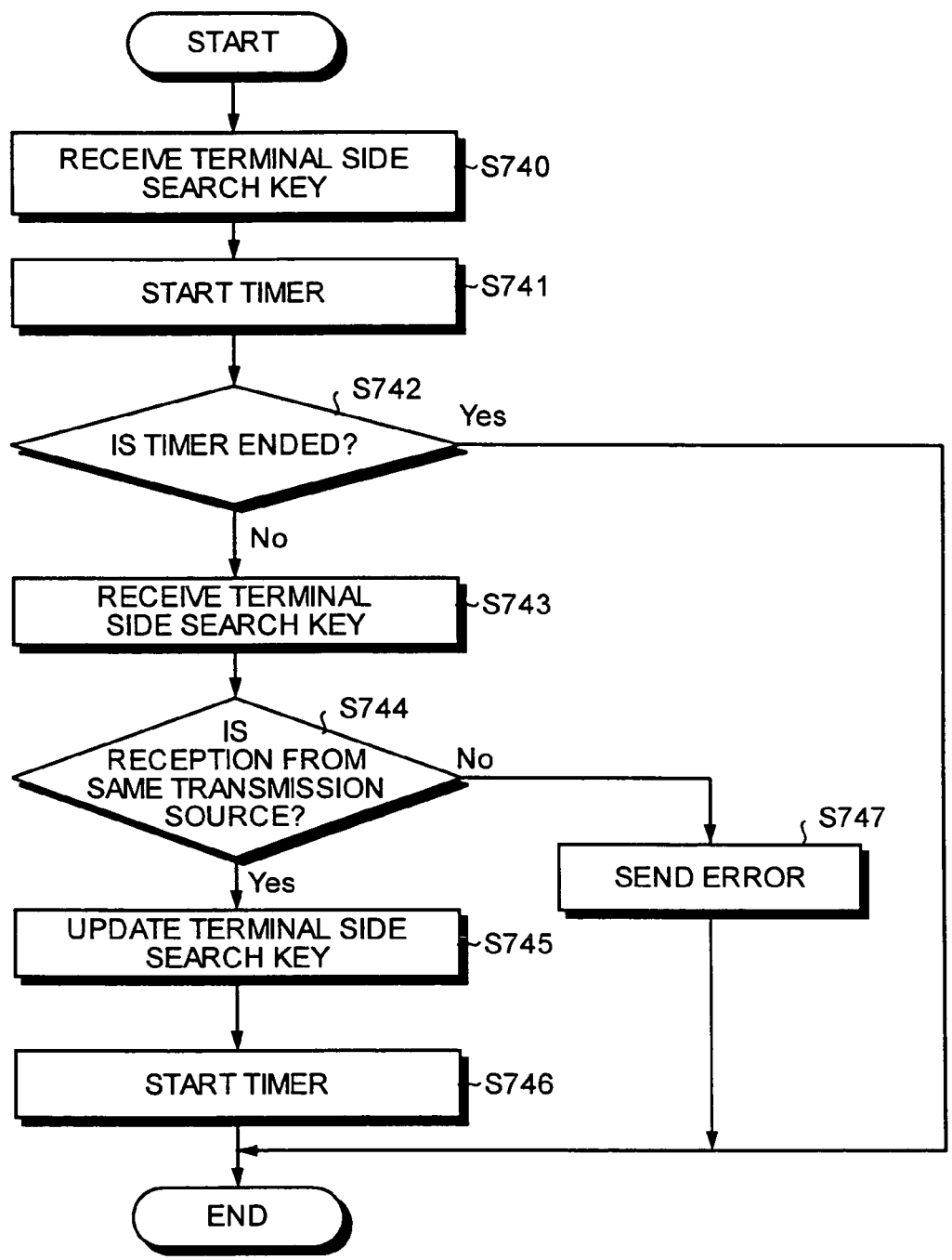
FIG. 48 is a flowchart of a process when the communication control unit 40 receives the terminal side search key from the user terminal 10, waits for a related printer side search key, and again receives the same terminal side search key as the previously received terminal side search key.

FIG. 48 is a flowchart of the process when the terminal side search key which is the same as the previously received terminal side search key is received again at the time when the communication control unit 40 receives the terminal side search key from the user terminal 10 and waits for a related printer side search key.

When the communication control unit 40 receives the terminal side search key from the user terminal 10 (step S740), the count of the timer is started (step S741). When the communication control unit 40 receives the terminal side search key again before the count is completed (No at step S742 and step S743), it determines whether the terminal side search key is transmitted from the same transmission source as the transmission source which transmits the terminal side search key previously (step S744).

When the search key is transmitted from the same transmission source (Yes at step S744), the previously received terminal side search key is nullified (step S745). The count of the timer is started for the terminal side search key received this time (step S746). That is to say, the count of the timer is restarted, and the waiting time for a related printer side search key is extended.

On the other hand, when the terminal side search key is received from a different transmission source (No at step S744), an error notice is transmitted to the transmission source which transmits the terminal side search key later (step S747). For example, a determination as to whether the terminal side search key is received from the same device is made based on collation of an IP address.

After the count for the previously received terminal side search key is completed, when the terminal side search key is received from a different transmission source, a determination is made that the terminal side search key received later is enabled.

The process for receiving each of the terminal side search keys again and again is explained with reference to FIG. 48. The process for receiving each of the printer side search keys again and again is similar to the process for receiving each of the terminal side search key explained with reference to FIG. 48.

When the search keys are controlled exclusively in such a manner, even if it is highly possible that the same search key is utilized as identification information for identifying different communication, the suitable process is executed. Therefore, communication destination can be determined accurately, when a comparatively simple search key of three figures is utilized, or when the count of the timer for one search key is set to a comparatively long time, such as 10 minutes.

Since a user can easily memorize a simple search key of three digits, for example, the convenience is improved. For example, when eight figures are used as a search key, it is difficult for a user to remember the numbers of the search key while the user inputs a terminal side search key into the user terminal 10 and then walks to the first printer 20a. Consequently, the user has to make a quick note of the numbers, and this deteriorates the convenience.

In FIG. 48, the process at the time when the communication control unit 40 receives the same terminal side search keys are explained. This also applies when the user terminal 10 receives the same printer side search keys and the process where the first printer 20a receives the same terminal side search keys.

The communication control unit 40 receives a terminal side search key, and before transmitting a printer side search key related with the terminal side search key to the transmission source of the terminal side search key, it receives again the same terminal side search key for identifying the communication between the two devices. In this case, the previously received terminal side search key is nullified, the count of the timer newly starts for the latterly received terminal side search key. Therefore, even if the user inputs a wrong terminal side search key into the user terminal 10, the correct terminal side search key is transmitted to the communication control unit 40, only by inputting the correct terminal side search key within a predetermined period of time. The communication control unit 40 can broadcast the correct terminal side search key so as to wait for the printer side search key related with the terminal side search key.

When the communication control unit 40 receives a terminal side search key from a terminal other than the transmission source, it transmits an error notice to the transmission source of the latterly received terminal side search key. This prevents the same terminal side search keys for identifying the communication between the two different devices from being simultaneously utilized and prevents specifying wrong communication destination.

As another example, when the communication control unit 40 receives the same terminal side search keys, it may nullify the previously received terminal side search key regardless of the transmission source. As a result, for example, when the collation of the search keys is failed and the search key is again transmitted, it is not necessary to use a terminal side search key which is different from the terminal side search key used for the previous collation. The terminal side search key which is the same as the terminal side search key used for the previous collation is used so that the process for again determining the communication destination can be executed. The same process is executed also for the printer side search key.

As another example, when the communication control unit 40 receives a plurality of the same terminal side search keys, it nullifies the previous terminal side search key, does not execute the process or the like for updating the terminal side search key, and may determine all the received terminal side search keys being enabled. In this case, it can determine a plurality of communication destinations. The user selects desired one communication destination from the determined communication destinations so that the communication with the selected one communication destination is established.

Figure 49:
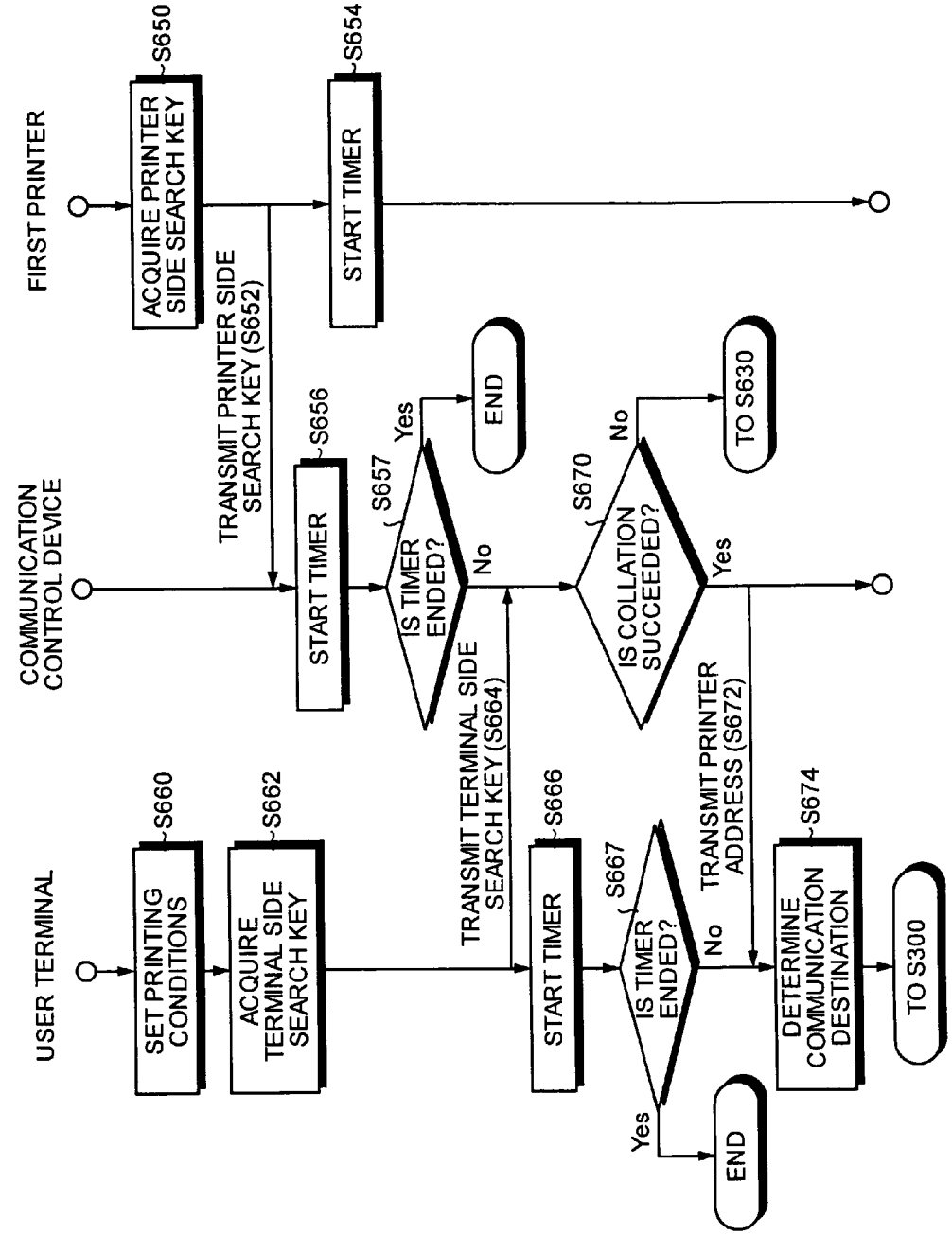
FIG. 49 is a flowchart of a detailed process in the printer search process (step S600) shown in FIG. 43.
Figure 50:
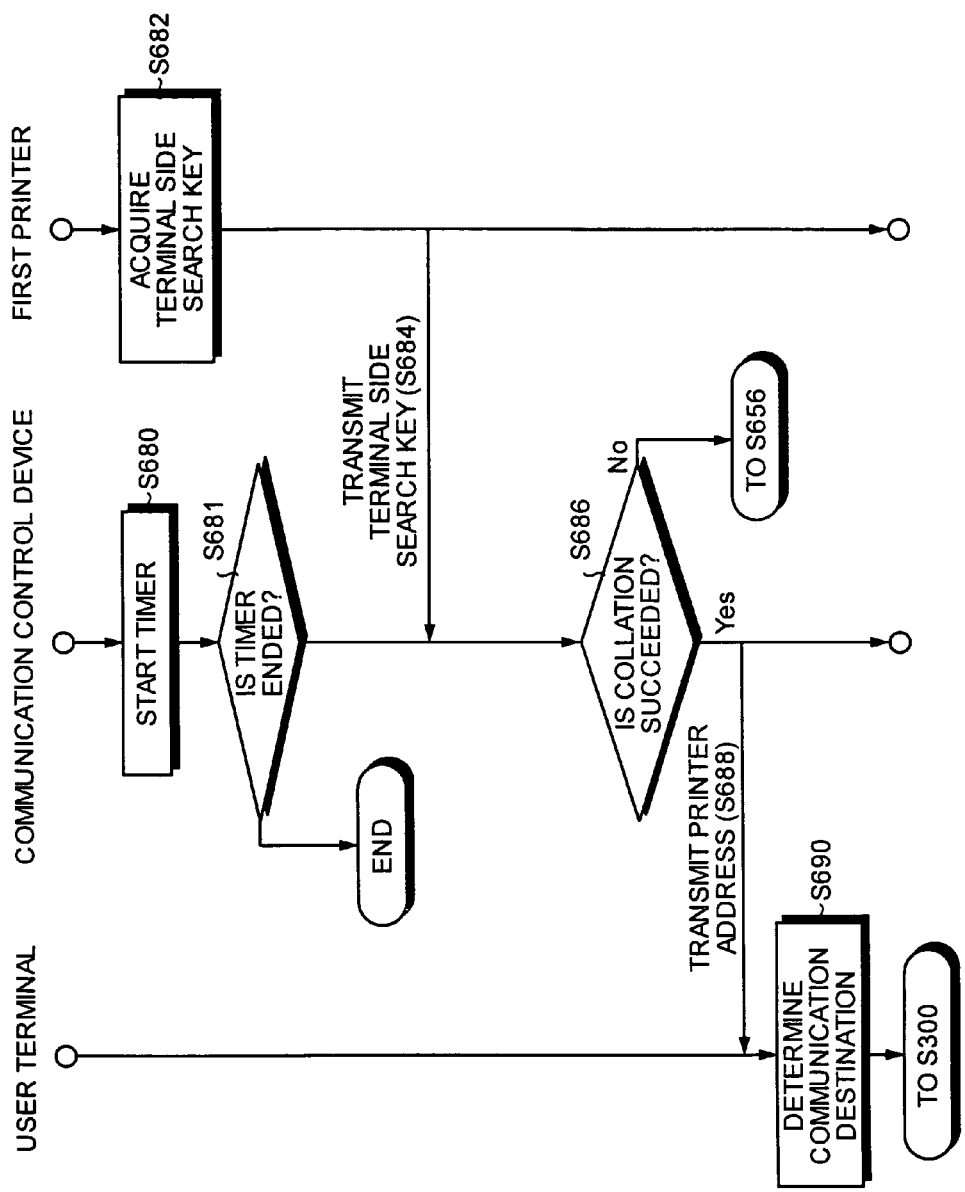
FIG. 50 is a flowchart of the detailed process in the printer search process (step S600) shown in FIG. 43.

FIGS. 49 and 50 are flowcharts of detailed processes in the printer search process (step S600) shown in FIG. 43. In FIGS. 44 and 45, an example where after receiving the terminal side search key from the user terminal 10, the communication control unit waits for reception of a printer side search key from the first printer 20*a* is explained. FIGS. 49 and 50 are, however, the flowcharts of the processes at the time when after receiving the printer side search key from the first printer 20*a*, the communication control unit 40 waits for the terminal side search key from the user terminal 10.

The communication control unit 40 waits for reception of a search key from a corresponding device while it receives a search key from one device and the count is completed similarly to the process explained with reference to FIGS. 44 and 45. The processes in the user terminal 10, the first printer 20*a* and, the communication control unit 40 in this case are similar to those in the user terminal 10, the first printer 20*a*, and the authentication server 30 in FIGS. 44 and 45.

When the communication control unit 40 according to the fourth embodiment receives different terminal side search keys, it makes the count of the timer start for each of the terminal side search keys, and it waits for reception of printer side search keys related with the terminal side search keys. This also applies when the communication control unit 40 receives different printer side search keys.

Other constitutions and the operation of the printing system 1 according to the fourth embodiment are similar to those in the printing system 1 according to the first embodiment.

Figure 53:
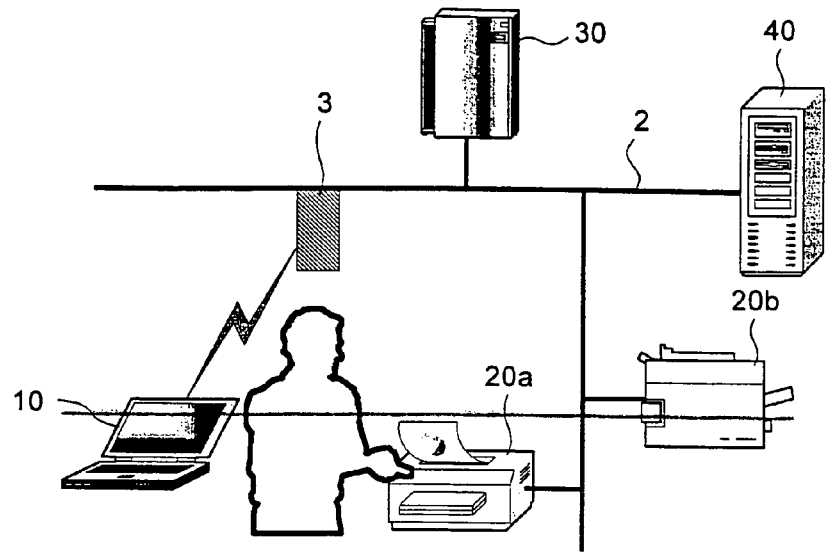
FIG. 53 is a diagram of an entire constitution of the printing system 1 according to another example.

As another example, the printing system 1 may further have the authentication server 30 explained in the second embodiment. FIG. 53 is a diagram of an entire constitution of the printing system 1 in this case. The printing system 1 has the first printer 20*a* and the authentication server 30, and the authentication process is executed as the premise of the process for determining the communication destination, thereby improving the security level.

As still another example, the first printer 20*a* may execute the authentication process similarly to the process explained in the third embodiment.

The printing system 1 according to the fifth embodiment of the present invention has the communication control unit 40 similarly to the fourth embodiment. The communication control unit 40 according to the fifth embodiment further executes the authentication process. The printing system 1 according to the fifth embodiment is different from the printing system 1 according to the other embodiments in this point.

Figure 51:
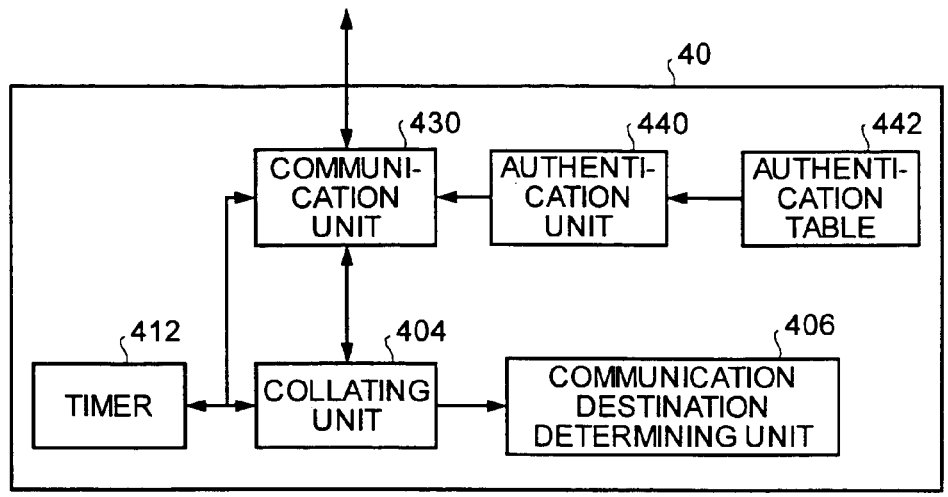
FIG. 51 is a block diagram of a functional constitution of the communication control unit 40 according to a fifth embodiment.

FIG. 51 is a block diagram of a functional constitution of the communication control unit 40 according to the fifth embodiment. The communication control unit 40 has an authenticating unit 440 and an authentication table 442 in addition to the functional constitution of the fourth embodiment. The authenticating unit 440 authenticates authentication information received via a communication unit 430 by referring to the authentication table 442.

Figure 52:
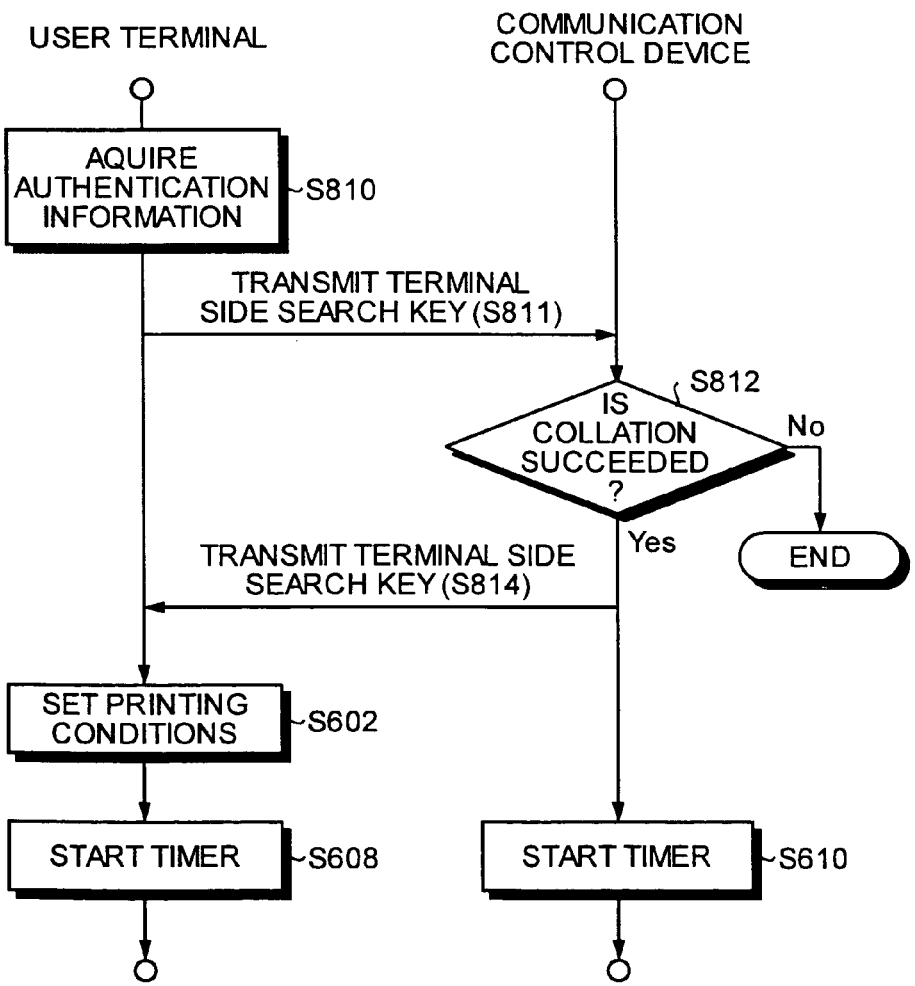
FIG. 52 is a flowchart of the authentication process according to the fifth embodiment.

FIG. 52 is a flowchart of the authentication process according to the fifth embodiment. When a user inputs authentication information into the user terminal 10, the user terminal 10 acquires the authentication information (step S810), and transmits the acquired authentication information to the communication control unit 40 (step S811) by unicast. The communication control unit 40 succeeds in the authentication of the user based on the received authentication information (Yes at step S812), it transmits a terminal side search key related with the user ID in the authentication table 442 to the user terminal 10 (step S814). The communication control unit 40 starts the count of the timer and waits for reception of a printer side search key from the first printer 20*a*.

The user terminal 10 receives the terminal side search key from the communication control unit 40 and sets printing conditions based on the input from the user (step S602) so as to start the count of the timer (step S608). The process thereafter is similar to the process in the fourth embodiment.

The communication control unit 40 according to the fifth embodiment mediates the communication between the user terminal 10 and the first printer 20*a* so as to be capable of executing the authentication process for the user.

Also when the user inputs the authentication information into the first printer 20*a*, the authentication process similar to that explained with reference to FIG. 52 is executed.

The constitution and the operation of the printing system 1 according to the fifth embodiment other than the above constitution are similar to those of the printing system 1 according to the other embodiments. In this case, the security level can be also improved. As another example, the communication control unit 40 may execute the authentication process.

Figure 54:
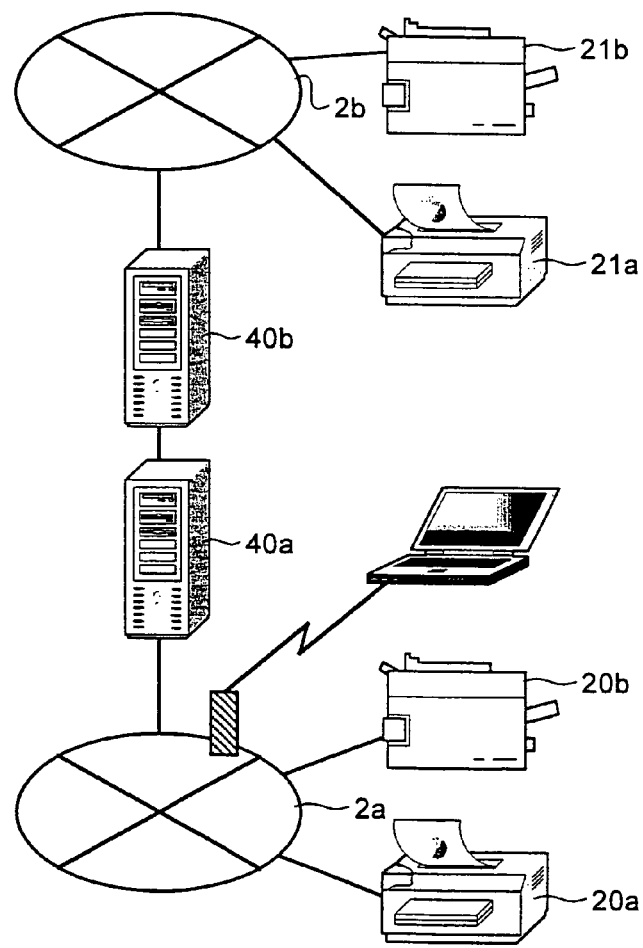
FIG. 54 is a diagram of an entire constitution of the printing system 1 according to a sixth embodiment.

FIG. 54 is a diagram of an entire constitution of the printing system 1 according to a sixth embodiment of the present invention. The printing system 1 according to the sixth embodiment has two subnets connected by a first communication control unit 40*a* and a second communication control unit 40*b*, namely, a first subnet 2*a* and a second subnet 2*b*. The first subnet 2*a* is connected to the first printer 20*a* and the second printer 20*b*. The second subnet 2*b* is connected to a third printer 21*a* and a fourth printer 21*b*. A user connects the user terminal 10 to the first subnet 2*a* so as to establish the communication with the third printer 21*a*.

In the sixth embodiment, the printers belong to different subnets due to the mediation of a first communication control unit 40*a* and a second communication control unit 40*b*, and even if the communication control units 40*a* and 40*b* directly receive a message by broadcast, the message does not reach the printers. Addresses of such printers are specified so that printing data can be output from the printers.

The functional constitutions of the first communication control unit 40*a* and the second communication control unit 40*b* are similar to the functional constitution of the communication control unit 40 explained in the third embodiment. The hardware constitutions of the first communication control unit 40*a* and the second communication control unit 40*b* are similar to the hardware constitution of the user terminal 10 explained with reference to FIG. 29 in the first embodiment.

The first communication control unit 40*a* transmits information to a device connected to the first subnet 2*b* via the second communication control unit 40*b*. Similarly, the second communication control unit 40*b* transmits information to a device connected to the first subnet 2*a* via the first communication control unit 40*a*. The device connected to the first subnet 2*a* and the device connected to the second subnet 2*b* can transmit/receive information due to transmission functions of the first communication control unit 40*a* and the second communication control unit 40*b*. The first communication control unit 40*a* and the second control communication apparatus 40*b* establish TCP/IP connection or make communication with UDP unicast. A process for checking presence of the devices 40*a* and 40*b* each other is similar to the process explained in the third embodiment.

Figure 55:
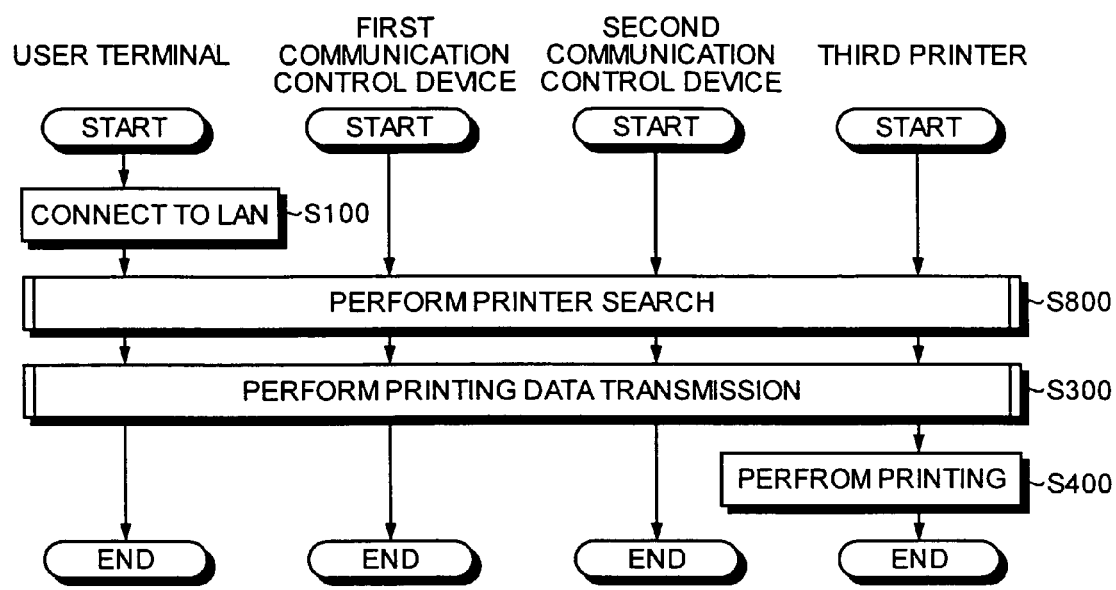
FIG. 55 is a flowchart of a process for establishing communication between the user terminal 10 and a third printer 21a according to the sixth embodiment.

FIG. 55 is a flowchart of a process for establishing the communication between the user terminal 10 and the third printer 21*a* according to the sixth embodiment. In this case, the communication between the user terminal 10 and the third printer 21*a* in the printer search process (step S800) is made via the first communication control unit 40*a* and the second communication control unit 40*b*.

Figure 56:
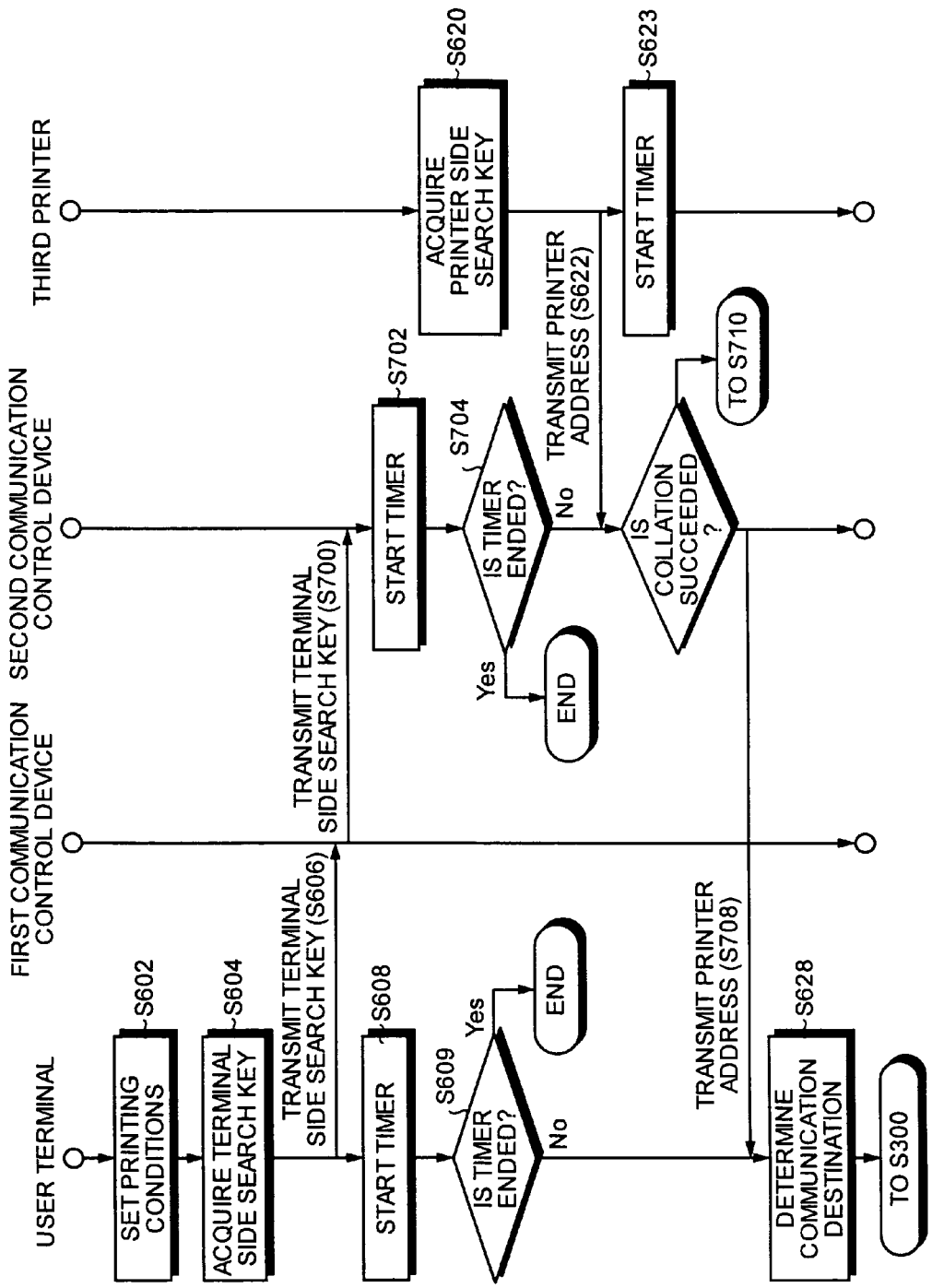
FIG. 56 is a flowchart of a detailed process of the respective devices in the printer search process (step S800) shown in FIG. 55.
Figure 57:
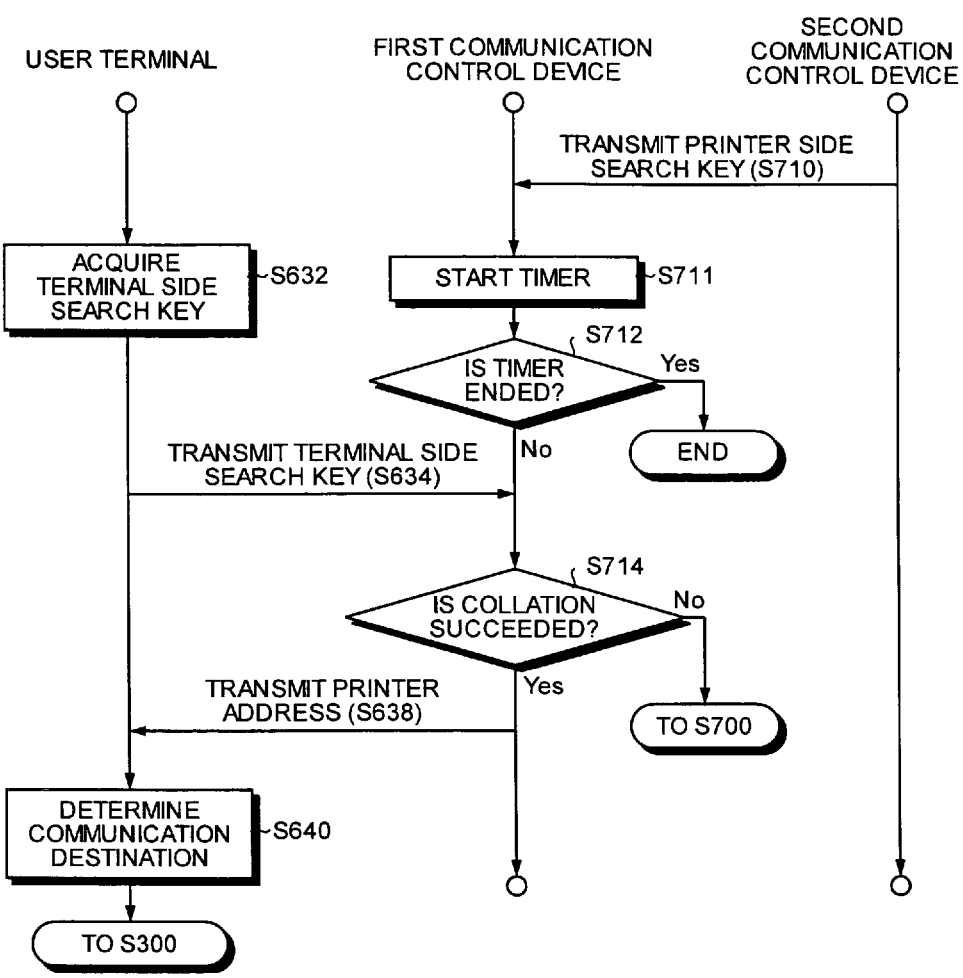
FIG. 57 is a flowchart of a detailed process of the respective devices in the printer search process (step S800) shown in FIG. 55.

FIGS. 56 and 57 are flowcharts of detailed processes of the respective devices in the printer search process (step S800) shown in FIG. 55. FIGS. 56 and 57 are the flowcharts of the processes when a user first inputs a terminal side search key into the user terminal 10.

As shown in FIG. 56, when the first communication control unit 40*a* receives the terminal side search key from the user terminal 10 (step S606), it transmits the received terminal side search key to the second communication control unit 40*b* (step S700). At this time, the first communication control unit 40*a* specifies the second communication control unit 40*b* as the transmission destination so as to transmit the terminal side search key thereto by unicast. An address of the transmission source is not changed into the first communication control unit 40*a*, and the user terminal 10 is the transmission source. When the second communication control unit 40*b* receives the terminal side search key, it starts the count of the timer (step S702) and waits for reception of a printer side search key.

The first communication control unit 40*a* starts the count of the timer similarly to the second communication control unit 40*b*, and waits for reception of the printer side search key. As a result, even if the printer to be searched is on the first subnet 2*a*, the printer can be searched.

When the second communication control unit 40*b* receives the printer side search key from the third printer 21*a* before the count is completed (Yes at step S704 and step S622), the matching unit 404 of the second communication control unit 40*b* matches the terminal side search key received from the first communication control unit 40*a* with the printer side search key received from the third printer 21*a*. When the collation is succeeded (Yes at step S706), the second communication control unit 40*b* transmits the printer address to the user terminal 10 (step S708) by unicast.

When the second communication control unit 40*b* cannot directly transmit the printer address to the user terminal 10, it transmits the printer address to the first communication control unit 40*a* by unicast. In this case, when the first communication control unit 40*a* receives the printer address it transfers the printer address to the user terminal 10.

The user terminal 10 determines the third printer 21*a* specified by the received printer address as the communication destination (step S628), and the sequence goes to the printing data transmitting process (step S300) shown in FIG. 55.

In the printing data transmitting process (step S300), the printing data transmitted from the user terminal 10 are transmitted to the third printer 21*a* by unicast via the first communication control unit 40*a* and the second communication control unit 40*b*. In this case, the printing data may be transmitted by Internet Printing Protocol (IPP).

On the other hand, when the second communication control unit 40*b* does not succeed in the collation of the terminal side search key with the printer side search key (No at step S706), it transmits the printer side search key received from the third printer 21*a* by unicast, to the first communication control unit 40*a* (step S710).

When the first communication control unit 40*a* receives the printer side search key, it starts the count of the timer (step S711), and waits for reception of a terminal side search key related with the received printer side search key.

When receiving the terminal side search key from the user terminal 10 before the count is completed (No at step S712 and step S634), the first communication control unit 40*a* matches the printer side search key received from the third printer 21*a* via the second communication control unit 40*b* with the terminal side search key received from the user terminal 10. When the collation is succeeded (Yes at step S714), the first communication control unit 40*a* transmits the address of the third printer 21*a* as the transmission source of the printer side search key by unicast, to the user terminal 10 (step S638). The user terminal 10 determines the third printer 21*a* specified by the received printer address as the communication destination (step S640), and the sequence goes to the printing data transmitting process (step S300).

When the first communication control unit 40*a* does not succeed in the collation of the terminal side search key with the printer side search key (No at step S714), the sequence goes to step S700. The second communication control unit 40*b* again waits for reception of a printer side search key related with the terminal side search key.

In the sixth embodiment, the user terminal 10 communicates with the third printer 21*a* via the first communication control unit 40*a* and the second communication control unit 40*b*. Accordingly, a device that belongs to a different subnet can be determined as the communication destination.

Figure 58:
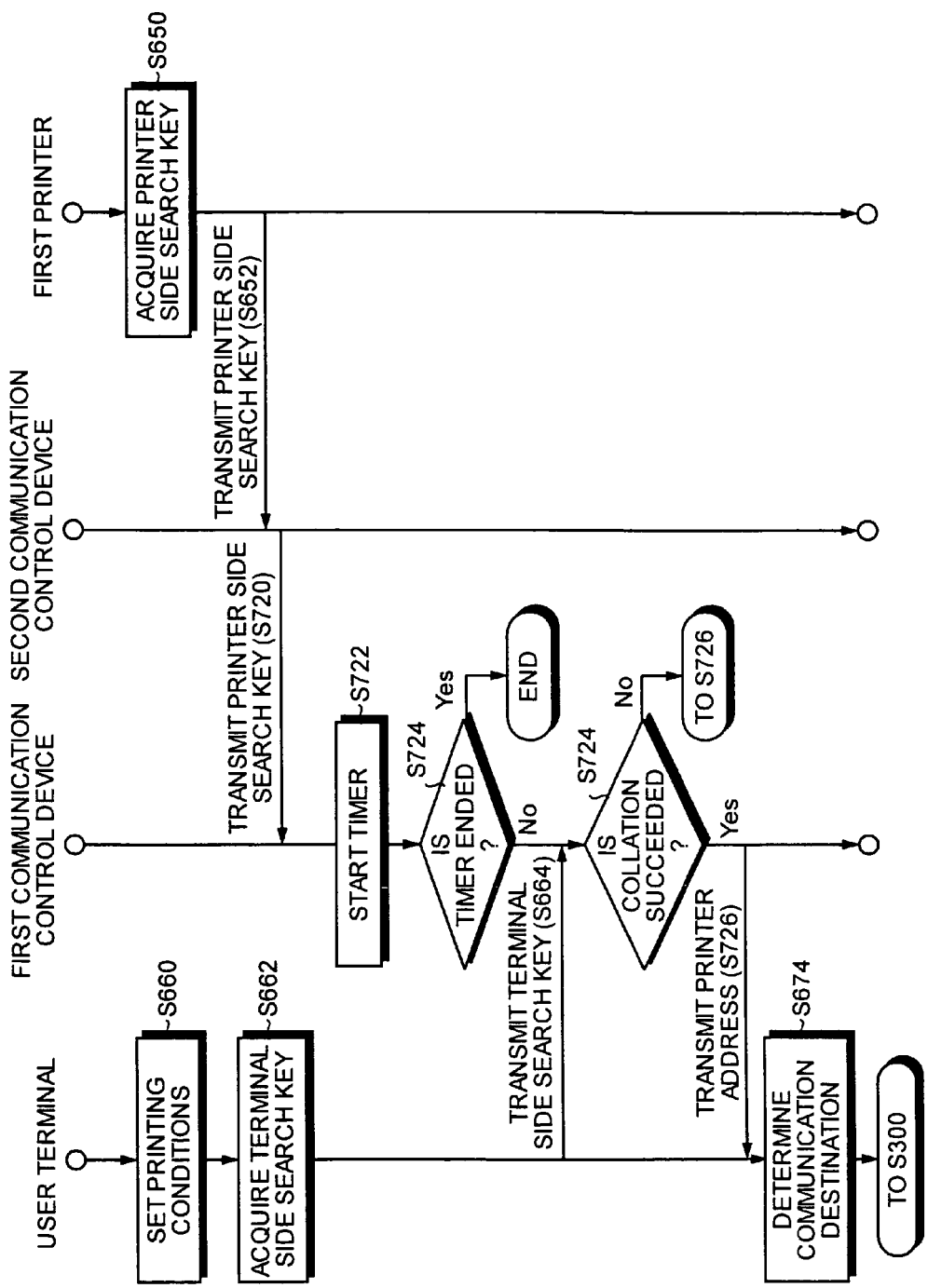
FIG. 58 is a flowchart of the detailed process of the respective devices according to another example in the printer search process (step S800) shown in FIG. 55.
Figure 59:
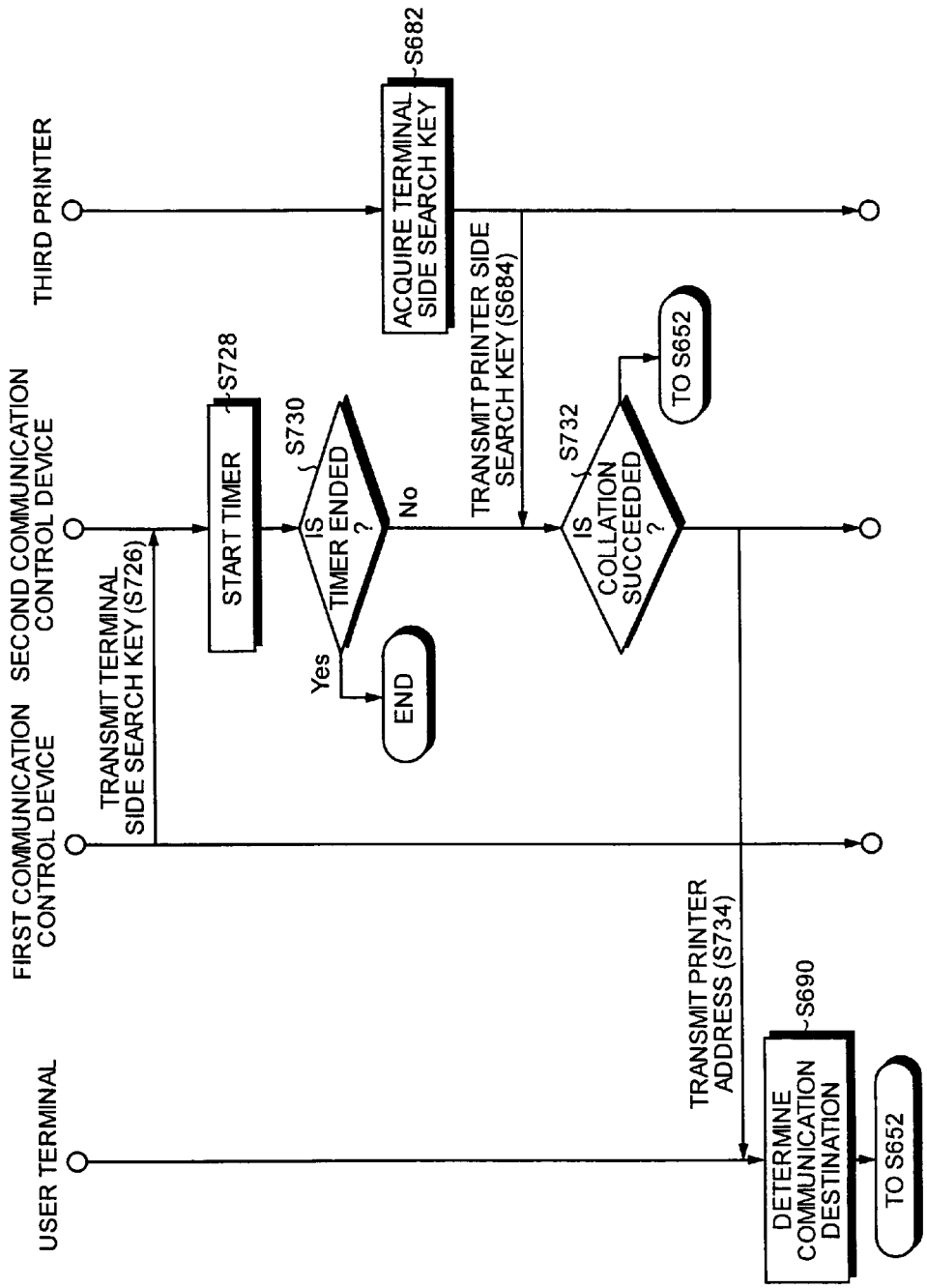
FIG. 59 is a flowchart of the detailed process of the respective devices according to a still another example in the printer search process (step S800) shown in FIG. 55.

FIGS. 58 and 59 are flowcharts of detailed processes of the respective devices of another example in the printer search process (step S800) shown in FIG. 55. FIGS. 58 and 59 are the flowcharts of the processes when a user first inputs a printer side search key into the third printer 21*a*. As shown in FIG. 58, when the second communication control unit 40*b* receives the printer side search key from the third printer 21*a* (step S652), it transmits the received printer side search key to the first communication control unit 40*a* (step S720). At this time, the second communication control unit 40*b* specifies the first communication control unit 40*a* as the communication destination so as to transmit the printer side search key thereto by unicast. Further, the address of the transmission source is not updated to the second communication control unit 40*b*, and the third printer 21*a* is the transmission source. When receiving the printer side search key, the first communication control unit 40*a* starts the count of the timer (step S722), and waits for reception of a terminal side search key.

When the first communication control unit 40*a* receives the terminal side search key before the count is completed (No at step S724 and step S664), the matching unit 404 of the first communication control unit 40*a* matches the printer side search key received from the second communication control unit 40*b* with the terminal side search key received from the user terminal 10. When the collation is succeeded (Yes at step S724), the first communication control unit 40*a* transmits the printer address to the user terminal 10 (step S726). The user terminal 10 determines the third printer 21*a* specified by the received printer address as the communication destination (step S674), and the sequence goes to the printing data transmitting process shown in FIG. 55 (step S300).

On the other hand, when the second communication control unit 40b does not succeed in the collation of the terminal side search key with the printer side search key (No at step S724), the first communication control unit 40a transmits the terminal side search key received from the user terminal 10 by unicast, to the second communication control unit 40b (step S726). When receiving the terminal side search key, the second communication control unit 40b starts the count of the timer (step S728), and waits for reception of a printer side search key from the third printer 21a. The other process is similar to the process explained with reference to FIGS. 56 and 57.

The user terminal 10 and the third printer 21a establish the communication via the first communication control unit 40a and the second communication control unit 40b. In this case, any one of the first communication control unit 40a and the second communication control unit 40b can execute the authentication process, so that the communication can be established efficiently.

Other constitutions and the operation of the printing system 1 according to the sixth embodiment are similar to those in the printing system 1 according to the first embodiment.

A printing system according to a seventh embodiment of the present invention has two subnets similarly to the printing system 1 according to the sixth embodiment. Both the first communication control unit 40a and the second communication control unit 40b execute the authentication process. The printing system 1 according to the seventh embodiment is different from the printing system 1 according to the other embodiments in this point.

The functional constitutions of the first communication control unit 40a and the second communication control unit 40b according to the seventh embodiment are similar to the functional constitution of the communication control unit 40 according to the fifth embodiment.

Figure 60:
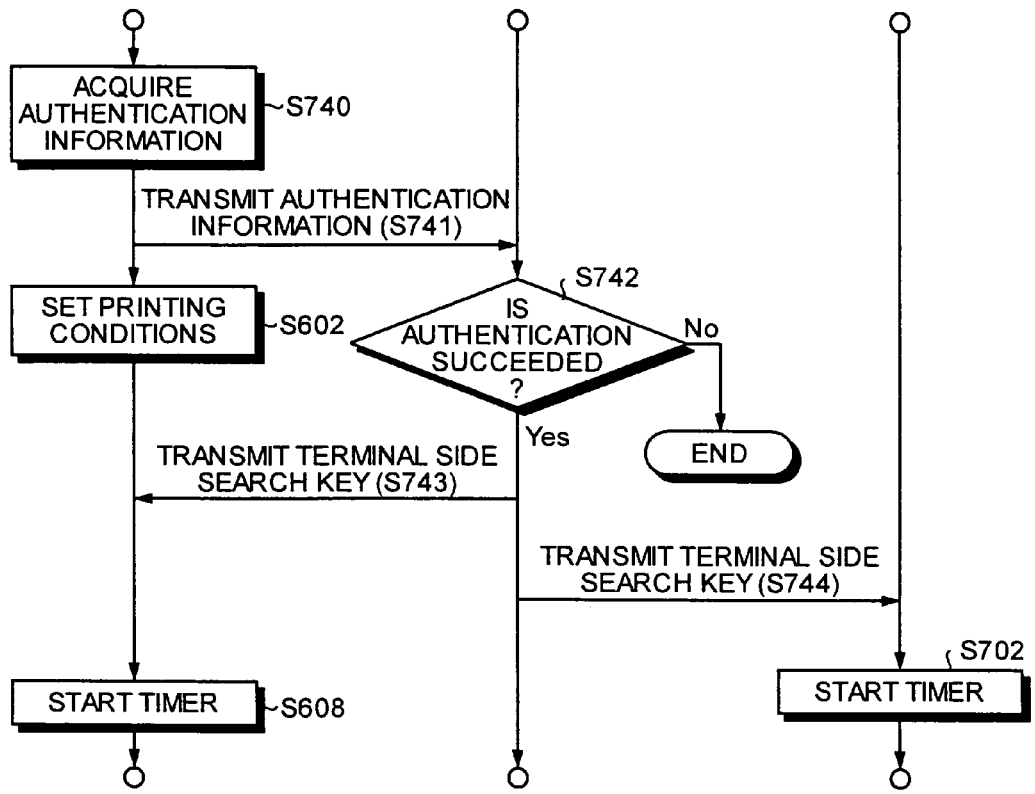
FIG. 60 is a flowchart of the authentication process according to a seventh embodiment.

FIG. 60 is a flowchart of the authentication process according to the seventh embodiment. When a user inputs authentication information into the user terminal 10, the user terminal 10 acquires the authentication information (step S740) and transmits the acquired authentication information to the first communication control unit 40a (step S741) by unicast. When the first communication control unit 40a succeeds in authentication of the user based on the authentication information (Yes at step S742), it transmits a terminal side search key related with the user ID in the authentication table 442 by unicast, to the user terminal 10 and the second communication control unit 40b (steps S743 and S744). The process thereafter is similar to the process explained in the sixth embodiment.

When the user inputs the authentication information into the first printer 20a, the second communication control unit 40b executes the authentication process similar to that explained with reference to FIG. 60.

In the seventh embodiment, the first communication control unit 40a and the second communication control unit 40b mediate the communication between the user terminal 10 and the third printer 21a and can execute the authentication process for the user. While the present invention has been explained with reference to the exemplarity embodiments, it is to be understood that various modifications and alternations can be added thereto.

Figure 61:
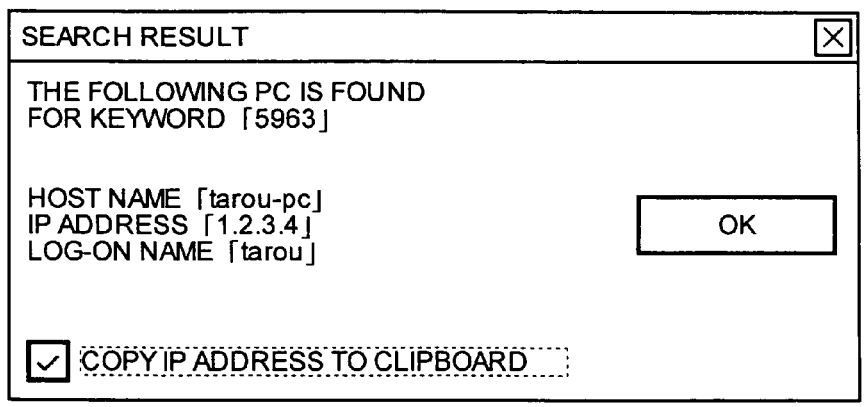
FIG. 61 is a diagram of a screen display on a display unit of a terminal according to a first modified example.

The seventh embodiment has explained the printing system 1 where the communication between the user terminal and the printer is established. Instead of this, as a first modified example, communications between terminals may also be established. FIG. 61 depicts a screen display on display units of the terminals when the communication between the terminals is established. When the communication between the terminals is established by the process similar to that explained in the seventh embodiment, a host name, an IP address, and the like of the terminal as the communication destination are displayed on the screen displays. The user inputs the IP address displayed on the screen display into an IP address input field on the setting screen of an application with which the communication between the terminals are actually desired, so that the communication with the communication destination is enabled.

According to the first aspect of the invention, in one of the first apparatus and the second apparatus, the collating process can be executed on identification information for identifying communication. Therefore, even if a user fails to input identification information, only by inputting correct identification information correctly next time, the collating process is executed on the correct identification information, and an address of communication destination can be specified.

According to the second aspect of the invention, since an input unit is further provided, the address of the communication destination can be specified based on the identification information input by the user.

According to the third aspect of the invention, the input unit is further provided, the address of the communication destination can be specified based on the identification information input by the user.

According to the fourth aspect of the invention, a display unit displays at least one of information representing that communication destination is determined and communication destination information. Accordingly, the user can acknowledge the communication destination according to the displayed contents.

According to the fifth aspect of the invention, since the identification information is transmitted by broadcast, a transmission side can transmit the same identification information to a plurality of devices at less number of times of transmission.

According to the sixth aspect of the invention, since the identification information is transmitted by multicast, the transmission side can transmit the same identification information to a plurality of devices at less number of times of transmission.

According to the seventh aspect of the invention, when a device as the communication destination is determined, the information is transmitted to the communication destination by unicast. Accordingly, the communication traffic can be reduced.

According to the eighth aspect of the invention, when the network connected with the image forming apparatus is connected to the terminal, the terminal specifies the address of the image forming apparatus, so that printing data can be transmitted to the address. A print can be output easily from the image forming apparatus desired by the user.

When the terminal specifies the address of the image forming apparatus as the communication destination, the printing data are transmitted to the specified address, thereby outputting a print from the desired image forming apparatus.

According to the ninth aspect of the invention, when the network connected to the image forming apparatus is connected to the terminal, the terminal specifies the address of the image forming apparatus, thereby transmitting the printing data to the address. A print can be, therefore, output easily from the desired image forming apparatus.

When the image forming apparatus specifies the address of the terminal as the communication destination, the address of the image forming apparatus is sent to the terminal. Therefore, the terminal can acquire the address of the transmission destination of the printing data.

According to the tenth aspect of the invention, a printing-condition determining unit determines whether printing conditions received from the terminal coincide with processing conditions of the image forming apparatus. Since the image forming apparatus transmits a determined result from the printing-condition determining unit to the terminal, the terminal can determine whether the printing data are actually transmitted based on the determined result. This can prevent the useless transmission of the printing data and reduce the communication traffic.

According to the eleventh aspect of the invention, the printing-condition determining unit determines whether printing conditions received from the terminal coincide with processing conditions of the image forming apparatus. Since the image forming apparatus transmits a determined result from the printing-condition determining unit to the terminal, the terminal can determine whether the printing data are actually transmitted based on the determined result. This can prevent the useless transmission of the printing data and reduce the communication traffic.

According to the twelfth aspect of the invention, only when a receiving unit of the terminal receives condition coincidence information, a transmitting unit of the terminal transmits the printing data to the image forming apparatus. Therefore, when the printing conditions do not coincide with the processing conditions and the printing data cannot be output from the image forming apparatus, useless transmission of the printing data can be avoided. This can reduce the communication traffic.

According to the thirteenth aspect of the invention, when the receiving unit of the terminal receives condition discrepancy information, the transmitting unit of the terminal does not transmit the printing data to the image forming apparatus. Therefore, when the printing conditions do not coincide with the processing conditions and the printing data cannot be output from the image forming apparatus, useless transmission of the printing data can be avoided. This results in reduced communication traffic.

According to the fourteenth aspect of the invention, the first apparatus does not receive first identification information and second identification information to be matched within predetermined time, these pieces of the identification information are nullified. Therefore, the process can be executed efficiently. When the same pieces of the identification information for identifying communication where effective time of the identification information to be matched is long and different from each other, are present in parallel, such inconvenience can be avoided.

According to the fifteenth aspect of the invention, when the second apparatus does not receive the first identification information and the second identification information to be matched within predetermined time, these pieces of the identification information are nullified. Therefore, the process can be executed efficiently. When the same pieces of the identification information for identifying communication where effective time of the identification information to be matched is long and different from each other, are present in parallel, such inconvenience can be avoided.

According to the sixteenth aspect of the invention, a communication control unit is further provided between the first apparatus and the second apparatus. The first apparatus and the second apparatus may communicate only with the communication control unit, thereby improving the security level.

According to the seventeenth aspect of the invention, since the communication control unit transmits the identification information by broadcast, the transmission side can transmit the same pieces of the identification information to a plurality of devices at less number of times of transmission.

According to the eighteenth aspect of the invention, the first apparatus and the second apparatus can communicate with the communication control unit by unicast, thereby reducing the communication traffic.

According to the nineteenth aspect of the invention, only when the communication control unit further authenticates the user and succeeds in the authentication, it permits transmission of the identification information. Accordingly, the security level can be improved.

According to the twentieth aspect of the invention, since the communication system further has an authentication server, the authentication server authenticates the user of the first apparatus. Only when it succeeds in the authentication, the transmission system permits the transmission of the identification information, thereby improving the security level.

According to the twenty-first aspect of the invention, authentication information is acquired as the first identification information from the authentication server. Therefore, the user does not have to input the authentication information, thereby determining the communication destination efficiently.

According to the twenty-second aspect of the invention, the acquiring unit of the first apparatus acquires communication identification information as the identification information. Therefore, when the authentication is succeeded, even if the user does not input the identification information, the first apparatus can acquire the identification information.

According to the twenty-third aspect of the invention, the communication system has the communication control unit that manages a plurality of devices belonging to different subnets. Therefore, even when the first apparatus and the second apparatus are connected to different subnets, the communication destination can be determined via the communication control unit.

According to the twenty-fourth aspect of the invention, when the first apparatus cannot transmit the first identification information to the communication control unit, it transmits the first identification information on the subnet by broadcast. When the communication control unit cannot be specified, the identification information can be transmitted to the communication destination securely by broadcast. When the communication control unit can be specified, the identification information is transmitted to the communication control unit by unicast, thereby reducing the communication traffic more than the broadcast transmission.

According to the twenty-fifth aspect of the invention, when the first identification information is received from a device other than the first apparatus, identification information received from the device other than the first apparatus is not transmitted. That is to say, the identification information received from the device other than the first apparatus is nullified. Since the first identification information is controlled exclusively, even if it is highly possible that the same identification information is received again, the communication destination can be determined accurately when an effective time of one piece of the identification information is set to be comparatively longer.

According to the twenty-sixth aspect of the invention, when different pieces of the identification information representing the same communication are received again from the first apparatus as the same transmission source, the previously received identification information is nullified, and the communication destination is determined based on the latterly received identification. Therefore, even if the user inputs wrong identification information, only by inputting the correct identification information next time, the communication destination can be accurately determined.

According to the twenty-seventh aspect of the invention, any of the first apparatus and the second apparatus can execute the collating process on the identification information for identifying communication. Therefore, even if the user fails to input the identification information, the collating process on the correct identification information is executed and an address of the communication destination is specified only by the user inputting the identification information next time.

According to the twenty-eighth aspect of the invention, any of the first apparatus and the second apparatus can execute the collating process on the identification information for identifying the communication. Therefore, even if the user fails to input identification information, only by inputting correct identification information next time, the collating process on the correct identification information is executed and the address of the communication destination is specified.

According to the twenty-ninth aspect of the invention, since the communication apparatus has an image forming unit, the communication-destination determining unit transmits a self address to the other device determined as the communication destination by the communication-destination determining unit and receives the printing data from a counterpart device. As a result, an image can be formed based on the printing data.

According to the thirtieth aspect of the invention, the communication apparatus is the terminal that transmits the printing data to the image forming apparatus, and the communication-destination determining unit can transmits the printing data to the image forming apparatus determined as the communication destination by the communication-destination determining unit.

According to the thirty-first aspect of the invention, any of the first apparatus and the second apparatus can execute the collating process on identification information for identifying communication. Therefore, even if the user fails to input the identification information correctly, only by inputting correct identification information next time, the collating process on the correct identification information is executed and the address of the communication destination is specified.

According to the thirty-second aspect of the invention, any of the first apparatus and the second apparatus can execute the collating process on identification information for identifying communication. Therefore, even if the user fails to input the identification information correctly, only by inputting correct identification information next time, the collating process on the correct identification information is executed and the address of the communication destination is specified.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication system comprising:
   a first apparatus and a second apparatus connected to a network
   the first apparatus including
      a first input unit configured to acquire first identification information from a first user accessible input device of the first apparatus;
      a first acquiring unit configured to acquire the first identification information from the first input unit, the first identification information corresponding to an identity of a desired second apparatus;
      a first receiving unit configured to receive a communication including second identification information from the second apparatus, the second identification information corresponding to an identity of the second apparatus;
      a first matching unit configured to match the first identification information with the second identification information; and
      a first transmitting unit configured to transmit the first identification information from the first apparatus to the second apparatus when the matching unit determines that the acquired first identification information does not coincide with the received second identification information and
   the second apparatus including
      a second input unit configured to acquire third identification information from a second user accessible input device of the second apparatus;
      a second receiving unit configured to receive the first identification information from the first apparatus;
      a second acquiring unit configured to acquire the third identification information from the second input unit, the third identification information corresponding to an identity of a desired first apparatus;
      a second matching unit configured to match the first identification information with the third identification information;
      a communication-destination determining unit configured to determine the first apparatus that is the transmission source of the first identification information when the second matching unit determines that the first identification information coincides with the third identification information; and
      a second transmitting unit configured to transmit predetermined information to the first apparatus determined by the communication-destination determining unit.

2. The communication system according to claim 1, wherein the second apparatus further comprises:
   a display unit configured to display at least one of first communication destination information indicating that the communication destination has been determined and second communication destination information indicating the communication destination when the communication-destination determining unit determines the communication destination.

3. The communication system according to claim 1, wherein
   the second transmitting unit transmits the second identification information by broadcast, and
   the first transmitting unit transmits the first identification information by broadcast when the first matching unit determines that the first identification information does not coincide with the second identification information.

4. The communication system according to claim 1, wherein
   the second transmitting unit transmits the second identification information by multicast, and
   the first transmitting unit transmits the first identification information by multicast when the first matching unit determines that the first identification information does not coincide with the second identification information.

5. The communication system according to claim 1, wherein the second transmitting unit transmits the predetermined information by unicast to the first apparatus determined as the communication destination by the communication-destination determining unit.

6. The communication system according to claim 1, wherein the first apparatus is an image forming apparatus that forms an image based on printing data, the second apparatus is a terminal configured to transmit the printing data to the image forming apparatus, and the second transmitting unit of the terminal transmits the printing data to the image forming apparatus determined as the communication destination by the communication-destination determining unit of the terminal.

7. The communication system according to claim 1, wherein the first apparatus is a terminal configured to transmit printing data to the second apparatus, the second apparatus is an image forming apparatus configured to form an image based on the printing data received from the first apparatus, the second transmitting unit of the image forming apparatus transmits an address of the image forming apparatus to the terminal determined as the communication destination by the communication-destination determining unit of the image forming apparatus, and the first transmitting unit of the terminal transmits the printing data to the address of the image forming apparatus received by the first receiving unit of the terminal.

8. The communication system according to claim 1, wherein the first apparatus is an image forming apparatus configured to form an image based on the printing data, the second apparatus is a terminal configured to transmit the printing data to the image forming apparatus, the second transmitting unit of the terminal transmits printing condition information representing printing conditions of the printing data to the image forming apparatus determined as the communication destination by the communication-destination determining unit of the terminal, the image forming apparatus further includes a printing-condition determining unit configured to determine whether the printing condition information received by the first receiving unit of the image forming apparatus coincides with processing conditions of the image forming apparatus, and the first transmitting unit of the image forming apparatus transmits information representing a result of determination by the printing-condition determining unit to the terminal.

9. The communication system according to claim 8, wherein the first transmitting unit of the image forming apparatus transmits condition coincidence information representing that the conditions coincide with each other to the terminal when the printing condition information received by the first receiving unit of the image forming apparatus coincides with the processing conditions of the image forming apparatus, and the second transmitting unit of the terminal transmits the printing data to the image forming apparatus when the second receiving unit of the terminal receives the condition coincidence information.

10. The communication system according to claim 8, wherein the second transmitting unit of the terminal transmits condition discrepancy information representing that the conditions do not coincide with each other to the terminal when the printing condition information received by the first receiving unit of the image forming apparatus does not coincide with the processing conditions of the image forming apparatus, and the second transmitting unit of the terminal does not transmit the printing data when the second receiving unit of the terminal receives the condition discrepancy information.

11. The communication system according to claim 1, wherein the first apparatus is a terminal configured to transmit printing data to the second apparatus, the second apparatus is an image forming apparatus configured to form an image based on the printing data received from the first apparatus, the second transmitting unit of the image forming apparatus transmits an address of the image forming apparatus to the terminal determined as the communication destination by the communication-destination determining unit of the image forming apparatus, the first transmitting unit of the terminal transmits printing condition information representing printing conditions of the printing data to the address of the image forming apparatus received by the first receiving unit of the terminal, the image forming apparatus further includes a printing-condition determining unit configured to determine whether the printing condition information received by the second receiving unit of the image forming apparatus coincides with processing conditions of the image forming apparatus, and the second transmitting unit of the image forming apparatus transmits information representing a result of determination by the printing-condition determining unit of the image forming apparatus to the terminal.

12. The communication system according to claim 11, wherein the second transmitting unit of the image forming apparatus transmits condition coincidence information representing that the conditions coincide with each other to the terminal when the printing condition information received by the second receiving unit of the image forming apparatus coincides with the processing conditions of the image forming apparatus, and the first transmitting unit of the terminal transmits the printing data to the image forming apparatus when the first receiving unit of the terminal receives the condition coincidence information.

13. The communication system according to claim 11, wherein the first transmitting unit of the terminal transmits condition discrepancy information representing that the conditions do not coincide with each other to the terminal when the printing condition information received by the second receiving unit of the image forming apparatus does not coincide with the processing conditions of the image forming apparatus, and the first transmitting unit of the terminal does not transmit the printing data when the first receiving unit of the terminal receives the condition discrepancy information.

14. The communication system according to claim 1, wherein the first matching unit matches the first identification information with the second identification information when the first receiving unit receives the second identification information before predetermined time passes after the first input unit receives the first identification information.

15. The communication system according to claim 1, wherein the second matching unit matches the first identification information with the third identification information when the second receiving unit receives the first identification information before predetermined time passes after the second input unit receives the third identification information.

16. The communication system according to claim 1, wherein
the communication system further includes a communication control unit configured to manage the communication between the apparatuses included in the communication system,
the communication control unit including
a third receiving unit configured to receive at least one of the information transmitted from the first apparatus and the information transmitted from the second apparatus; and
a third transmitting unit configured to transmit the information received by the third receiving unit,
the first receiving unit receives the second identification information via the communication control unit, and
the second receiving unit receives the first identification information via the communication control unit.

17. The communication system according to claim 16, wherein the third transmitting unit transmits at least one of the first identification information and the second identification information by broadcast.

18. The communication system according to claim 16, wherein
the first transmitting unit transmits the first identification information to the communication control unit by unicast, and
the second transmitting unit transmits the second identification information to the communication control unit by unicast.

19. The communication system according to claim 16, wherein
the first apparatus further comprises:
an authentication-information-input accepting unit configured to accept an input of authentication information from a user; and
an authentication-information transmitting unit configured to transmit the authentication information to an authentication server,
the communication control unit further including
an authentication-information receiving unit configured to receive the authentication information from the first apparatus;
an authentication table in which the authentication information is related with user identification information for identifying the user;
an authenticating unit configured to authenticate the user using the authentication information based on the authentication table; and
a communication-permission-information transmitting unit configured to transmit permission information representing that the first apparatus is permitted to communicate when the authenticating unit successfully authenticates the use, and the first apparatus further including
a permission information receiving unit configured to receive the permission information from the communication-permission-information transmitting unit; and
a communication-process permitting unit configured to permit the first transmitting unit to transmit the first identification information when the permission information receiving unit receives the permission information.

20. The communication system according to claim 1, further comprising an authentication server that authenticates a user, wherein
the first apparatus further comprises:
an authentication-information-input accepting unit configured to accept an input of authentication information from a user; and
an authentication-information transmitting unit configured to transmit the authentication information to an authentication server,
the authentication server including
an authentication-information receiving unit configured to receive the authentication information from the first apparatus;
an authentication table in which the authentication information is related with user identification information for identifying the user;
an authenticating unit configured to authenticate the user using the authentication information based on the authentication table; and
a communication-permission-information transmitting unit configured to transmit permission information representing that the first apparatus is permitted to communicate when the authenticating unit successfully authenticates the use, and the first apparatus further including
a permission information receiving unit configured to receive the permission information from the communication-permission-information transmitting unit; and
a communication-process permitting unit configured to permit the first transmitting unit to transmit the first identification information when the permission information receiving unit receives the permission information.

21. The communication system according to claim 19, wherein the first acquiring unit acquires the authentication information from the authentication server as the first identification information.

22. The communication system according to claim 20, wherein
the authentication table of the authentication server associates communication identification information for identifying communication between the two apparatuses with the user identification information,
the communication-permission-information transmitting unit of the authentication server transmits the communication identification information to the first apparatus when the authenticating unit successfully authenticates the user, and
the first acquiring unit acquires the communication identification information from the authentication server as the first identification information.

23. A communication method for establishing a communication between a first apparatus and a second apparatus connected to a network, comprising:
acquiring using the first apparatus, first identification information from a first user accessible input device of the first apparatus, the first identification information corresponding to an identity of a desired second apparatus;
receiving using the first apparatus, second identification information, the second identification information corresponding to an identity of the second apparatus;
matching the first identification information with the second identification information;

transmitting the first identification information via the network when the first identification information does not coincide with the second identification information;
acquiring using the second apparatus, third identification information from a second user accessible input device of the second apparatus, the third identification information corresponding to an identity of a desired first apparatus;
matching the first identification information with the third identification information;
determining the first apparatus that is a transmission source of the first identification information as a communication destination when the first identification information coincides with the third identification information; and
transmitting predetermined information to the first apparatus determined at the determining.

24. A communication apparatus that communicates with other communication apparatuses included in a communication system via a network, comprising:
a first input unit configured to acquire first identification information from a first user accessible input device;
a first acquiring unit configured to acquire the first identification information from the first input unit, the first identification information corresponding to an identity of a desired second apparatus;
a first transmitting unit configured to transmit the first identification information via the network;
a receiving unit configured to receive the communications including second identification information, to match the first identification information with the second identification information acquired by the other communication apparatus, and to determine that the first identification information does not coincide with the second identification information;
a second input unit configured to acquire third identification information from a second user accessible input device;
a second acquiring unit configured to acquire the third identification information from the second input unit, the third identification information corresponding to an identity of a desired first apparatus;
a matching unit configured to match the second identification information with the third identification information;
a communication-destination determining unit configured to determine the other communication apparatus as the communication destination when the matching unit determines that the second identification information coincides with the third identification information; and
a second transmitting unit configured to transmit predetermined information to the other communication apparatus determined by the communication-destination determining unit.

25. The communication apparatus according to claim 24, wherein
the second transmitting unit transmits a self address to the other communication apparatus determined as the communication destination, and
the communication apparatus further includes an image forming unit that forms an image based on printing data when the receiving unit receives the printing data from the other communication apparatus.

26. The communication apparatus according to claim 24, wherein
the other communication apparatus is an image forming apparatus that forms an image, and
the second transmitting unit transmits printing data to the other communication apparatus determined as the communication destination.

27. A communication method for establishing a communication between a communication apparatus with other communication apparatus included in a communication system via a network, comprising:
acquiring first identification information from a first user accessible input device, the first identification information corresponding to an identity of a desired second apparatus;
transmitting the first identification information via the network;
receiving second identification information, that matches the first identification information with the second identification information acquired by the other communication apparatus, and determines that the first identification information does not coincide with the second identification information;
acquiring third identification information from a second user accessible input device, the third identification information corresponding to an identity of a desired first apparatus;
matching the second identification information with the third identification information;
determining the other communication apparatus as a communication destination when the matching unit determines that the second identification information coincides with the third identification information; and
transmitting predetermined information to the other communication apparatus determined by the communication-destination determining unit.

28. A computer readable recording medium that stores a computer program for establishing a communication between a communication apparatus with other communication apparatus included in a communication system via a network, the computer program making a computer execute:
acquiring first identification information from a first user accessible input device, the first identification information corresponding to an identity of a desired second apparatus;
transmitting the first identification information via the network;
receiving second identification information, that matches the first identification information with the second identification information acquired by the other communication apparatus, and determines that the first identification information does not coincide with the second identification information;
acquiring third identification information from a second user accessible input device, the third identification information corresponding to an identity of a desired first apparatus;
matching the second identification information with the third identification information;
determining the other communication apparatus as a communication destination when the matching unit determines that the second identification information coincides with the third identification information; and
transmitting predetermined information to the other communication apparatus determined by the communication-destination determining unit.

* * * * *